(12) United States Patent
de Paz et al.

(10) Patent No.: US 9,106,866 B2
(45) Date of Patent: Aug. 11, 2015

(54) SYSTEMS AND METHODS FOR PROVIDING USER INTERFACES IN AN INTELLIGENT TELEVISION

(71) Applicant: Flextronics AP, LLC, San Jose, CA (US)

(72) Inventors: Alexander de Paz, Burlington (CA); Karina A. Limongi, Oakville (CA); Sanjiv Sirpal, Oakville (CA)

(73) Assignee: Flextronics AP, LLC, San Jose, CA (US)

( * ) Notice: Subject to any disclaimer, the term of this patent is extended or adjusted under 35 U.S.C. 154(b) by 0 days.

(21) Appl. No.: 13/969,884

(22) Filed: Aug. 19, 2013

(65) Prior Publication Data

US 2014/0075477 A1  Mar. 13, 2014

Related U.S. Application Data

(60) Provisional application No. 61/684,672, filed on Aug. 17, 2012, provisional application No. 61/702,650, filed on Sep. 18, 2012, provisional application No. 61/697,710, filed on Sep. 6, 2012, provisional (Continued)

(51) Int. Cl.
*G06F 3/00* (2006.01)
*G06F 13/00* (2006.01)
(Continued)

(52) U.S. Cl.
CPC .............. *H04N 5/4401* (2013.01); *G06F 3/017* (2013.01); *G06F 3/0481* (2013.01); *G06F 3/04883* (2013.01); *H04L 51/32* (2013.01); *H04N 5/44* (2013.01); *H04N 5/4403* (2013.01); *H04N 5/445* (2013.01); *H04N 5/50* (2013.01); *H04N 17/04* (2013.01); *H04N 21/25808* (2013.01); *H04N 21/26291* (2013.01); *H04N 21/42204* (2013.01); *H04N 21/432* (2013.01); *H04N 21/433* (2013.01); *H04N 21/435* (2013.01); *H04N 21/437* (2013.01); *H04N 21/4307* (2013.01);

(Continued)

(58) Field of Classification Search
None
See application file for complete search history.

(56) References Cited

U.S. PATENT DOCUMENTS 4,284,849 A   8/1981   Anderson et al.
5,539,479 A   7/1996   Bertram (Continued)

FOREIGN PATENT DOCUMENTS

CN   1832534   9/2006
CN   101472102   7/2009

(Continued)

OTHER PUBLICATIONS

International Search Report and Written Opinion for International (PCT) Patent Application No. PCT/US13/55494, mailed Apr. 16, 2014 9 pages.

(Continued)

*Primary Examiner* — Nathan Flynn
*Assistant Examiner* — William J Kim
(74) *Attorney, Agent, or Firm* — Sheridan Ross P.C.

(57) ABSTRACT

An intelligent television can provide various interfaces for navigating processes associated with providing content. The user interfaces include unique visual representations and organizations that allow the user to utilize the intelligent television more easily and more effectively. Particularly, the user interfaces pertain to the display of media content, electronic programming guide information, television content, and other content. Further, the user interfaces provide unique process of transitioning between the content.

20 Claims, 60 Drawing Sheets

Related U.S. Application Data application No. 61/700,182, filed on Sep. 12, 2012, provisional application No. 61/736,692, filed on Dec. 13, 2012, provisional application No. 61/798,821, filed on Mar. 15, 2013, provisional application No. 61/804,942, filed on Mar. 25, 2013, provisional application No. 61/804,998, filed on Mar. 25, 2013, provisional application No. 61/804,971, filed on Mar. 25, 2013, provisional application No. 61/804,990, filed on Mar. 25, 2013, provisional application No. 61/805,003, filed on Mar. 25, 2013, provisional application No. 61/805,053, filed on Mar. 25, 2013, provisional application No. 61/805,030, filed on Mar. 25, 2013, provisional application No. 61/805,027, filed on Mar. 25, 2013, provisional application No. 61/805,042, filed on Mar. 25, 2013, provisional application No. 61/805,038, filed on Mar. 25, 2013.

(51) Int. Cl.

| | |
|---|---|
| H04N 5/445 | (2011.01) |
| H04N 5/44 | (2011.01) |
| H04N 17/04 | (2006.01) |
| H04N 21/482 | (2011.01) |
| H04N 5/50 | (2006.01) |
| H04N 21/43 | (2011.01) |
| H04N 21/262 | (2011.01) |
| H04N 21/437 | (2011.01) |
| H04N 21/462 | (2011.01) |
| H04N 21/81 | (2011.01) |
| H04N 21/442 | (2011.01) |
| H04N 21/485 | (2011.01) |
| H04N 21/472 | (2011.01) |
| H04N 21/4788 | (2011.01) |
| H04N 21/475 | (2011.01) |
| H04N 21/84 | (2011.01) |
| H04N 21/478 | (2011.01) |
| H04N 21/8358 | (2011.01) |
| G06F 3/0481 | (2013.01) |
| H04N 21/488 | (2011.01) |
| H04N 21/61 | (2011.01) |
| H04N 21/422 | (2011.01) |
| H04N 21/439 | (2011.01) |
| H04N 21/431 | (2011.01) |
| H04N 21/433 | (2011.01) |
| H04N 21/435 | (2011.01) |
| H04N 21/432 | (2011.01) |
| H04N 21/47 | (2011.01) |
| H04L 12/58 | (2006.01) |
| H04N 21/258 | (2011.01) |
| H04N 21/45 | (2011.01) |
| G06F 3/01 | (2006.01) |
| G06F 3/0488 | (2013.01) |
| H04N 5/45 | (2011.01) |

(52) U.S. Cl.
CPC ....... *H04N 21/4316* (2013.01); *H04N 21/4396* (2013.01); *H04N 21/442* (2013.01); *H04N 21/44204* (2013.01); *H04N 21/44213* (2013.01); *H04N 21/44222* (2013.01); *H04N 21/4532* (2013.01); *H04N 21/4622* (2013.01); *H04N 21/47* (2013.01); *H04N 21/472* (2013.01); *H04N 21/478* (2013.01); *H04N 21/4755* (2013.01); *H04N 21/4788* (2013.01); *H04N 21/47202* (2013.01); *H04N 21/482* (2013.01); *H04N 21/485* (2013.01); *H04N 21/488* (2013.01); *H04N 21/4821* (2013.01); *H04N 21/4823* (2013.01); *H04N 21/4828* (2013.01); *H04N 21/4858* (2013.01); *H04N 21/4882* (2013.01); *H04N 21/6125* (2013.01); *H04N 21/6175* (2013.01); *H04N 21/8126* (2013.01); *H04N 21/8133* (2013.01); *H04N 21/8166* (2013.01); *H04N 21/8173* (2013.01); *H04N 21/8358* (2013.01); *H04N 21/84* (2013.01); *G06F 2203/04804* (2013.01); *H04N 5/45* (2013.01)

(56) References Cited

U.S. PATENT DOCUMENTS

| | | | |
|---|---|---|---|
| 5,734,444 | A | 3/1998 | Yoshinobo |
| 5,867,227 | A | 2/1999 | Yamaguchi |
| 5,964,839 | A | 10/1999 | Johnson et al. |
| 6,008,803 | A | 12/1999 | Rowe et al. |
| 6,047,319 | A | 4/2000 | Olson |
| 6,111,614 | A | 8/2000 | Mugura et al. |
| 6,177,931 | B1 | 1/2001 | Alexander et al. |
| 6,239,794 | B1 | 5/2001 | Yuen et al. |
| 6,285,804 | B1 | 9/2001 | Crinon et al. |
| 6,493,038 | B1 | 12/2002 | Singh et al. |
| 6,493,876 | B1 | 12/2002 | DeFreese et al. |
| 6,515,968 | B1 | 2/2003 | Combar et al. |
| 6,563,515 | B1 | 5/2003 | Reynolds et al. |
| 6,564,378 | B1 | 5/2003 | Satterfield et al. |
| 6,629,077 | B1 | 9/2003 | Arling et al. |
| 6,661,468 | B2 | 12/2003 | Alten et al. |
| 6,704,062 | B1 | 3/2004 | Ahida |
| 6,766,526 | B1 | 7/2004 | Ellis |
| 6,971,118 | B1 | 11/2005 | Akhavan et al. |
| 7,058,600 | B1 | 6/2006 | Combar et al. |
| 7,174,126 | B2 | 2/2007 | McElhatten et al. |
| 7,228,556 | B2 | 6/2007 | Beach et al. |
| 7,233,316 | B2 | 6/2007 | Smith et al. |
| 7,266,726 | B1 | 9/2007 | Ladd et al. |
| 7,363,591 | B2 | 4/2008 | Goldthwaite et al. |
| 7,487,529 | B1 | 2/2009 | Orlick |
| 7,493,641 | B2 | 2/2009 | Klosterman et al. |
| 7,506,350 | B2 | 3/2009 | Johnson |
| 7,543,320 | B2 | 6/2009 | Schein et al. |
| 7,577,923 | B2 | 8/2009 | Beam et al. |
| 7,623,933 | B2 | 11/2009 | Sarosi et al. |
| 7,685,520 | B2 | 3/2010 | Rashkovskiy et al. |
| 7,698,606 | B2 | 4/2010 | Ladd et al. |
| 7,805,634 | B2 | 9/2010 | Balazich et al. |
| 7,822,716 | B2 | 10/2010 | Lee et al. |
| 7,880,077 | B2 | 2/2011 | Pauws et al. |
| 7,900,228 | B2 | 3/2011 | Stark et al. |
| 7,904,924 | B1 | 3/2011 | De Heer et al. |
| 7,908,635 | B2 | 3/2011 | Barton et al. |
| 8,006,201 | B2 | 8/2011 | Bhattacharya |
| 8,065,390 | B2 | 11/2011 | Cheng |
| 8,089,455 | B1 | 1/2012 | Wieder |
| 8,127,329 | B1 | 2/2012 | Kunkel et al. |
| 8,151,215 | B2 | 4/2012 | Baurmann et al. |
| 8,166,511 | B2 | 4/2012 | Griggs |
| 8,201,104 | B2 | 6/2012 | Yamamoto et al. |
| 8,220,021 | B1 | 7/2012 | Look et al. |
| 8,281,339 | B1 | 10/2012 | Walker et al. |
| 8,473,976 | B2 | 6/2013 | Udani |
| 8,510,780 | B2 | 8/2013 | Stallings et al. |
| 8,516,519 | B2 | 8/2013 | Lee |
| 8,566,874 | B2 | 10/2013 | Roberts et al. |
| 8,589,981 | B2 | 11/2013 | Lee et al. |
| 8,640,166 | B1 | 1/2014 | Craner |
| 8,683,519 | B2 | 3/2014 | McCarthy et al. |
| 8,756,620 | B2 | 6/2014 | Papish et al. |
| 8,832,742 | B2 | 9/2014 | Rasanen et al. |
| 2001/0001160 | A1 | 5/2001 | Shoff et al. |
| 2001/0010097 | A1 | 7/2001 | Lee |
| 2001/0056577 | A1 | 12/2001 | Gordon et al. |
| 2002/0042914 | A1 | 4/2002 | Walker et al. |
| 2002/0049970 | A1 | 4/2002 | Park |
| 2002/0052746 | A1 | 5/2002 | Handelman |

(56) References Cited

U.S. PATENT DOCUMENTS

| | | |
|---|---|---|
| 2002/0056098 A1 | 5/2002 | White |
| 2002/0067376 A1 | 6/2002 | Martin et al. |
| 2002/0152267 A1 | 10/2002 | Lennon |
| 2002/0188944 A1 | 12/2002 | Noble |
| 2003/0003876 A1 | 1/2003 | Rumsey |
| 2003/0014752 A1 | 1/2003 | Zaslavsky et al. |
| 2003/0084449 A1 | 5/2003 | Chane et al. |
| 2003/0110234 A1 | 6/2003 | Egli et al. |
| 2003/0118323 A1 | 6/2003 | Ismail et al. |
| 2003/0149988 A1 | 8/2003 | Ellis et al. |
| 2003/0151621 A1 | 8/2003 | McEvilly et al. |
| 2003/0177498 A1 | 9/2003 | Ellis et al. |
| 2003/0182658 A1 | 9/2003 | Alexander |
| 2003/0182659 A1 | 9/2003 | Ellis et al. |
| 2003/0208763 A1 | 11/2003 | McElhatten et al. |
| 2003/0225777 A1 | 12/2003 | Marsh |
| 2003/0226146 A1 | 12/2003 | Thurston et al. |
| 2004/0078807 A1 | 4/2004 | Fries et al. |
| 2004/0093616 A1 | 5/2004 | Johnson |
| 2004/0103120 A1 | 5/2004 | Fickle et al. |
| 2004/0117831 A1 | 6/2004 | Ellis et al. |
| 2004/0119815 A1 | 6/2004 | Soloff |
| 2004/0148362 A1 | 7/2004 | Friedman |
| 2004/0154040 A1 | 8/2004 | Ellis |
| 2004/0158193 A1 | 8/2004 | Bui |
| 2004/0211282 A1 | 10/2004 | Kim |
| 2004/0216156 A1 | 10/2004 | Wagner |
| 2004/0237108 A1 | 11/2004 | Drazin et al. |
| 2005/0015804 A1 | 1/2005 | LaJoie et al. |
| 2005/0022237 A1 | 1/2005 | Nomura |
| 2005/0091596 A1* | 4/2005 | Anthony et al. ............... 715/712 |
| 2005/0097606 A1 | 5/2005 | Scott, III et al. |
| 2005/0097622 A1 | 5/2005 | Zigmond et al. |
| 2005/0120306 A1 | 6/2005 | Klassen et al. |
| 2005/0149964 A1 | 7/2005 | Thomas et al. |
| 2005/0160452 A1 | 7/2005 | Lawler et al. |
| 2005/0165918 A1 | 7/2005 | Wantanabe et al. |
| 2005/0188318 A1 | 8/2005 | Tamir et al. |
| 2005/0188402 A1 | 8/2005 | de Andrade et al. |
| 2005/0204382 A1 | 9/2005 | Ellis et al. |
| 2005/0204387 A1 | 9/2005 | Knudson et al. |
| 2005/0229210 A1 | 10/2005 | Akhavan |
| 2005/0232210 A1 | 10/2005 | Karaoguz et al. |
| 2005/0289603 A1 | 12/2005 | Cezeaux et al. |
| 2006/0031875 A1 | 2/2006 | Yu |
| 2006/0064716 A1 | 3/2006 | Sull et al. |
| 2006/0090183 A1 | 4/2006 | Zito et al. |
| 2006/0101504 A1 | 5/2006 | Aravamudan et al. |
| 2006/0117337 A1 | 6/2006 | Shivaji Rao et al. |
| 2006/0123445 A1 | 6/2006 | Sullivan et al. |
| 2006/0143674 A1 | 6/2006 | Jones et al. |
| 2006/0158838 A1 | 7/2006 | Kinoshita et al. |
| 2006/0184972 A1 | 8/2006 | Rafey et al. |
| 2006/0248557 A1 | 11/2006 | Stark et al. |
| 2006/0262116 A1 | 11/2006 | Moshiri et al. |
| 2006/0280449 A1 | 12/2006 | Ogawa et al. |
| 2007/0011702 A1 | 1/2007 | Vaysman |
| 2007/0028282 A1 | 2/2007 | Kooijmans et al. |
| 2007/0050733 A1 | 3/2007 | Lee et al. |
| 2007/0061724 A1 | 3/2007 | Slothouber et al. |
| 2007/0066283 A1 | 3/2007 | Haar et al. |
| 2007/0096939 A1 | 5/2007 | Walrath |
| 2007/0143809 A1 | 6/2007 | Chen et al. |
| 2007/0154163 A1 | 7/2007 | Cordray |
| 2007/0162936 A1 | 7/2007 | Stallings et al. |
| 2007/0192715 A1 | 8/2007 | Kataria et al. |
| 2007/0199022 A1 | 8/2007 | Moshiri et al. |
| 2007/0250762 A1* | 10/2007 | Mansfield .................. 715/501.1 |
| 2007/0250864 A1 | 10/2007 | Diaz Perez |
| 2007/0261090 A1 | 11/2007 | Miller et al. |
| 2008/0022309 A1 | 1/2008 | Begeja et al. |
| 2008/0086745 A1 | 4/2008 | Knudson et al. |
| 2008/0092198 A1 | 4/2008 | Hutten |
| 2008/0098433 A1 | 4/2008 | Hardacker et al. |
| 2008/0114794 A1 | 5/2008 | Craner |
| 2008/0114861 A1 | 5/2008 | Gildred |
| 2008/0120635 A1 | 5/2008 | Trimper et al. |
| 2008/0133525 A1 | 6/2008 | Ott |
| 2008/0141307 A1 | 6/2008 | Whitehead |
| 2008/0163307 A1 | 7/2008 | Coburn et al. |
| 2008/0177828 A1 | 7/2008 | Accarie et al. |
| 2008/0235595 A1* | 9/2008 | Krantz et al. ................. 715/741 |
| 2008/0244637 A1 | 10/2008 | Candelore |
| 2008/0271080 A1 | 10/2008 | Gossweiler et al. |
| 2008/0276279 A1 | 11/2008 | Gossweiler et al. |
| 2008/0282294 A1 | 11/2008 | Carpenter et al. |
| 2008/0288461 A1 | 11/2008 | Glennon et al. |
| 2008/0307457 A1 | 12/2008 | Yang et al. |
| 2008/0313677 A1 | 12/2008 | Lee |
| 2009/0013350 A1 | 1/2009 | Ohlfs et al. |
| 2009/0019485 A1 | 1/2009 | Ellis et al. |
| 2009/0064222 A1 | 3/2009 | Dawson et al. |
| 2009/0102966 A1 | 4/2009 | Jiang et al. |
| 2009/0106793 A1 | 4/2009 | Tecot et al. |
| 2009/0125940 A1 | 5/2009 | Kim et al. |
| 2009/0129340 A1 | 5/2009 | Handa |
| 2009/0150379 A1 | 6/2009 | Park et al. |
| 2009/0158326 A1 | 6/2009 | Hunt et al. |
| 2009/0158375 A1 | 6/2009 | Rodriguez et al. |
| 2009/0160764 A1 | 6/2009 | Myllymäki |
| 2009/0165045 A1 | 6/2009 | Stallings et al. |
| 2009/0177981 A1 | 7/2009 | Christie et al. |
| 2009/0179989 A1 | 7/2009 | Bessone et al. |
| 2009/0199237 A1 | 8/2009 | White et al. |
| 2009/0199241 A1 | 8/2009 | Unger et al. |
| 2009/0199242 A1 | 8/2009 | Johnson et al. |
| 2009/0204929 A1 | 8/2009 | Baurmann et al. |
| 2009/0210910 A1 | 8/2009 | Smith et al. |
| 2009/0213079 A1 | 8/2009 | Segal et al. |
| 2009/0228919 A1 | 9/2009 | Zott et al. |
| 2009/0235311 A1 | 9/2009 | Michel et al. |
| 2009/0241048 A1* | 9/2009 | Augustine et al. ............ 715/769 |
| 2009/0249394 A1 | 10/2009 | Schwesinger et al. |
| 2009/0271823 A1 | 10/2009 | Jung et al. |
| 2009/0293078 A1 | 11/2009 | Pirani et al. |
| 2009/0293079 A1 | 11/2009 | McKee et al. |
| 2009/0300674 A1 | 12/2009 | Ratsch et al. |
| 2009/0313232 A1 | 12/2009 | Tinsley et al. |
| 2010/0013997 A1 | 1/2010 | Whang |
| 2010/0031193 A1 | 2/2010 | Stark et al. |
| 2010/0050219 A1 | 2/2010 | Angiolillo et al. |
| 2010/0058231 A1 | 3/2010 | Duarte et al. |
| 2010/0071019 A1 | 3/2010 | Blanchard et al. |
| 2010/0086277 A1 | 4/2010 | Craner |
| 2010/0100512 A1 | 4/2010 | Brodin et al. |
| 2010/0107112 A1 | 4/2010 | Jennings et al. |
| 2010/0122284 A1 | 5/2010 | Yoon et al. |
| 2010/0128183 A1 | 5/2010 | Ishii |
| 2010/0161506 A1 | 6/2010 | Bosenick et al. |
| 2010/0172407 A1 | 7/2010 | Ramaswamy |
| 2010/0177252 A1 | 7/2010 | Larsen et al. |
| 2010/0180292 A1 | 7/2010 | Epstein et al. |
| 2010/0180300 A1 | 7/2010 | Carpenter et al. |
| 2010/0191727 A1 | 7/2010 | Malik |
| 2010/0201890 A1 | 8/2010 | Degonde et al. |
| 2010/0225830 A1 | 9/2010 | Blanchard et al. |
| 2010/0241962 A1 | 9/2010 | Peterson et al. |
| 2010/0293497 A1 | 11/2010 | Peterson |
| 2010/0306402 A1 | 12/2010 | Russell et al. |
| 2010/0306800 A1 | 12/2010 | Jung et al. |
| 2011/0016492 A1 | 1/2011 | Morita |
| 2011/0022450 A1 | 1/2011 | Meredith |
| 2011/0023608 A1 | 2/2011 | Rueger |
| 2011/0035774 A1 | 2/2011 | Parker |
| 2011/0041150 A1 | 2/2011 | Schein et al. |
| 2011/0043696 A1 | 2/2011 | Onogi et al. |
| 2011/0047572 A1 | 2/2011 | Hill et al. |
| 2011/0055873 A1 | 3/2011 | Heo et al. |
| 2011/0060661 A1 | 3/2011 | Chai et al. |
| 2011/0067066 A1 | 3/2011 | Barton et al. |
| 2011/0072480 A1 | 3/2011 | Stone |
| 2011/0074591 A1 | 3/2011 | Arling et al. |
| 2011/0078745 A1 | 3/2011 | Macrae et al. |
| 2011/0093888 A1 | 4/2011 | Araki et al. |

(56) References Cited

U.S. PATENT DOCUMENTS

| | | |
|---|---|---|
| 2011/0107376 A1 | 5/2011 | Lee et al. |
| 2011/0119626 A1 | 5/2011 | Faenger et al. |
| 2011/0119702 A1 | 5/2011 | Jang et al. |
| 2011/0125755 A1 | 5/2011 | Kaila et al. |
| 2011/0126251 A1 | 5/2011 | LaFreniere et al. |
| 2011/0131506 A1 | 6/2011 | Callissendorff |
| 2011/0145860 A1 | 6/2011 | Wei |
| 2011/0145881 A1 | 6/2011 | Hartman et al. |
| 2011/0154198 A1 | 6/2011 | Bachman et al. |
| 2011/0154405 A1 | 6/2011 | Isaias |
| 2011/0161996 A1 | 6/2011 | Hamano et al. |
| 2011/0167452 A1 | 7/2011 | Baumgartner et al. |
| 2011/0173657 A1 | 7/2011 | Thomas et al. |
| 2011/0179453 A1 | 7/2011 | Poniatowski |
| 2011/0179454 A1 | 7/2011 | Yates |
| 2011/0187929 A1 | 8/2011 | Suzuki et al. |
| 2011/0213670 A1 | 9/2011 | Strutton et al. |
| 2011/0213700 A1 | 9/2011 | Sant'Anselmo |
| 2011/0219395 A1 | 9/2011 | Moshiri et al. |
| 2011/0246495 A1 | 10/2011 | Mallinson |
| 2011/0252446 A1 | 10/2011 | Jeong et al. |
| 2011/0273552 A1 | 11/2011 | Wang et al. |
| 2011/0273625 A1 | 11/2011 | McMahon et al. |
| 2011/0276995 A1 | 11/2011 | Alten et al. |
| 2011/0283304 A1 | 11/2011 | Roberts et al. |
| 2011/0283318 A1 | 11/2011 | Seidel et al. |
| 2011/0289067 A1 | 11/2011 | Jordan et al. |
| 2011/0289419 A1 | 11/2011 | Yu et al. |
| 2011/0289452 A1 | 11/2011 | Jordan et al. |
| 2011/0321095 A1 | 12/2011 | Yao et al. |
| 2011/0321098 A1 | 12/2011 | Bangalore et al. |
| 2012/0002951 A1 | 1/2012 | Reisman |
| 2012/0011545 A1 | 1/2012 | Doets et al. |
| 2012/0026400 A1 | 2/2012 | Kang et al. |
| 2012/0030317 A1 | 2/2012 | Smyth et al. |
| 2012/0033950 A1 | 2/2012 | Cordray et al. |
| 2012/0042334 A1 | 2/2012 | Choi et al. |
| 2012/0054803 A1 | 3/2012 | Lee et al. |
| 2012/0060094 A1 | 3/2012 | Irwin et al. |
| 2012/0069131 A1 | 3/2012 | Abelow |
| 2012/0072952 A1 | 3/2012 | Vaysman et al. |
| 2012/0076473 A1 | 3/2012 | Kunkel et al. |
| 2012/0079096 A1 | 3/2012 | Cowan et al. |
| 2012/0079427 A1 | 3/2012 | Carmichael et al. |
| 2012/0086857 A1 | 4/2012 | Kim et al. |
| 2012/0090004 A1 | 4/2012 | Jeong |
| 2012/0096264 A1 | 4/2012 | Traversat et al. |
| 2012/0099024 A1 | 4/2012 | Ryu et al. |
| 2012/0110623 A1 | 5/2012 | Hill et al. |
| 2012/0120316 A1 | 5/2012 | Lee |
| 2012/0133840 A1 | 5/2012 | Shirasuka et al. |
| 2012/0143972 A1 | 6/2012 | Malik et al. |
| 2012/0144416 A1 | 6/2012 | Wetzer et al. |
| 2012/0144422 A1 | 6/2012 | Han et al. |
| 2012/0144423 A1 | 6/2012 | Kim et al. |
| 2012/0147049 A1 | 6/2012 | Lee |
| 2012/0147270 A1 | 6/2012 | Kim et al. |
| 2012/0147825 A1 | 6/2012 | Hassan et al. |
| 2012/0151006 A1 | 6/2012 | McInerney et al. |
| 2012/0154449 A1 | 6/2012 | Ramagem et al. |
| 2012/0167154 A1 | 6/2012 | Kim et al. |
| 2012/0173979 A1 | 7/2012 | Lee |
| 2012/0174039 A1 | 7/2012 | Rhoads et al. |
| 2012/0174157 A1* | 7/2012 | Stinson et al. ............... 725/40 |
| 2012/0176546 A1 | 7/2012 | Yoon |
| 2012/0194742 A1 | 8/2012 | Barnes et al. |
| 2012/0200574 A1 | 8/2012 | Hill et al. |
| 2012/0206652 A1 | 8/2012 | Yi |
| 2012/0210275 A1 | 8/2012 | Park et al. |
| 2012/0210355 A1 | 8/2012 | Kim et al. |
| 2012/0210367 A1 | 8/2012 | Lee et al. |
| 2012/0210370 A1 | 8/2012 | Kim et al. |
| 2012/0210375 A1 | 8/2012 | Wong et al. |
| 2012/0210386 A1 | 8/2012 | Kim et al. |
| 2012/0218203 A1 | 8/2012 | Kanki |
| 2012/0221972 A1 | 8/2012 | Dougall et al. |
| 2012/0229320 A1 | 9/2012 | Yu |
| 2012/0229473 A1 | 9/2012 | Tam |
| 2012/0257108 A1 | 10/2012 | Friedlander et al. |
| 2012/0260284 A1 | 10/2012 | Friedlander et al. |
| 2012/0272271 A1 | 10/2012 | Nishizawa et al. |
| 2012/0278725 A1 | 11/2012 | Gordon et al. |
| 2012/0284751 A1 | 11/2012 | Kim et al. |
| 2012/0284752 A1 | 11/2012 | Christie |
| 2012/0291068 A1 | 11/2012 | Khushoo et al. |
| 2012/0331505 A1 | 12/2012 | Chun et al. |
| 2013/0014006 A1 | 1/2013 | Abellera et al. |
| 2013/0034023 A1 | 2/2013 | Jung |
| 2013/0047174 A1 | 2/2013 | Lee et al. |
| 2013/0091053 A1 | 4/2013 | Park et al. |
| 2013/0097640 A1 | 4/2013 | Lemmons et al. |
| 2013/0148023 A1 | 6/2013 | Sullivan et al. |
| 2013/0152135 A1 | 6/2013 | Hong et al. |
| 2013/0160065 A1 | 6/2013 | Aso et al. |
| 2013/0191869 A1 | 7/2013 | Sugiyama et al. |
| 2013/0238777 A1 | 9/2013 | Raleigh |
| 2013/0238796 A1 | 9/2013 | Lentzitzky |
| 2013/0263021 A1 | 10/2013 | Dunn et al. |
| 2013/0263053 A1 | 10/2013 | Tritschler et al. |
| 2013/0275519 A1 | 10/2013 | Nichols |
| 2013/0282839 A1 | 10/2013 | Alcala |
| 2013/0291015 A1 | 10/2013 | Pan |
| 2013/0298164 A1 | 11/2013 | Moreau et al. |
| 2013/0318553 A1 | 11/2013 | Yegorov et al. |
| 2013/0326557 A1 | 12/2013 | Kang et al. |
| 2013/0332856 A1 | 12/2013 | Sanders et al. |
| 2014/0040344 A1 | 2/2014 | Gehring et al. |
| 2014/0040819 A1* | 2/2014 | Duffy ............................ 715/789 |
| 2014/0049651 A1 | 2/2014 | Voth |
| 2014/0049691 A1 | 2/2014 | Burdzinski et al. |
| 2014/0049692 A1 | 2/2014 | Sirpal et al. |
| 2014/0049693 A1 | 2/2014 | Selim et al. |
| 2014/0052785 A1 | 2/2014 | Sirpal |
| 2014/0052786 A1 | 2/2014 | de Paz |
| 2014/0053176 A1 | 2/2014 | Milano et al. |
| 2014/0053177 A1 | 2/2014 | Voth |
| 2014/0053178 A1 | 2/2014 | Voth et al. |
| 2014/0053179 A1 | 2/2014 | Voth |
| 2014/0053180 A1 | 2/2014 | Shoykher |
| 2014/0053190 A1 | 2/2014 | Sirpal |
| 2014/0053191 A1 | 2/2014 | Selim |
| 2014/0053192 A1 | 2/2014 | Sirpal |
| 2014/0053193 A1 | 2/2014 | Selim et al. |
| 2014/0053194 A1 | 2/2014 | Shoykher et al. |
| 2014/0053195 A1 | 2/2014 | Sirpal et al. |
| 2014/0053196 A1 | 2/2014 | Selim |
| 2014/0053197 A1 | 2/2014 | Shoykher et al. |
| 2014/0053198 A1 | 2/2014 | Sirpal et al. |
| 2014/0053200 A1 | 2/2014 | de Paz et al. |
| 2014/0053202 A1 | 2/2014 | Selim |
| 2014/0053203 A1 | 2/2014 | Csiki |
| 2014/0053204 A1 | 2/2014 | Milano |
| 2014/0053205 A1 | 2/2014 | Sirpal et al. |
| 2014/0053206 A1 | 2/2014 | Shoykher et al. |
| 2014/0053207 A1 | 2/2014 | Shoykher et al. |
| 2014/0053208 A1 | 2/2014 | Sirpal et al. |
| 2014/0053211 A1 | 2/2014 | Milano |
| 2014/0053212 A1 | 2/2014 | Shoykher et al. |
| 2014/0053221 A1 | 2/2014 | Sirpal et al. |
| 2014/0053222 A1 | 2/2014 | Shoykher et al. |
| 2014/0053225 A1 | 2/2014 | Shoykher et al. |
| 2014/0055673 A1 | 2/2014 | Sirpal et al. |
| 2014/0059480 A1 | 2/2014 | de Paz et al. |
| 2014/0059578 A1 | 2/2014 | Voth et al. |
| 2014/0059589 A1 | 2/2014 | Sirpal |
| 2014/0059596 A1 | 2/2014 | Dourado |
| 2014/0059598 A1 | 2/2014 | Milano |
| 2014/0059599 A1 | 2/2014 | Sirpal et al. |
| 2014/0059600 A1 | 2/2014 | Duarado |
| 2014/0059601 A1 | 2/2014 | Sirpal |
| 2014/0059602 A1 | 2/2014 | Sirpal |
| 2014/0059603 A1 | 2/2014 | Lee et al. |
| 2014/0059605 A1 | 2/2014 | Sirpal et al. |
| 2014/0059606 A1 | 2/2014 | Selim et al. |

(56) References Cited

U.S. PATENT DOCUMENTS

| | | |
|---|---|---|
| 2014/0059609 A1 | 2/2014 | Duarado |
| 2014/0059610 A1 | 2/2014 | Sirpal et al. |
| 2014/0059612 A1 | 2/2014 | Selim |
| 2014/0059613 A1 | 2/2014 | Burdzinski et al. |
| 2014/0059614 A1 | 2/2014 | Shoykher et al. |
| 2014/0059615 A1 | 2/2014 | Sirpal et al. |
| 2014/0059625 A1 | 2/2014 | Dourado et al. |
| 2014/0059626 A1 | 2/2014 | Selim |
| 2014/0059635 A1 | 2/2014 | Sirpal et al. |
| 2014/0059637 A1 | 2/2014 | Chen et al. |
| 2014/0067954 A1 | 3/2014 | Sirpal |
| 2014/0068673 A1 | 3/2014 | Sirpal et al. |
| 2014/0068674 A1 | 3/2014 | Sirpal et al. |
| 2014/0068679 A1 | 3/2014 | Kaneko et al. |
| 2014/0068682 A1 | 3/2014 | Selim et al. |
| 2014/0068683 A1 | 3/2014 | Selim et al. |
| 2014/0068685 A1 | 3/2014 | Selim et al. |
| 2014/0068689 A1 | 3/2014 | Sirpal et al. |
| 2014/0075475 A1 | 3/2014 | Sirpal et al. |
| 2014/0075476 A1 | 3/2014 | de Paz et al. |
| 2014/0075479 A1 | 3/2014 | Soto et al. |
| 2014/0075483 A1 | 3/2014 | de Paz et al. |
| 2014/0075484 A1 | 3/2014 | Selim et al. |
| 2014/0075487 A1 | 3/2014 | Selim et al. |
| 2014/0082659 A1 | 3/2014 | Fife et al. |
| 2014/0109143 A1 | 4/2014 | Craner |
| 2014/0173660 A1 | 6/2014 | Correa et al. |
| 2014/0181851 A1 | 6/2014 | Givon et al. |
| 2014/0181853 A1 | 6/2014 | Dureau et al. |
| 2014/0188970 A1 | 7/2014 | Madhok et al. |
| 2014/0259074 A1 | 9/2014 | Ansari et al. |
| 2014/0380414 A1 | 12/2014 | Saidi et al. |

FOREIGN PATENT DOCUMENTS

| | | |
|---|---|---|
| CN | 101540850 | 9/2009 |
| CN | 101567992 | 10/2009 |
| CN | 201937743 | 8/2011 |
| EP | 1031929 | 8/2000 |
| EP | 1067458 | 1/2001 |
| EP | 1770956 | 4/2007 |
| EP | 1865723 | 12/2007 |
| EP | 2328346 | 6/2011 |
| EP | 2348724 | 7/2011 |
| EP | 2439935 | 4/2012 |
| EP | 2487922 | 8/2012 |
| WO | WO 99/21308 | 4/1999 |
| WO | WO 99/35849 | 7/1999 |
| WO | WO 00/05884 | 2/2000 |
| WO | WO 01/06784 | 1/2001 |
| WO | WO 01/06788 | 1/2001 |
| WO | WO 02/080552 | 10/2002 |
| WO | WO 03/044755 | 5/2003 |
| WO | WO 2007/137611 | 12/2007 |
| WO | WO 2011/148054 | 12/2011 |
| WO | WO 2011/163481 | 12/2011 |
| WO | WO 2012/030024 | 3/2012 |
| WO | WO 2012/068438 | 5/2012 |
| WO | WO 2012/073027 | 6/2012 |
| WO | WO 2012/094247 | 7/2012 |
| WO | WO 2012/103121 | 8/2012 |
| WO | WO 2014/026636 | 2/2014 |
| WO | WO 2014/026640 | 2/2014 |
| WO | WO 2014/028067 | 2/2014 |
| WO | WO 2014/028068 | 2/2014 |
| WO | WO 2014/028069 | 2/2014 |
| WO | WO 2014/028071 | 2/2014 |
| WO | WO 2014/028074 | 2/2014 |

OTHER PUBLICATIONS

International Search Report and Written Opinion for International (PCT) Patent Application No. PCT/US2013/055342, mailed Apr. 17, 2014 12 pages.

International Search Report and Written Opinion for International (PCT) Patent Application No. PCT/US13/55592, mailed Mar. 10, 2014 11 pages.

Notice of Allowance for U.S. Appl. No. 13/864,206, mailed Apr. 16, 2014 7 pages.

Official Action for U.S. Appl. No. 13/970,409, mailed Jul. 21, 2014 21 pages.

Official Action for U.S. Appl. No. 13/970,442, mailed Jun. 4, 2014 10 pages.

Official Action for U.S. Appl. No. 13/970,450 mailed Jul. 9, 2014 17 pages.

Official Action for U.S. Appl. No. 13/970,453, mailed Jul. 21, 2014 12 pages.

Official Action for U.S. Appl. No. 13/968,858 mailed May 15, 2014 6 pages.

Official Action for U.S. Appl. No. 13/968,884, mailed Jun. 25, 2014 23 pages.

Official Action for U.S. Appl. No. 13/968,876 mailed Jun. 16, 2014 10 pages.

Official Action for U.S. Appl. No. 13/968,983, mailed Ju. 7, 2014 15 pages.

Official Action for U.S. Appl. No. 13/968,948 mailed May 6, 2014 11 pages.

Official Action for U.S. Appl. No. 13/864,120 mailed Jun. 13, 2014 10 pages.

Official Action for U.S. Appl. No. 13/969,505, mailed Jul. 15, 2014 7 pages.

Official Action for U.S. Appl. No. 13/969,490 mailed May 23, 2014 18 pages.

Official Action for U.S. Appl. No. 13/969,492 mailed May 23, 2014 17 pages.

Official Action for U.S. Appl. No. 13/970,000, mailed Jul. 15, 2014 12 pages.

Official Action for U.S. Appl. No. 13/970,355, mailed Jul. 7, 2014 7 pages.

Official Action for U.S. Appl. No. 13/970,374, mailed Jun. 6, 2014 7 pages.

Official Action for U.S. Appl. No. 13/968,903, mailed Jul. 18, 2014 14 pages.

Official Action for U.S. Appl. No. 13/968,969, mailed May 6, 2014 12 pages.

Official Action for U.S. Appl. No. 13/968,610, mailed Apr. 30, 2014 11 pages.

Official Action for U.S. Appl. No. 13/968,732, mailed May 27, 2014 12 pages.

Official Action for U.S. Appl. No. 13/969,777, mailed Jun. 25, 2014 9 pages.

Official Action for U.S. Appl. No. 13/969,510, mailed Jun. 25, 2014 13 pages.

Official Action for U.S. Appl. No. 13/970,247, mailed Jul. 9, 2014 19 pages.

Official Action for U.S. Appl. No. 13/969,504, mailed Jul. 15, 2014 9 pages.

U.S. Appl. No. 13/970,420, filed Aug. 19, 2013, Selim et al.

Tvonicsuk "Tvonics: How to use the EPG search function." 1 pages retrieved from the internet on Nov. 11, 2013 from [www.youtube.com/watch?v=H8euZ0Iydo].

International Search Report and Written Opinion for International (PCT) Patent Application No. PCT/US13/36844, mailed Jun. 28, 2013 8 pages.

International Search Report and Written Opinion for International (PCT) Patent Application No. PCT/US13/36843, mailed Jun. 28, 2013 8 pages.

International Search Report and Written Opinion for International (PCT) Patent Application No. PCT/US13/36826, mailed Jun. 17, 2013 8 pages.

International Search Report and Written Opinion for International (PCT) Patent Application No. PCT/US13/55589, mailed Dec. 19, 2013 9 pages.

International Search Report and Written Opinion for International (PCT) Patent Application No. PCT/US2013/055289, mailed Dec. 2, 2013 7 pages.

(56) References Cited

OTHER PUBLICATIONS

International Search Report and Written Opinion for International (PCT) Patent Application No. PCT/US2013/055288, mailed Dec. 2, 2013 9 pages.
International Search Report and Written Opinion for International (PCT) Patent Application No. PCT/US2013/055286, mailed Dec. 2, 2013 8 pages.
International Search Report and Written Opinion for International (PCT) Patent Application No. PCT/US13/55285, mailed Dec. 11, 2013 8 pages.
International Search Report and Written Opinion for International (PCT) Patent Application No. PCT/US2013/055284, mailed Jan. 14, 2014 12 pages.
International Search Report and Written Opinion for International (PCT) Patent Application No. PCT/US2013/055293, mailed Dec. 2, 2013 12 pages.
International Search Report and Written Opinion for International (PCT) Patent Application No. PCT/US2013/055294, mailed Dec. 2, 2013 10 pages.
International Search Report and Written Opinion for International (PCT) Patent Application No. PCT/US2013/055296, mailed Nov. 29, 2013 9 pages.
International Search Report and Written Opinion for International (PCT) Patent Application No. PCT/US13/55493, mailed Nov. 7, 2013 9 pages.
International Search Report and Written Opinion for International (PCT) Patent Application No. PCT/US2013/036828, mailed Jun. 28, 2013 12 pages.
International Search Report and Written Opinion for International (PCT) Patent Application No. PCT/US2013/055340, mailed Feb. 10, 2014 10 pages.
International Search Report and Written Opinion for International (PCT) Patent Application No. PCT/US13/55551, mailed Dec. 6, 2013 7 pages.
International Search Report and Written Opinion for International (PCT) Patent Application No. PCT/US2013/036819, mailed Jun. 17, 2013 9 pages.
International Search Report and Written Opinion for International (PCT) Patent Application No. PCT/US2013/036782, mailed Jun. 28, 2013 9 pages.
International Search Report and Written Opinion for International (PCT) Patent Application No. PCT/US13/36678, mailed Aug. 30, 2013 9 pages.
International Search Report and Written Opinion for International (PCT) Patent Application No. PCT/US2013/036804, mailed Jul. 1, 2013 13 pages.
International Search Report and Written Opinion for International (PCT) Patent Application No. PCT/US13/55405, mailed Jan. 17, 2014 8 pages.
International Search Report and Written Opinion for International (PCT) Patent Application No. PCT/US2013/055278, mailed Mar. 11, 2014 9 pages.
International Search Report and Written Opinion for International (PCT) Patent Application No. PCT/US13/55509, mailed Nov. 8, 2013 9 pages.
International Search Report and Written Opinion for Intenational (PCT) Patent Application No. PCT/CN2013/081639, mailed Nov. 28, 2013 10 pages.
International Search Report and Written Opinion for International (PCT) Patent Application No. PCT/US2013/055303, mailed Dec. 5, 2013 8 pages.
International Search Report and Written Opinion for International (PCT) Patent Application No. PCT/US2013/055280, mailed Jan. 10, 2014 10 pages.
International Search Report and Written Opinion for International (PCT) Patent Application No. PCT/US13/55383, mailed Nov. 13, 2013 9 pages.
International Search Report and Written Opinion for International (PCT) Patent Application No. PCT/US2013/055344, mailed Mar. 11, 2014 8 pages.
International Search Report and Written Opinion for International (PCT) Patent Application No. PCT/US2013/055345, mailed Dec. 6, 2013 7 pages.
International Search Report and Written Opinion for International (PCT) Patent Application No. PCT/US13/55371, mailed No. 8, 2013 7 pages.
International Search Report and Written Opinion for International (PCT) Patent Application No. PCT/US13/55389, mailed Mar. 10, 2014 10 pages.
International Search Report and Written Opinion for International (PCT) Patent Application No. PCT/US2013/055283, mailed Mar. 4, 2014 7 pages.
International Search Report and Written Opinion for International (PCT) Patent Application No. PCT/US13/55564, mailed Nov. 22, 2013 7 pages.
International Search Report and Written Opinion for International (PCT) Patent Application No. PCT/US13/55379, mailed Dec. 6, 2013 8 pages.
International Search Report and Written Opinion for International (PCT) Patent Application No. PCT/US2013/055349, mailed Nov. 29, 2013 7 pages.
International Search Report and Written Opinion for International (PCT) Patent Application No. PCT/US2013/055312, mailed Dec. 5, 2013 8 pages.
International Search Report and Written Opinion for International (PCT) Patent Application No. PCT/US13/55374, mailed Nov. 12, 2013 8 pages.
International Search Report and Written Opinion for International (PCT) Patent Application No. PCT/US13/55542, mailed Mar. 10, 2014 9 pages.
International Search Report and Written Opinion for International (PCT) Patent Application No. PCT/US13/55315, mailed Jan. 24, 2014 9 pages.
International Search Report and Written Opinion for International (PCT) Patent Application No. PCT/US2013/055317, mailed Dec. 2, 2013 9 pages.
International Search Report and Written Opinion for International (PCT) Patent Application No. PCT/US2013/055318, mailed Jan. 9, 2014 10 pages.
International Search Report and Written Opinion for International (PCT) Patent Application No. PCT/US2013/055319, mailed Mar. 11, 2014 7 pages.
International Search Report and Written Opinion for International (PCT) Patent Application No. PCT/US2013/055321, mailed Dec. 6, 2013 9 pages.
International Search Report and Written Opinion for International (PCT) Patent Application No. PCT/CN2013/081630, mailed Nov. 21, 2013 11 pages.
International Search Report and Written Opinion for International (PCT) Patent Application No. PCT/US2013/055298, mailed Nov. 29, 2013 8 pages.
International Search Report and Written Opinion for International (PCT) Patent Application No. PCT/US13/55567, mailed Dec. 20, 2013 10 pages.
International Search Report and Written Opinion for International (PCT) Patent Application No. PCT/US13/55570, mailed Nov. 22, 2013 8 pages.
Official Action for U.S. Appl. No. 13/864,206, mailed Nov. 27, 2013 17 pages.
Official Action for U.S. Appl. No. 13/864,214, mailed Mar. 12, 2014 12 pages.
U.S Appl. No. 14/407,593, filed Dec. 12, 2014, Sirpal et al.
U.S Appl. No. 14/407,598, filed Dec. 12, 2014, Sirpal et al.
U.S Appl. No. 14/407,601, filed Dec. 12, 2014, Sirpal et al.
U.S Appl. No. 14/407,609, filed Dec. 12, 2014, Sirpal et al.
U.S Appl. No. 14/418969, filed Feb. 2, 2015, Sirpal et al.
U.S Appl. No. 14/418,972, filed Feb. 2, 2015, Sirpal et al.
U.S Appl. No. 14/418971, filed Feb. 2, 2015, Shoykher et al.
International Preliminary Report on Patentability for Intenational (PCT) Patent Application No. PCT/CN2013/081639, mailed Feb. 26, 2015 6 pages.
Official Action for U.S. Appl. No. 13/969,846, mailed Mar. 2, 2015 21 pages.

(56) References Cited

OTHER PUBLICATIONS

Official Action for U.S. Appl. No. 13/969,869, mailed Feb. 24, 2015 22 pages.
Official Action for U.S. Appl. No. 13/970,388, mailed Jan. 22, 2015 12 pages.
Notice of Allowance for U.S. Appl. No. 13/970,398, mailed Feb. 2, 2015 14 pages.
Official Action for U.S. Appl. No. 13/970,409, mailed Feb. 11, 2015 25 pages.
Official Action for U.S. Appl. No. 13/970,420, mailed Feb. 10, 2015 13 pages.
Official Action for U.S. Appl. No. 13/970,442, mailed Feb. 26, 2015 10 pages.
Official Action for U.S. Appl. No. 13/970,450, mailed Nov. 19, 2014 12 pages.
Notice of Allowance for U.S. Appl. No. 13/970,453, mailed Dec. 9, 2014 11 pages.
Official Action for U.S. Appl. No. 13/968,858, mailed Jan. 23, 2015 9 pages.
Notice of Allowance for U.S. Appl. No. 13/968,884, mailed Jan. 5, 2015 20 pages.
Official Action for U.S. Appl. No. 13/968,876, mailed Dec. 26, 2014 13 pages.
Official Action for U.S. Appl. No. 13/968,867, mailed Jan. 27, 2015 17 pages.
Official Action for U.S. Appl. No. 13/968,983, mailed Nov. 26, 2014 17 pages.
Official Action for U.S. Appl. No. 13/968,948, mailed Nov. 24, 2014 13 pages.
Official Action for U.S. Appl. No. 13/864,120, mailed Dec. 24, 2014 13 pages.
Official Action for U.S. Appl. No. 13/969,505, mailed Feb. 24, 2015 9 pages.
Official Action for U.S. Appl. No. 13/969,490, mailed Nov. 19, 2014 22 pages.
Official Action for U.S. Appl. No. 13/969,492, mailed Dec. 5, 2014 14 pages.
Official Action for U.S. Appl. No. 13/969,493, mailed Mar. 2, 2015 15 pages.
Official Action for U.S. Appl. No. 13/970,000, mailed Nov. 14, 2014 14 pages.
Official Action for U.S. Appl. No. 13/970,355, mailed Dec. 19, 2014 9 pages.
Official Action for U.S. Appl. No. 13/864,214, mailed Jan. 29, 2015 17 pages.
Official Action for U.S. Appl. No. 13/969,179, mailed Nov. 28, 2014 15 pages.
Official Action for U.S. Appl. No. 13/968,767, mailed Jan. 22, 2015 15 pages.
Official Action for U.S. Appl. No. 13/969,506, mailed Jan. 23, 2015 9 pages.
Official Action for U.S. Appl. No. 13/970,374, mailed Dec. 9, 2014 9 pages.
Official Action for U.S. Appl. No. 13/968,897, mailed Jan. 28, 2015 18 pages.
Official Action for U.S. Appl. No. 13/968,652, mailed Dec. 5, 2014 25 pages.
Official Action for U.S. Appl. No. 13/968,709, mailed Nov. 14, 2014 17 pages.
Official Action for U.S. Appl. No. 13/968,709, mailed Feb. 23, 2015 13 pages.
Official Action for U.S. Appl. No. 13/968,903, mailed Jan. 5, 2015 13 pages.
Official Action for U.S. Appl. No. 13/970,234, mailed Dec. 26, 2014 13 pages.
Notice of Allowance for U.S. Appl. No. 13/968,969, mailed Jan. 6, 2015 6 pages.
Official Action for U.S. Appl. No. 13/968,610, mailed Dec. 31, 2014 7 pages.
Notice of Allowance for U.S. Appl. No. 13/968,610, mailed Feb. 24, 2015 5 pages.
Official Action for U.S. Appl. No. 13/968,732, mailed Dec. 26, 2014 13 pages.
Official Action for U.S. Appl. No. 13/969,777, mailed Jan. 8, 2015 11 pages.
Official Action for U.S. Appl. No. 13/968,630, mailed Nov. 19, 2014 11 pages.
Official Action for U.S. Appl. No. 13/969,507, mailed Jan. 27, 2015 30 pages.
Official Action for U.S. Appl. No. 13/968,937, mailed Dec. 18, 2014 9 pages.
Official Action for U.S. Appl. No. 13/969,510, mailed Feb. 24, 2015 17 pages.
Official Action for U.S. Appl. No. 13/970,243, mailed Jan. 22, 2015 14 pages.
Official Action for U.S. Appl. No. 13/970,247, mailed Dec. 22, 2014 20 pages.
Official Action for U.S. Appl. No. 13/969,504, mailed Feb. 23, 2015 10 pages.
Official Action for U.S. Appl. No. 13/969,846, mailed Aug. 15, 2014 19 pages.
Official Action for U.S. Appl. No. 13/969,869, mailed Sep. 16, 2014 20 pages.
Official Action for U.S. Appl. No. 13/969,880, mailed Sep. 11, 2014 10 pages.
Official Action for U.S. Appl. No. 13/969,887, mailed Oct. 23, 2014 16 pages.
Official Action for U.S. Appl. No. 13/969,482, mailed Oct. 21, 2004 22 pages.
Official Action for U.S. Appl. No. 13/969,485, mailed Oct. 2, 2014 21 pages.
Official Action for U.S. Appl. No. 13/970,388, mailed Sep. 4, 2014 14 pages.
Official Action for U.S. Appl. No. 13/970,398, mailed Sep. 2, 2014 14 pages.
Official Action for U.S. Appl. No. 13/970,420, mailed Oct. 9, 2014 15 pages.
Official Action for U.S. Appl. No. 13/970,427, mailed Sep. 30, 2014 24 pages.
Official Action for U.S. Appl. No. 13/970,442, mailed Oct. 7, 2014 10 pages.
Official Action for U.S. Appl. No. 13/969,588, mailed Nov. 10, 2014 11 pages.
Official Action for U.S. Appl. No. 13/969,487, mailed Sep. 11, 2014 10 pages.
Official Action for U.S. Appl. No. 13/969,491, mailed Oct. 8, 2014 21 pages.
Official Action for U.S. Appl. No. 13/864,214, mailed Aug. 19, 2014 17 pages.
Official Action for U.S. Appl. No. 13/969,506, mailed Oct. 2, 2014 9 pages.
Official Action for U.S. Appl. No. 13/968,665, mailed Oct. 9, 2014 12 pages.
Official Action for U.S. Appl. No. 13/968,897, mailed Aug. 15, 2014 15 pages.
Official Action for U.S. Appl. No. 13/970,234, mailed Aug. 12, 2014 19 pages.
Official Action for U.S. Appl. No. 13/968,969, mailed Aug. 19, 2014 14 pages.
Official Action for U.S. Appl. No. 13/968,610, mailed Aug. 19, 2014 13 pages.
Official Action for U.S. Appl. No. 13/968,630, mailed Jul. 31, 2014 9 pages.
Official Action for U.S. Appl. No. 13/969,507, mailed Aug. 29, 2014 30 pages.
Official Action for U.S. Appl. No. 13/969,508, mailed Nov. 7, 2014 10 pages.
Official Action for U.S. Appl. No. 13/969,510, mailed Nov. 3, 2014 16 pages.
Official Action for U.S. Appl. No. 13/970,243, mailed Aug. 22, 2014 20 pages.

* cited by examiner

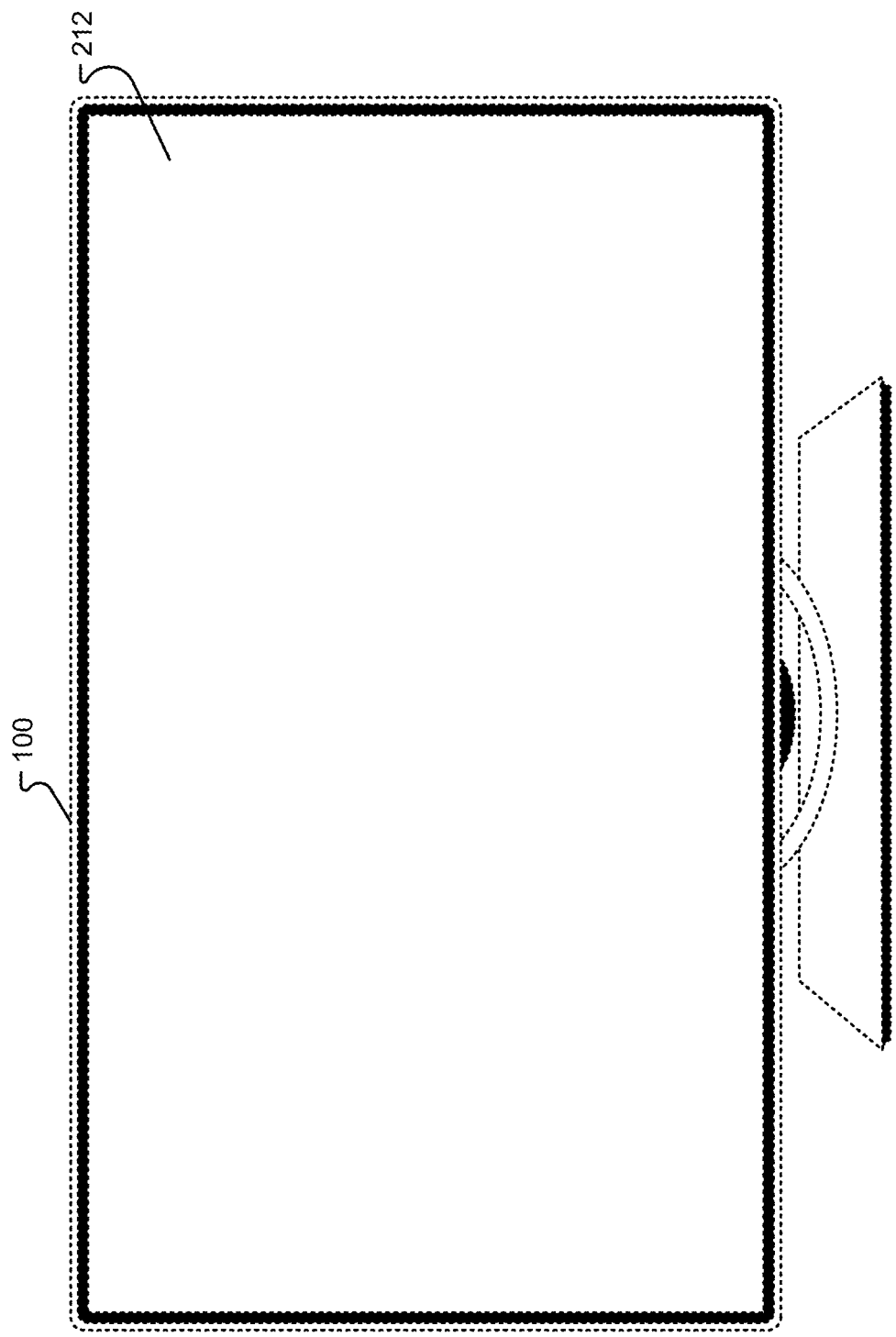

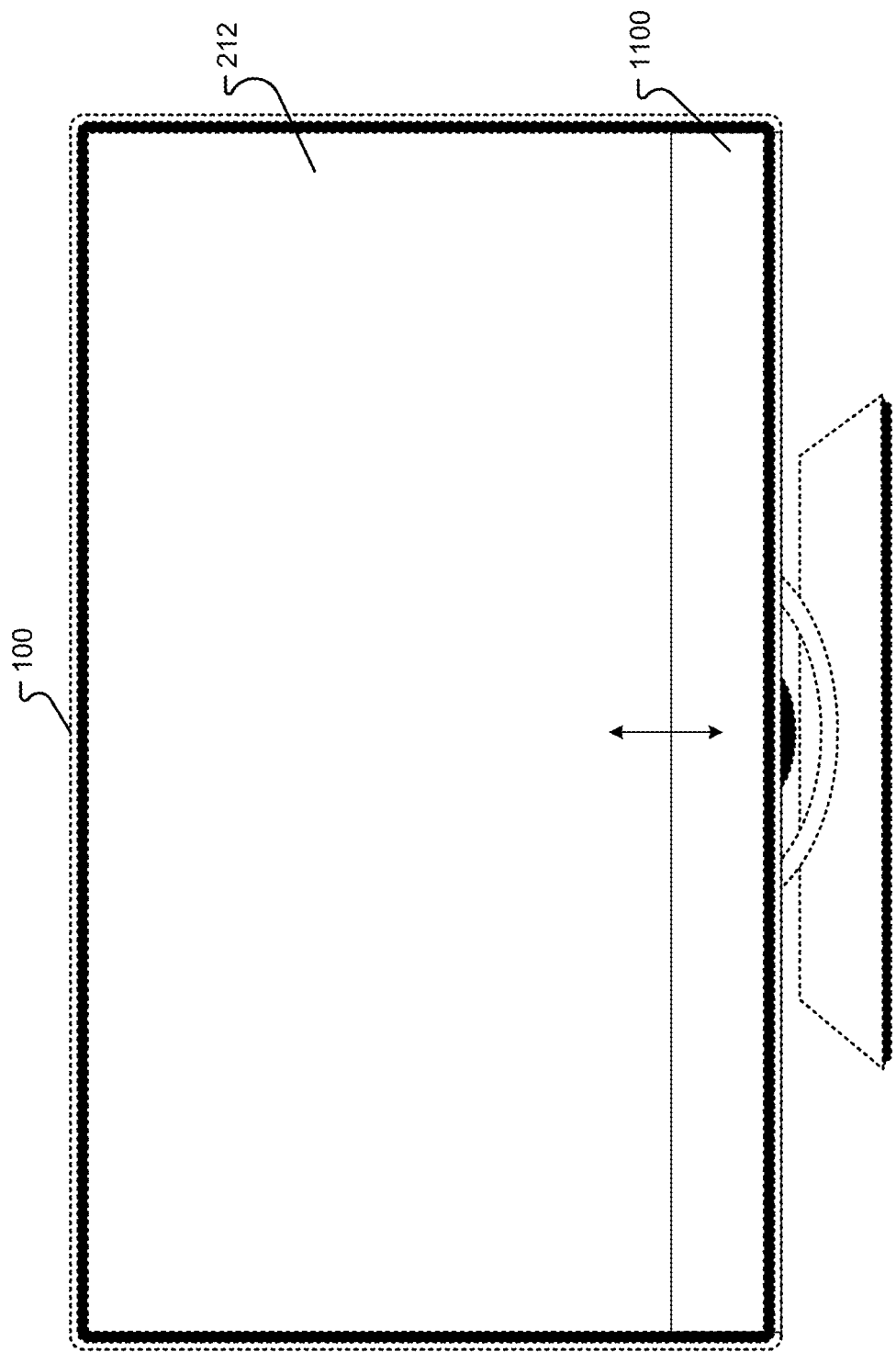

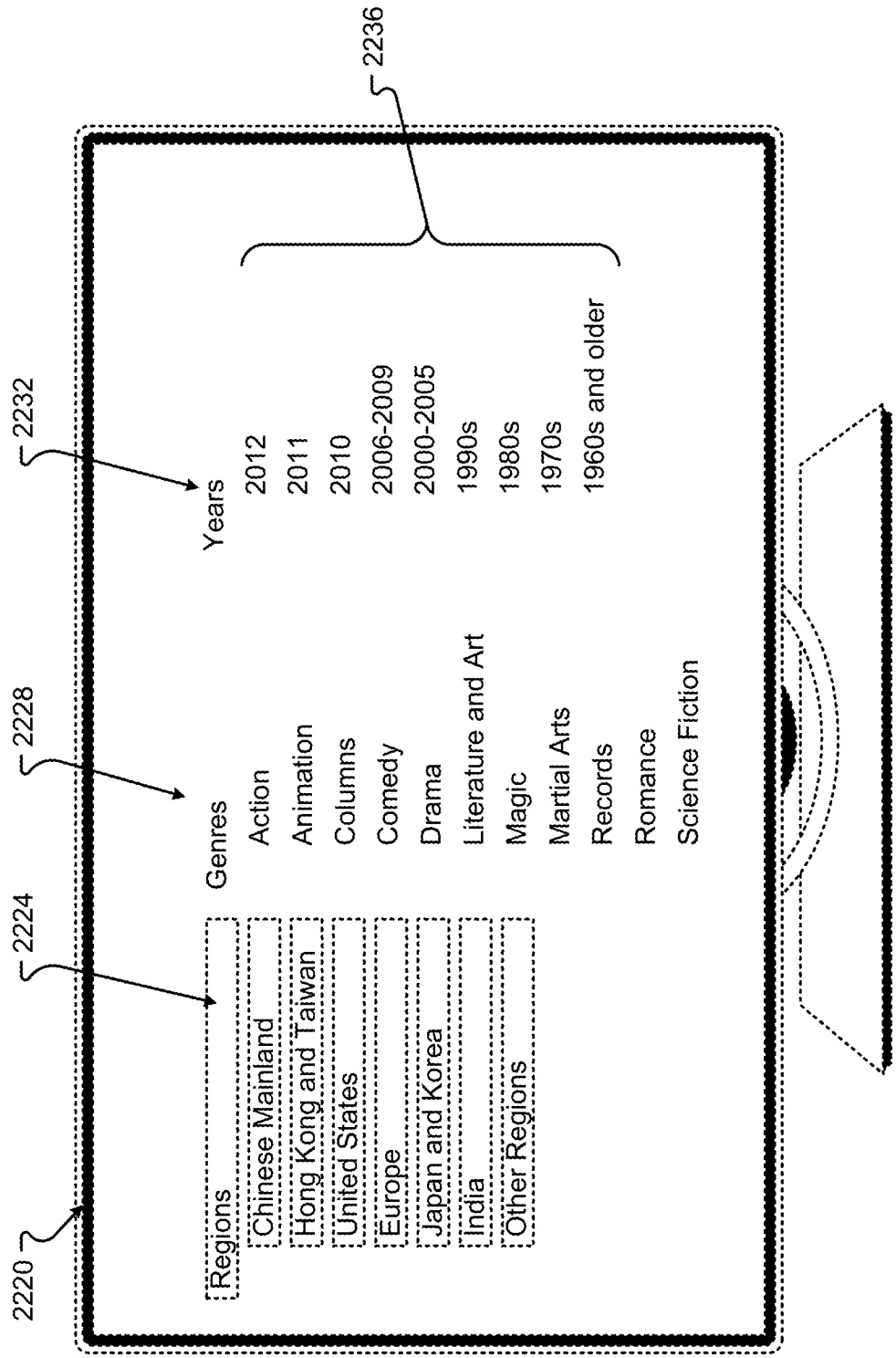

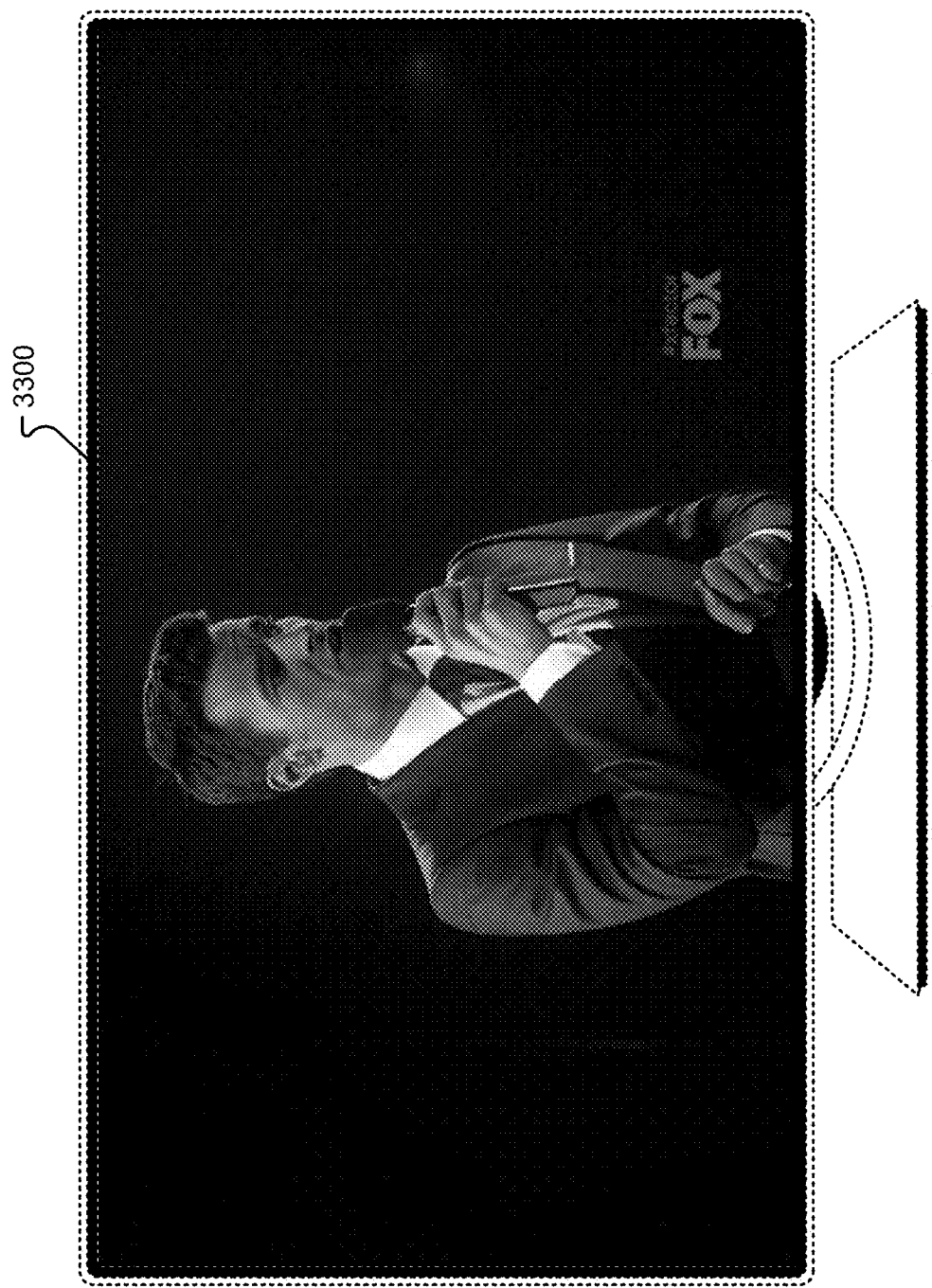

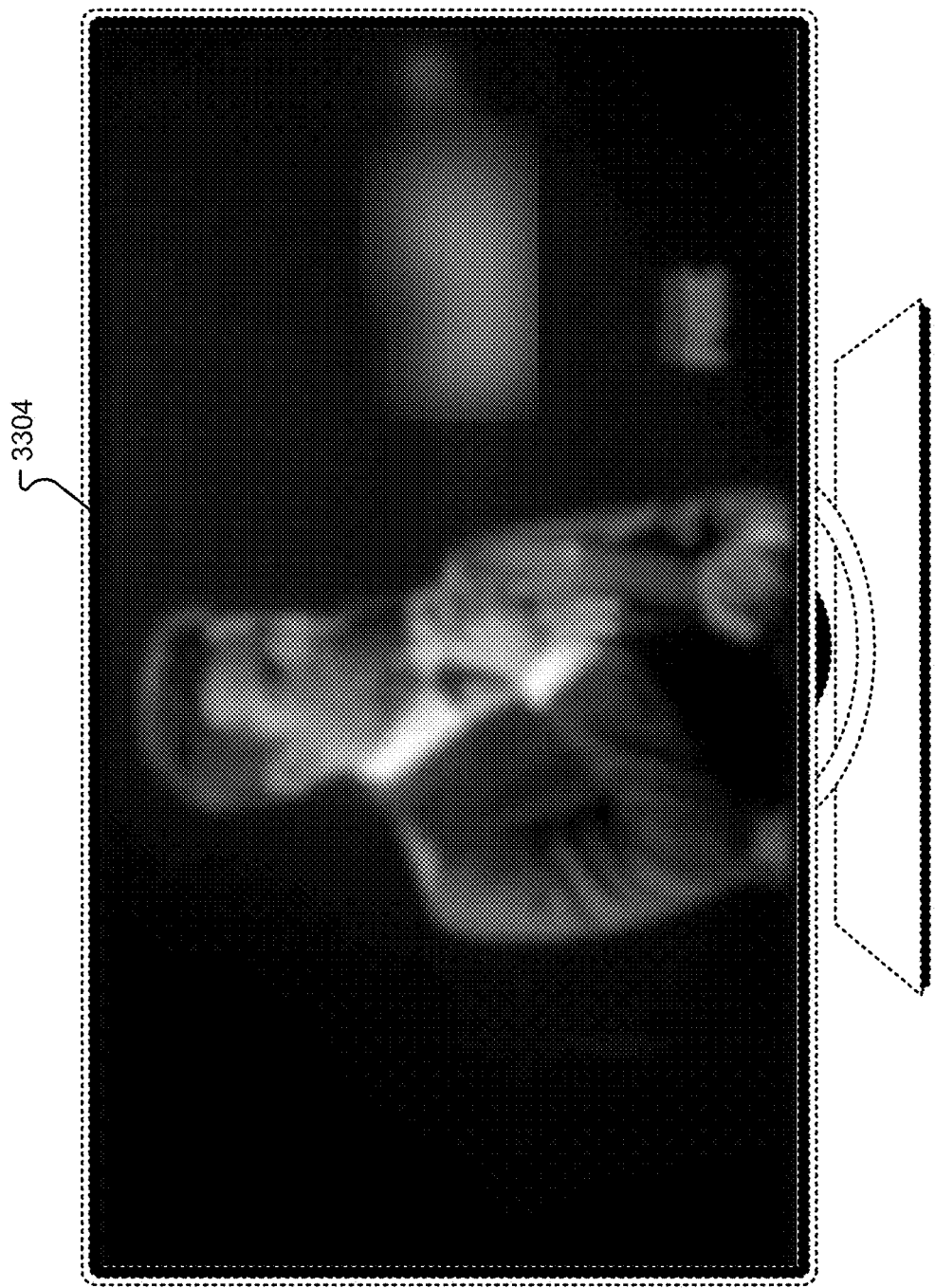

SYSTEMS AND METHODS FOR PROVIDING USER INTERFACES IN AN INTELLIGENT TELEVISION

CROSS REFERENCE TO RELATED APPLICATION

The present application claims the benefits of and priority, under 35 U.S.C. §119(e), to U.S. Provisional Application Ser. Nos. 61/684,672 filed Aug. 17, 2012, "Smart TV"; 61/702,650 filed Sep. 18, 2012, "Smart TV"; 61/697,710 filed Sep. 6, 2012, "Social TV"; 61/700,182 filed Sep. 12, 2012, "Social TV Roadmap"; 61/736,692 filed Dec. 13, 2012, "SmartTV"; 61/798,821 filed Mar. 15, 2013, "SmartTV"; 61/804,942 filed Mar. 25, 2013, "SmartTV"; 61/804,998 filed Mar. 25, 2013, "SmartTV"; 61/804,971 filed Mar. 25, 2013, "SmartTV"; 61/804,990 filed Mar. 25, 2013, "SmartTV"; 61/805,003 filed Mar. 25, 2013, "SmartTV"; 61/805,053 filed Mar. 25, 2013, "SmartTV"; 61/805,030 filed Mar. 25, 2013, "SmartTV"; 61/805,027 filed Mar. 25, 2013, "SmartTV"; 61/805,042 filed Mar. 25, 2013, "SmartTV"; and 61/805,038 filed Mar. 25, 2013, "SmartTV." Each of the aforementioned documents is incorporated herein by reference in their entirety for all that they teach and for all purposes.

BACKGROUND

Consolidation of device features or technological convergence is in an increasing trend. Technological convergence describes the tendency for different technological systems to evolve toward performing similar tasks. As people use more devices, the need to carry those devices, charge those devices, update software on those devices, etc. becomes more cumbersome. To compensate for these problems, technology companies have been integrating features from different devices into one or two multi-functional devices. For example, cellular phones are now capable of accessing the Internet, taking photographs, providing calendar functions, etc.

The consolidation trend is now affecting the design and functionality of devices generally used in the home. For example, audio receivers can access the Internet, digital video recorders can store or provide access to digital photographs, etc. The television in home audio/video systems remains a cornerstone device because the display function cannot be integrated into other devices. As such, consolidating home devices leads to integrating features and functionality into the television. The emergence of the Smart Television (Smart TV) is evidence of the trend to consolidate functionality into the television.

A Smart TV is generally conceived as a device that integrates access to the Internet and Web 2.0 features into television sets. The Smart TV represents the trend of technological convergence between computers and television sets. The Smart TV generally focuses on online interactive media, Internet TV, on-demand streaming media, and generally does not focus on traditional broadcast media. Unfortunately, most Smart TVs have yet to provide seamless and intuitive user interfaces for navigating and/or executing the various features of the Smart TV. As such, there are still issues with the consolidation of features and the presentation of these features in Smart TVs.

SUMMARY

There is a need for an Intelligent TV with intuitive user interfaces and with seamless user interaction capability. These and other needs are addressed by the various aspects, embodiments, and/or configurations of the present disclosure. Also, while the disclosure is presented in terms of exemplary embodiments, it should be appreciated that individual aspects of the disclosure can be separately claimed.

A method for providing a user interface in an intelligent television, the method comprising: receiving, by a processor of the intelligent television, a selection associated with content in the intelligent television; in response to the selection, presenting the user interface associated with the content, wherein the user interface is associated with a first series of user interfaces; receiving a back selection to reverse a navigation through the first series of user interfaces; and presenting a second user interface, wherein the second user interface is in a second series of user interfaces, and wherein the first series of user interfaces is different from the second series of user interfaces.

An aspect of the above method includes wherein the content remains in focus while navigating the first series of the second series.

An aspect of the above method includes wherein the second series is hierarchical.

An aspect of the above method further comprises: determining if the selection is a last selection in the first series; if the selection is the last selection in the first series, presenting the content that is in focus in the user interface; and if the selection is not the last selection in the first series, awaiting a next selection.

An aspect of the above method includes wherein the first series is categorical.

An aspect of the above method includes wherein the first series includes two or more of the following user interfaces in a predetermined order: a regions view, a genres view, a years view, a media player, an on-screen controls view, and an application panel view.

An aspect of the above method includes wherein the second series includes two or more of the following user interfaces in a predetermined order: an application panel view, an on-screen controls view, a media player, a detail view, and a collection view.

An aspect of the above method further comprises: in response to the selection, determining a type of user interface to be displayed; determining a size of the user interface to be display; based on the type and size of the user interface display, populating information into the display; and displaying the populated user interface.

An aspect of the above method includes wherein the size of the user interface includes two or more of large, medium, or small, wherein more information about the content is presented in larger user interfaces.

An aspect of the above method includes wherein the type of user interfaces includes one or more of an electronic programming guide entry, a banner, or a panel, wherein each type of user interface has at least two interfaces of different sizes.

An intelligent television system comprising: a memory operable to store social media data; a processor in communication with the memory, the processor operable to: execute a user interface application, the user interface application operable to: receive, by a processor of the intelligent television, a selection associated with content in the intelligent television; in response to the selection, present the user interface associated with the content, wherein the user interface is associated with a first series of user interfaces; receive a back selection to reverse a navigation through the first series of user interfaces; and present a second user interface, wherein the second user interface is in a second series of user interfaces, and wherein the first series of user interfaces is different from the second series of user interfaces.

An aspect of the above intelligent television system includes wherein the content remains in focus while navigating the first series of the second series, wherein the second series is hierarchical.

An aspect of the above intelligent television system includes, wherein the user interface application is further operable to: determine if the selection is a last selection in the first series; if the selection is the last selection in the first series, present the content that is in focus in the user interface; and if the selection is not the last selection in the first series, await a next selection, wherein the first series is categorical.

An aspect of the above intelligent television system includes wherein the first series includes two or more of the following user interfaces in a predetermined order: a regions view, a genres view, a years view, a media player, an on-screen controls view, and an application panel view, wherein the second series includes two or more of the following user interfaces in a predetermined order: an application panel view, an on-screen controls view, a media player, a detail view, and a collection view.

An aspect of the above intelligent television system includes wherein the user interface application is further operable to: in response to the selection, determine a type of user interface to be displayed; determine a size of the user interface to be display; based on the type and size of the user interface display, populate information into the display; display the populated user interface; wherein the size of the user interface includes two or more of large, medium, or small, wherein more information about the content is presented in larger user interfaces; and wherein the type of user interfaces includes one or more of an electronic programming guide entry, a banner, or a panel, wherein each type of user interface has at least two interfaces of different sizes.

A computer readable medium having stored thereon processor executable instructions that cause a computing system to execute a method, the instructions comprising: instructions to receive, by a processor of the intelligent television, a selection associated with content in the intelligent television; in response to the selection, instructions to present the user interface associated with the content, wherein the user interface is associated with a first series of user interfaces; instructions to receive a back selection to reverse a navigation through the first series of user interfaces; and instructions to present a second user interface, wherein the second user interface is in a second series of user interfaces, and wherein the first series of user interfaces is different from the second series of user interfaces.

An aspect of the above computer readable medium includes wherein the content remains in focus while navigating the first series of the second series, wherein the second series is hierarchical.

An aspect of the above computer readable medium further comprises instructions to: determine if the selection is a last selection in the first series; if the selection is the last selection in the first series, present the content that is in focus in the user interface; and if the selection is not the last selection in the first series, await a next selection, wherein the first series is categorical.

An aspect of the above computer readable medium includes wherein the first series includes two or more of the following user interfaces in a predetermined order: a regions view, a genres view, a years view, a media player, an on-screen controls view, and an application panel view, wherein the second series includes two or more of the following user interfaces in a predetermined order: an application panel view, an on-screen controls view, a media player, a detail view, and a collection view.

An aspect of the above computer readable medium further comprises instructions to: in response to the selection, determine a type of user interface to be displayed; determine a size of the user interface to be display; based on the type and size of the user interface display, populate information into the display; display the populated user interface; wherein the size of the user interface includes two or more of large, medium, or small, wherein more information about the content is presented in larger user interfaces; and wherein the type of user interfaces includes one or more of an electronic programming guide entry, a banner, or a panel, wherein each type of user interface has at least two interfaces of different sizes.

A method for providing a user interface in an intelligent television, the method comprising: receiving, by a processor of the intelligent television, a selection associated with a first navigation bar in the user interface of the intelligent television; determining if a second user interface, associated with the selection, can contain a second navigation bar; if a second user interface, associated with the selection, can contain a second navigation bar, rendering a horizontal navigation bar as the second navigation bar in the second user interface; and if a second user interface, associated with the selection, can not contain a second navigation bar, rendering a different user interface device for the second navigation bar in the second user interface.

An aspect of the above method further comprises determining one or more of a content and a format of the second navigation bar.

An aspect of the above method further comprises determining one or more of a format and a characteristic of the second user interface.

An aspect of the above method includes wherein the determination of if a second user interface, associated with the selection, can contain a second navigation bar comprises comparing one or more of the content and the format of the second navigation bar with one or more of the format and the characteristic of the second user interface.

An aspect of the above method includes wherein if the second navigation bar is too large for the second user interface, the different user interface device is rendered.

An aspect of the above method further comprises presenting the second user interface with the second navigation bar.

An aspect of the above method further comprises: determining if a drop-down navigation bar is needed; if the drop-down navigation bar is needed, rendering the drop-down navigation bar as the second navigation bar; and if the drop-down navigation bar is not needed, rendering a vertical navigation bar as the second navigation bar.

An aspect of the above method includes wherein the drop-down navigation bar includes one or more drop down menus associated with top-level categories presented in the drop-down navigation bar.

An aspect of the above method includes wherein the vertical navigation bar includes categories presented vertically in the second user interface.

An aspect of the above method further comprises presenting the second user interface with the second navigation bar.

An intelligent television system comprising: a memory operable to store social media data; a processor in communication with the memory, the processor operable to: execute a user interface application, the user interface application operable to: receive a selection associated with a first navigation bar in the user interface of the intelligent television; determine if a second user interface, associated with the selection, can contain a second navigation bar; if a second user interface, associated with the selection, can contain a second navigation bar, render a horizontal navigation bar as the second navigation bar in the second user interface; and if a second user interface, associated with the selection, can not contain a second navigation bar, render a different user interface device for the second navigation bar in the second user interface.

An aspect of the above intelligent television system includes wherein the user interface application is further operable to: determine one or more of a content and a format of the second navigation bar; determine one or more of a format and a characteristic of the second user interface; and present the second user interface with the second navigation bar.

An aspect of the above intelligent television system includes wherein the determination of if a second user interface, associated with the selection, can contain a second navigation bar comprises comparing one or more of the content and the format of the second navigation bar with one or more of the format and the characteristic of the second user interface, and wherein if the second navigation bar is too large for the second user interface, the different user interface device is rendered.

An aspect of the above intelligent television system includes wherein the user interface application is further operable to: determine if a drop-down navigation bar is needed; if the drop-down navigation bar is needed, render the drop-down navigation bar as the second navigation bar; if the drop-down navigation bar is not needed, render a vertical navigation bar as the second navigation bar; and wherein the drop-down navigation bar includes one or more drop down menus associated with top-level categories presented in the drop-down navigation bar, and wherein the vertical navigation bar includes categories presented vertically in the second user interface.

An aspect of the above intelligent television system includes wherein the user interface application is further operable to present the second user interface with the second navigation bar.

A computer readable medium having stored thereon processor executable instructions that cause a computing system to execute a method, the instructions comprising: instructions to receive a selection associated with a first navigation bar in the user interface of the intelligent television; instructions to determine if a second user interface, associated with the selection, can contain a second navigation bar; if a second user interface, associated with the selection, can contain a second navigation bar, instructions to render a horizontal navigation bar as the second navigation bar in the second user interface; and if a second user interface, associated with the selection, can not contain a second navigation bar, instructions to render a different user interface device for the second navigation bar in the second user interface.

An aspect of the above computer readable medium further comprises instructions to: determine one or more of a content and a format of the second navigation bar; determine one or more of a format and a characteristic of the second user interface; and present the second user interface with the second navigation bar.

An aspect of the above computer readable medium includes wherein the determination of if a second user interface, associated with the selection, can contain a second navigation bar comprises comparing one or more of the content and the format of the second navigation bar with one or more of the format and the characteristic of the second user interface, and wherein if the second navigation bar is too large for the second user interface, the different user interface device is rendered.

An aspect of the above computer readable medium further comprises instructions to: determine if a drop-down navigation bar is needed; if the drop-down navigation bar is needed, render the drop-down navigation bar as the second navigation bar; if the drop-down navigation bar is not needed, render a vertical navigation bar as the second navigation bar; and wherein the drop-down navigation bar includes one or more drop down menus associated with top-level categories presented in the drop-down navigation bar, and wherein the vertical navigation bar includes categories presented vertically in the second user interface.

An aspect of the above computer readable medium further comprises instructions to present the second user interface with the second navigation bar.

A method for providing a user interface in an intelligent television, the method comprising: receiving an action, by a processor of the intelligent television, wherein the action involves a notification for a user; providing the notification to the user; dismissing the notification; and providing a missing notification icon in the user interface, wherein the missing notification icon persists.

An aspect of the above method further comprises determining whether the user reacts to the notification, wherein the notification is dismissed if the user does not react to the notification.

An aspect of the above method includes wherein a predetermined period of time elapses before the determination that the user did not react to the notification.

An aspect of the above method further comprises: if the user reacts to the notification, receiving a reaction to the notification; providing information about the notification; receiving an action or selection, from the user, based on the information; and conducting an second action based on the user's selection or the user's action.

An aspect of the above method further comprises: determining if the user takes action on the notification icon; if the user takes action on the notification icon, dismissing the notification icon; and if the user does not take action on the notification icon, persisting the notification icon.

An aspect of the above method includes wherein taking action on the notification icon comprises: receiving one of a reaction to the notification icon or a dismissal of the notification icon; if a reaction to the notification is received: providing information about the notification; receiving an action or selection, from the user, based on the information; conducting a second action based on the user's selection or the user's action; and if a dismissal of the notification icon is received, dismissing the notification icon.

An aspect of the above method includes wherein the notification is a user interface display having information about the action.

An aspect of the above method includes wherein the notification icon is an icon in the user interface that does not provide information about the action.

An aspect of the above method includes wherein the notification icon is displayed in a corner of the user interface.

An aspect of the above method includes wherein the notification icon is selectable to view the notification.

An intelligent television system comprising: a memory operable to store social media data; a processor in communication with the memory, the processor operable to: execute a user interface application operable to: receive an action, wherein the action involves a notification for a user; provide the notification to the user; dismiss the notification; and provide a missing notification icon in the user interface, wherein the missing notification icon persists.

An aspect of the above intelligent television system includes wherein the user interface application is further operable to determine whether the user reacts to the notification, wherein the notification is dismissed if the user does not react to the notification, wherein a predetermined period of time elapses before the determination that the user did not react to the notification.

An aspect of the above intelligent television system includes wherein the user interface application is further operable to: if the user reacts to the notification, receive a reaction to the notification; provide information about the notification; receive an action or selection, from the user, based on the information; and conduct an second action based on the user's selection or the user's action.

An aspect of the above intelligent television system includes wherein the user interface application is further operable to: determine if the user takes action on the notification icon, wherein take action on the notification icon comprises: receive one of a reaction to the notification icon or a dismissal of the notification icon; if a reaction to the notification is received: provide information about the notification; receive an action or selection, from the user, based on the information; conduct a second action based on the user's selection or the user's action; if a dismissal of the notification icon is received, dismiss the notification icon; if the user takes action on the notification icon, dismiss the notification icon; and if the user does not take action on the notification icon, persist the notification icon.

An aspect of the above intelligent television system includes wherein the notification is a user interface display having information about the action, wherein the notification icon is an icon in the user interface that does not provide information about the action, wherein the notification icon is displayed in a corner of the user interface, and wherein the notification icon is selectable to view the notification.

A computer readable medium having stored thereon processor executable instructions that cause a computing system to execute a method, the instructions comprising: instructions to receive an action, wherein the action involves a notification for a user; instructions to provide the notification to the user; instructions to dismiss the notification; and instructions to provide a missing notification icon in the user interface, wherein the missing notification icon persists.

An aspect of the above computer readable medium includes wherein the user interface application is further operable to determine whether the user reacts to the notification, wherein the notification is dismissed if the user does not react to the notification, wherein a predetermined period of time elapses before the determination that the user did not react to the notification.

An aspect of the above computer readable medium further comprises instructions to: if the user reacts to the notification, receive a reaction to the notification; provide information about the notification; receive an action or selection, from the user, based on the information; and conduct an second action based on the user's selection or the user's action.

An aspect of the above computer readable medium further comprises instructions to: determine if the user takes action on the notification icon, wherein take action on the notification icon comprises: receive one of a reaction to the notification icon or a dismissal of the notification icon; if a reaction to the notification is received: provide information about the notification; receive an action or selection, from the user, based on the information; conduct a second action based on the user's selection or the user's action; if a dismissal of the notification icon is received, dismiss the notification icon; if the user takes action on the notification icon, dismiss the notification icon; and if the user does not take action on the notification icon, persist the notification icon.

An aspect of the above computer readable medium includes wherein the notification is a user interface display having information about the action, wherein the notification icon is an icon in the user interface that does not provide information about the action, wherein the notification icon is displayed in a corner of the user interface, and wherein the notification icon is selectable to view the notification.

A method for providing a user interface in an intelligent television, the method comprising: receiving a selection, by a processor of the intelligent television; providing the user interface, wherein the user interface includes at least two regions; receiving a second selection in the user interface; and providing an action, by the processor of the intelligent television, based on a location, within one of the at least two regions, in which the second selection was received.

An aspect of the above method further comprises determining in which of the at least two regions the second selection is made.

An aspect of the above method includes wherein the user interface includes three regions.

An aspect of the above method includes wherein the three regions include a header region, a footer region, and a content region.

An aspect of the above method includes wherein each of the three regions includes one or more user-selectable user interface devices.

An aspect of the above method includes wherein at least one of the user-selectable user interface devices in each of the three regions is common amongst two or more different user interfaces.

An aspect of the above method includes wherein the user interface is a master panel for the intelligent television, wherein the master panel is a top level user interface.

An aspect of the above method includes wherein selections available in each region are contextual.

An aspect of the above method includes wherein the header includes a navigation bar and title elements, wherein the content region includes a content layout and a scroll item, and wherein the footer region includes system and contextual information and hot key related events.

An aspect of the above method includes wherein the action taken in based on both what was selected and in what region the selection was made.

An intelligent television system comprising: a memory operable to store social media data; a processor in communication with the memory, the processor operable to: execute a live television subservice operable to: receive a selection; provide the user interface, wherein the user interface includes at least two regions; receive a second selection in the user interface; and provide an action, based on a location, within one of the at least two regions, in which the second selection was received.

An aspect of the above intelligent television system includes wherein the user interface application is further operable to determine in which of the at least two regions the second selection is made, wherein the user interface includes three regions, wherein the three regions include a header region, a footer region, and a content region, wherein each of the three regions includes one or more user-selectable user interface devices, wherein at least one of the user-selectable user interface devices in each of the three regions is common amongst two or more different user interfaces.

An aspect of the above intelligent television system includes wherein the user interface is a master panel for the intelligent television, wherein the master panel is a top level user interface, wherein selections available in each region are contextual.

An aspect of the above intelligent television system includes wherein the header includes a navigation bar and title elements, wherein the content region includes a content layout and a scroll item, and wherein the footer region includes system and contextual information and hot key related events.

An aspect of the above intelligent television system includes wherein the action taken in based on both what was selected and in what region the selection was made.

A computer readable medium having stored thereon processor executable instructions that cause a computing system to execute a method, the instructions comprising: instructions to receive a selection; instructions to provide the user interface, wherein the user interface includes at least two regions; instructions to receive a second selection in the user interface; and instructions to provide an action based on a location, within one of the at least two regions, in which the second selection was received.

An aspect of the above computer readable medium further comprises instructions to determine in which of the at least two regions the second selection is made, wherein the user interface includes three regions, wherein the three regions include a header region, a footer region, and a content region, wherein each of the three regions includes one or more user-selectable user interface devices, wherein at least one of the user-selectable user interface devices in each of the three regions is common amongst two or more different user interfaces.

An aspect of the above computer readable medium includes wherein the user interface is a master panel for the intelligent television, wherein the master panel is a top level user interface, wherein selections available in each region are contextual.

An aspect of the above computer readable medium includes wherein the header includes a navigation bar and title elements, wherein the content region includes a content layout and a scroll item, and wherein the footer region includes system and contextual information and hot key related events.

An aspect of the above computer readable medium includes wherein the action taken in based on both what was selected and in what region the selection was made.

A method for providing a user interface in an intelligent television, the method comprising: receiving, by a processor of the intelligent television, a selection in the user interface for the intelligent television; determining a selection characteristic for the selection; determining a content characteristic for the content associated with the selection; and based on the selection characteristic and the content characteristic, affecting a change in the user interface.

An aspect of the above method includes wherein the content characteristic is a type of content being displayed in the user interface.

An aspect of the above method includes wherein the content includes a picture.

An aspect of the above method includes wherein the picture has a configuration characteristic.

An aspect of the above method further comprises changing a thumbnail representing the picture in a user interface device, wherein the thumbnail has a configuration that mimics the picture configuration.

An aspect of the above method includes wherein the picture configuration is one of portrait, landscape, or undefined.

An aspect of the above method includes wherein the user interface device is a social media message having the picture associated therewith.

An aspect of the above method includes wherein the selection characteristic is a transition between channels of live television.

An aspect of the above method further comprises blurring content currently being displayed.

An aspect of the above method includes wherein a second content is displayed on the intelligent television from a next channel of live television after the content is blurred.

An intelligent television system comprising: a memory operable to store social media data; a processor in communication with the memory, the processor operable to execute a statistics subservice operable to: execute an user interface application operable to: receive a selection in the user interface for the intelligent television; determine a selection characteristic for the selection; determine a content characteristic for the content associated with the selection; and based on the selection characteristic and the content characteristic, affect a change in the user interface.

An aspect of the above intelligent television system includes wherein the content characteristic is a type of content being displayed in the user interface, wherein the content includes a picture, and wherein the picture has a configuration characteristic.

An aspect of the above intelligent television system includes wherein the user interface application is further operable to change a thumbnail representing the picture in a user interface device, wherein the thumbnail has a configuration that mimics the picture configuration, wherein the picture configuration is one of portrait, landscape, or undefined.

An aspect of the above intelligent television system includes wherein the user interface device is a social media message having the picture associated therewith, and wherein the selection characteristic is a transition between channels of live television.

An aspect of the above intelligent television system includes wherein the user interface application is further operable to blur content currently being displayed, wherein a second content is displayed on the intelligent television from a next channel of live television after the content is blurred.

A computer readable medium having stored thereon processor executable instructions that cause a computing system to execute a method, the instructions comprising: instructions to receive a selection in the user interface for the intelligent television; instructions to determine a selection characteristic for the selection; instructions to determine a content characteristic for the content associated with the selection; and based on the selection characteristic and the content characteristic, instructions to affect a change in the user interface.

An aspect of the above computer readable medium includes wherein the content characteristic is a type of content being displayed in the user interface, wherein the content includes a picture, and wherein the picture has a configuration characteristic.

An aspect of the above computer readable medium further comprises instructions to change a thumbnail representing the picture in a user interface device, wherein the thumbnail has a configuration that mimics the picture configuration, wherein the picture configuration is one of portrait, landscape, or undefined.

An aspect of the above computer readable medium includes wherein the user interface device is a social media message having the picture associated therewith, and wherein the selection characteristic is a transition between channels of live television.

An aspect of the above computer readable medium further comprises instructions to blur content currently being displayed, wherein a second content is displayed on the intelligent television from a next channel of live television after the content is blurred.

A method for providing one of two types of user interfaces in an intelligent television, the method comprising: receiving a selection for the user interface, wherein the user interface provides information about content; determining a type of user interface selection; providing a first user interface for a first type of selection; and providing a second user interface for a second type of selection.

An aspect of the above method includes wherein the first type of selection is for a content selection user interface.

An aspect of the above method includes wherein the first user interface is a Fibonacci view.

An aspect of the above method includes wherein the Fibonacci view provides selectable content thumbnails arranged in a Fibonacci spiral.

An aspect of the above method includes wherein the thumbnails are arranged in the Fibonacci spiral based on a characteristic of the content associated with the thumbnail.

An aspect of the above method includes wherein the characteristic is one or more of an amount of content, a most viewed statistic, a newest statistic, or a most favorite statistic.

An aspect of the above method includes wherein the second type of selection is for a timeline user interface.

An aspect of the above method includes wherein the second user interface is a timeline view.

An aspect of the above method includes wherein the timeline view provides selectable content thumbnails arranged in timeline from oldest content at a first side of the timeline view to newest content at a second side of the timeline view.

An aspect of the above method includes wherein the timeline view includes a demarcation to indicate a change in date to which the content is associated.

An intelligent television system comprising: a memory operable to store social media data; a processor in communication with the memory, the processor operable to execute a statistics subservice operable to: execute an user interface application operable to: receive a selection for the user interface, wherein the user interface provides information about content; determine a type of user interface selection; provide a first user interface for a first type of selection; and provide a second user interface for a second type of selection.

An aspect of the above intelligent television system includes wherein the first type of selection is for a content selection user interface, wherein the first user interface is a Fibonacci view, and wherein the Fibonacci view provides selectable content thumbnails arranged in a Fibonacci spiral.

An aspect of the above intelligent television system includes wherein the thumbnails are arranged in the Fibonacci spiral based on a characteristic of the content associated with the thumbnail, and wherein the characteristic is one or more of an amount of content, a most viewed statistic, a newest statistic, or a most favorite statistic.

An aspect of the above intelligent television system includes wherein the second type of selection is for a timeline user interface, wherein the second user interface is a timeline view, and wherein the timeline view provides selectable content thumbnails arranged in timeline from oldest content at a first side of the timeline view to newest content at a second side of the timeline view.

An aspect of the above intelligent television system includes wherein the timeline view includes a demarcation to indicate a change in date to which the content is associated.

A computer readable medium having stored thereon processor executable instructions that cause a computing system to execute a method, the instructions comprising: instructions to receive a selection for the user interface, wherein the user interface provides information about content; instructions to determine a type of user interface selection; instructions to provide a first user interface for a first type of selection; and instructions to provide a second user interface for a second type of selection.

An aspect of the above computer readable medium includes wherein the first type of selection is for a content selection user interface, wherein the first user interface is a Fibonacci view, and wherein the Fibonacci view provides selectable content thumbnails arranged in a Fibonacci spiral.

An aspect of the above computer readable medium includes wherein the thumbnails are arranged in the Fibonacci spiral based on a characteristic of the content associated with the thumbnail, and wherein the characteristic is one or more of an amount of content, a most viewed statistic, a newest statistic, or a most favorite statistic.

An aspect of the above computer readable medium includes wherein the second type of selection is for a timeline user interface, wherein the second user interface is a timeline view, and wherein the timeline view provides selectable content thumbnails arranged in timeline from oldest content at a first side of the timeline view to newest content at a second side of the timeline view.

An aspect of the above computer readable medium includes wherein the timeline view includes a demarcation to indicate a change in date to which the content is associated.

A method for providing a user interface in an intelligent television, the method comprising: receiving, by a processor of the intelligent television, a selection for an unrelated search, wherein the user interface of the intelligent television is displaying a first content, and wherein the unrelated search does not apply to the first content; and providing a search panel above a portion of the content to search for a second content.

An aspect of the above method further comprises receiving search terms in the search panel that are associated with the second content.

An aspect of the above method further comprises continuing to display the first content while receiving the search terms.

An aspect of the above method further comprises continuing to display the first content while searching for the second content.

An aspect of the above method further comprises providing search results based on the search terms and associated with the second content.

An aspect of the above method further comprises continuing to display the first content while providing the search results.

An aspect of the above method includes wherein the first content is a first live television program, and the second content is a second live television program.

An aspect of the above method includes wherein the search panel includes an area to receive the search terms.

An aspect of the above method includes wherein the search panel includes a second area to provide two or more search results.

An aspect of the above method includes wherein the search panel is provided to a side of the user interface, wherein the search panel partially obstructs a view of the first content, and wherein the first content is viewed in a second portion of the user interface to the right of the search panel.

An intelligent television system comprising: a memory operable to store social media data; a processor in communication with the memory, the processor operable to execute a statistics subservice operable to: execute an user interface application operable to: receive a selection for an unrelated search, wherein the user interface of the intelligent television is displaying a first content, and wherein the unrelated search does not apply to the first content; and provide a search panel above a portion of the content to search for a second content.

An aspect of the above intelligent television system includes wherein the user interface application is further operable to: receive search terms in the search panel that are associated with the second content; continue to display the first content while receiving the search terms; continue to display the first content while searching for the second content; provide search results based on the search terms and associated with the second content; and continue to display the first content while providing the search results.

An aspect of the above intelligent television system includes wherein the first content is a first live television program, and the second content is a second live television program.

An aspect of the above intelligent television system includes wherein the search panel includes an area to receive the search terms, and wherein the search panel includes a second area to provide two or more search results.

An aspect of the above intelligent television system includes wherein the search panel is provided to a side of the user interface, wherein the search panel partially obstructs a view of the first content, and wherein the first content is viewed in a second portion of the user interface to the right of the search panel.

A computer readable medium having stored thereon processor executable instructions that cause a computing system to execute a method, the instructions comprising: instructions to receive a selection for an unrelated search, wherein the user interface of the intelligent television is displaying a first content, and wherein the unrelated search does not apply to the first content; and instructions to provide a search panel above a portion of the content to search for a second content.

An aspect of the above computer readable medium further comprises instructions to: receive search terms in the search panel that are associated with the second content; continue to display the first content while receiving the search terms; continue to display the first content while searching for the second content; provide search results based on the search terms and associated with the second content; and continue to display the first content while providing the search results.

An aspect of the above computer readable medium includes wherein the first content is a first live television program, and the second content is a second live television program.

An aspect of the above computer readable medium includes wherein the search panel includes an area to receive the search terms, and wherein the search panel includes a second area to provide two or more search results.

An aspect of the above computer readable medium includes wherein the search panel is provided to a side of the user interface, wherein the search panel partially obstructs a view of the first content, and wherein the first content is viewed in a second portion of the user interface to the right of the search panel.

The systems and methods herein provide new user interfaces for processes associated with the Intelligent TV. The user interfaces have an intuitive layout, structure, organization, and methodology. Thus, the user can more easily learn and navigate the options of the Intelligent TV.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

A "blog" (a blend of the term web log) is a type of website or part of a website supposed to be updated with new content from time to time. Blogs are usually maintained by an individual with regular entries of commentary, descriptions of events, or other material such as graphics or video. Entries are commonly displayed in reverse-chronological order.

A "blogging service" is a blog-publishing service that allows private or multi-user blogs with time-stamped entries.

The term "cable TV" refers to a system of distributing television programs to subscribers via radio frequency (RF) signals transmitted through coaxial cables or light pulses through fiber-optic cables. This contrasts with traditional broadcast television (terrestrial television) in which the television signal is transmitted over the air by radio waves and received by a television antenna attached to the television.

The term "channel" or "television channel," as used herein, can be a physical or virtual channel over which a television station or television network is distributed. A physical cannel in analog television can be an amount of bandwidth, typically 6, 7, or 8 MHz, that occupies a predetermine channel frequency. A virtual channel is a representation, in cable or satellite television, of a data stream for a particular television media provider (e.g., CDS, TNT, HBO, etc.).

The term "computer-readable medium," as used herein, refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "enhanced television" (ETV) refers to a collection of specifications developed under the OpenCable project of CableLabs (Cable Television Laboratories, Inc.) that define an ETV Application consisting of resources (files) adhering to the Enhanced TV Binary Interchange Format (EBIF) content format as well as PNG images, JPEG images, and PFR downloadable fonts. An ETV application is normally delivered through an MPEG transport stream and accompanies an MPEG program containing video and audio elementary streams. An "ETV Application" is a collection of resources (files) that include one or more EBIF resources that represent viewable information in the form of pages. Two forms of a given ETV Application may be distinguished: (1) an interchange form and (2) an execution form. The interchange form of an ETV Application consists of the resources (files) that represent the compiled application prior to its actual execution by an ETV User Agent. The execution form of an ETV Application consists of the stored, and possibly mutated forms of these resources while being decoded, presented, and executed by an ETV User Agent. An "ETV User Agent" is a software component that operates on a set-top box, a television, or any other computing environment capable of receiving, decoding, presenting, and processing an ETV Application. This component usually provides, along with its host hardware environment, one or more mechanisms for an end-user to navigate and interact with the multimedia content represented by ETV Applications.

The term "high-definition television" (HDTV) provides a resolution that is substantially higher than that of standard-definition television. HDTV may be transmitted in various formats, namely 1080p-1920×1080p: 2,073,600 pixels (approximately 2.1 megapixels) per frame, 1080i (which is typically either 1920×1080i: 1,036,800 pixels (approximately 1 megapixel) per field or 2,073,600 pixels (approximately 2.1 megapixels) per frame or 1440×1080i:[1] 777,600 pixels (approximately 0.8 megapixels) per field or 1,555,200 pixels (approximately 1.6 megapixels) per frame), or 720p-1280× 720p: 921,600 pixels (approximately 0.9 megapixels) per frame. As will be appreciated, "frame size" in pixels is defined as number of horizontal pixels×number of vertical pixels, for example 1280×720 or 1920×1080. Often the number of horizontal pixels is implied from context and is omitted, as in the case of 720p and 1080p, "scanning system" is identified with the letter "p" for progressive scanning or "i" for interlaced scanning, and "frame rate" is identified as number of video frames per second. For interlaced systems an alternative form of specifying number of fields per second is often used. For purposes of this disclosure, "high-definition television" is deemed to include other high-definition analog or digital video formats, including ultra high definition television.

The term "internet television" (otherwise known as Internet TV, Online Television, or Online TV) is the digital distribution of television content via the Internet. It should not be confused with Web television—short programs or videos created by a wide variety of companies and individuals, or Internet protocol television (IPTV)—an emerging internet technology standard for use by television broadcasters. Internet Television is a general term that covers the delivery of television shows and other video content over the internet by video streaming technology, typically by major traditional television broadcasters. It does not describe a technology used to deliver content (see Internet protocol television). Internet television has become very popular through services such as RTE Player in Ireland; BBC iPlayer, 4oD, ITV Player (also STV Player and UTV Player) and Demand Five in the United Kingdom; Hutu in the United States; Nederland 24 in the Netherlands; ABC iview and Australia Live TV in Australia; Tivibu in Turkey; and iWanTV! in the Philippines.

The term "internet protocol television" (IPTV) refers to a system through which television services are delivered using the Internet protocol suite over a packet-switched network such as the Internet, instead of being delivered through traditional terrestrial, satellite signal, and cable television formats. IPTV services may be classified into three main groups, namely live television, with or without interactivity related to the current TV show; time-shifted television: catch-up TV (replays a TV show that was broadcast hours or days ago), start-over TV (replays the current TV show from its beginning); and video on demand (VOD): browse a catalog of videos, not related to TV programming IPTV is distinguished from Internet television by its on-going standardization process (e.g., European Telecommunications Standards Institute) and preferential deployment scenarios in subscriber-based telecommunications networks with high-speed access channels into end-user premises via set-top boxes or other customer-premises equipment.

The term "silo," as used herein, can be a logical representation of an input, source, or application. An input can be a device or devices (e.g., DVD, VCR, etc.) electrically connected to the television through a port (e.g., HDMI, video/audio inputs, etc.) or through a network (e.g., LAN WAN, etc.). Rather than a device or devices, the input could be configured as an electrical or physical connection to one or more devices. A source, particularly a content source, can be a data service that provides content (e.g., a media center, a file system, etc.). An application can be a software service that provides a particular type of function (e.g., Live TV, Video on Demand, User Applications, photograph display, etc.). The silo, as a logical representation, can have an associated definition or property, such as a setting, feature, or other characteristic.

The term "panel," as used herein, can mean a user interface displayed in at least a portion of the display. The panel may be interactive (e.g., accepts user input) or informational (e.g., does not accept user input). A panel may be translucent whereby the panel obscures but does not mask the underlying content being displayed in the display. Panels may be provided in response to a user input from a button or remote control interface.

The term "screen," as used herein, refers to a physical structure that includes one or more hardware components that provide the device with the ability to render a user interface and/or receive user input. A screen can encompass any combination of gesture capture region, a touch sensitive display, and/or a configurable area. The device can have one or more physical screens embedded in the hardware. However a screen may also include an external peripheral device that may be attached and detached from the device. In embodiments, multiple external devices may be attached to the device. For example, another screen may be included with a remote control unit that interfaces with the Intelligent TV.

The term "media" of "multimedia," as used herein, refers to content that may assume one of a combination of different content forms. Multimedia can include one or more of, but is not limited to, text, audio, still images, animation, video, or interactivity content forms.

The term "Intelligent TV," as used herein, refers to a television configured to provide one or more intuitive user interfaces and interactions based on a unique application platform and architecture. The Intelligent TV utilizes processing resources associated with the television to integrate Internet connectivity with parallel application functionality. This integration allows a user the ability to intuitively access various sources of media and content (e.g., Internet, over-the-top content, on-demand streaming media, over-the-air broadcast media, and/or other forms of information) via the Intelligent TV in a quick and efficient manner. The Intelligent TV can be a soft television. Although the Intelligent TV disclosed herein may comprise one or more components of a "smart TV," it is an aspect of the Intelligent TV to provide expanded intuitive user interaction capability for navigating and executing the various features of the television. A "smart TV," sometimes referred to as a connected TV, or hybrid TV (not to be confused with IPTV, Internet TV, or with Web TV), describes a trend of integration of the Internet and Web 2.0 features into television sets and set-top boxes, as well as the technological convergence between computers and these television sets/set-top boxes. The smart TV devices have a higher focus on online interactive media, Internet TV, over-the-top content, as well as on-demand streaming media, and less focus on traditional broadcast media than traditional television sets and set-top boxes. As can be appreciated, the Intelligent TV encompasses a broader range of technology than that of the smart TV defined above.

The term "television" is a telecommunication medium, device (or set) or set of associated devices, programming, and/or transmission for transmitting and receiving moving images that can be monochrome (black-and-white) or colored, with or without accompanying sound. Different countries use one of the three main video standards for TVs, namely PAL, NTSC or SECAM. Television is most commonly used for displaying broadcast television signals. The broadcast television system is typically disseminated via radio transmissions on designated channels in the 54-890 MHz frequency band. A common television set comprises multiple internal electronic circuits, including those for receiving and decoding broadcast signals. A visual display device which lacks a tuner is properly called a video monitor, rather than a television. A television may be different from other monitors or displays based on the distance maintained between the user and the television when the user watches the media and based on the inclusion of a tuner or other electronic circuit to receive the broadcast television signal.

The term "Live TV," as used herein, refers to a television production broadcast in real-time, as events happen, in the present.

The term "standard-definition television" (SDTV) is a television system that uses a resolution that is not considered to be either high-definition television (HDTV 720p and 1080p) or enhanced-definition television (EDTV 480p). The two common SDTV signal types are 576i, with 576 interlaced lines of resolution, derived from the European-developed PAL and SECAM systems; and 480i based on the American National Television System Committee NTSC system. In the US, digital SDTV is broadcast in the same 4:3 aspect ratio as NTSC signals. However, in other parts of the world that used the PAL or SECAM analog standards, standard-definition television is now usually shown with a 16:9 aspect ratio. Standards that support digital SDTV broadcast include DVB, ATSC and ISDB. Television signals are transmitted in digital form, and their pixels have a rectangular shape, as opposed to square pixels that are used in modern computer monitors and modern implementations of HDTV. The table below summarizes pixel aspect ratios for various kinds of SDTV video signal. Note that the actual image (be it 4:3 or 16:9) is always contained in the center 704 horizontal pixels of the digital frame, regardless of how many horizontal pixels (704 or 720) are used. In case of digital video signal having 720 horizontal pixels, only the center 704 pixels contain actual 4:3 or 16:9 image, and the 8 pixel wide stripes from either side are called nominal analogue blanking and should be discarded before displaying the image. Nominal analogue blanking should not be confused with overscan, as overscan areas are part of the actual 4:3 or 16:9 image.

The term "video on demand (VOD)," as used herein, refers to systems and processes which allow users to select and watch/listen to video or audio content on demand. VOD systems may stream content, to view the content in real time, or download the content to a storage medium for viewing at a later time.

The term "satellite positioning system receiver" refers to a wireless receiver or transceiver to receive and/or send location signals from and/or to a satellite positioning system, such as the Global Positioning System ("GPS") (US), GLONASS (Russia), Galileo positioning system (EU), Compass navigation system (China), and Regional Navigational Satellite System (India).

The term "display," as used herein, refers to at least a portion of a screen used to display the output of the television to a user. A display may be a single-screen display or a multi-screen display, referred to as a composite display. A composite display can encompass the touch sensitive display of one or more screens. A single physical screen can include multiple displays that are managed as separate logical displays. Thus, different content can be displayed on the separate displays although part of the same physical screen.

The term "displayed image," as used herein, refers to an image produced on the display. A typical displayed image is a television broadcast or menu. The displayed image may occupy all or a portion of the display.

The term "display orientation," as used herein, refers to the way in which a rectangular display is oriented by a user for viewing. The two most common types of display orientation are portrait and landscape. In landscape mode, the display is oriented such that the width of the display is greater than the height of the display (such as a 4:3 ratio, which is 4 units wide and 3 units tall, or a 16:9 ratio, which is 16 units wide and 9 units tall). Stated differently, the longer dimension of the display is oriented substantially horizontal in landscape mode while the shorter dimension of the display is oriented substantially vertical. In the portrait mode, by contrast, the display is oriented such that the width of the display is less than the height of the display. Stated differently, the shorter dimension of the display is oriented substantially horizontal in the portrait mode while the longer dimension of the display is oriented substantially vertical.

The term "module," as used herein, refers to any known or later developed hardware, software, firmware, artificial intelligence, fuzzy logic, or combination of hardware and software that is capable of performing the functionality associated with that element.

The terms "determine," "calculate" and "compute," and variations thereof, as used herein, are used interchangeably and include any type of methodology, process, mathematical operation or technique.

The term "touch screen" or "touchscreen" refer to screen that can receive user contact or other tactile input, such as a stylus. The touch screen may sense user contact in a number of different ways, such as by a change in an electrical parameter (e.g., resistance or capacitance), acoustic wave variations, infrared radiation proximity detection, light variation detection, and the like. In a resistive touch screen, for example, normally separated conductive and resistive metallic layers in the screen pass an electrical current. When a user touches the screen, the two layers make contact in the contacted location, whereby a change in electrical field is noted and the coordinates of the contacted location calculated. In a capacitive touch screen, a capacitive layer stores electrical charge, which is discharged to the user upon contact with the touch screen, causing a decrease in the charge of the capacitive layer. The decrease is measured, and the contacted location coordinates determined. In a surface acoustic wave touch screen, an acoustic wave is transmitted through the screen, and the acoustic wave is disturbed by user contact. A receiving transducer detects the user contact instance and determines the contacted location coordinates.

The term "web television" is original television content produced for broadcast via the World Wide Web. Some major distributors of web television are YouTube, Myspace, Newgrounds, Blip.tv, and Crackle.

The terms "instant message" and "instant messaging" refer to a form of real-time text communication between two or more people, typically based on typed text.

The term "internet search engine" refers to a web search engine designed to search for information on the World Wide Web and FTP servers. The search results are generally presented in a list of results often referred to as SERPS, or "search engine results pages". The information may consist of web pages, images, information and other types of files. Some search engines also mine data available in databases or open directories. Web search engines work by storing information about many web pages, which they retrieve from the html itself. These pages are retrieved by a Web crawler (sometimes also known as a spider)—an automated Web browser which follows every link on the site. The contents of each page are then analyzed to determine how it should be indexed (for example, words are extracted from the titles, headings, or special fields called meta tags). Data about web pages are stored in an index database for use in later queries. Some search engines, such as Google™, store all or part of the source page (referred to as a cache) as well as information about the web pages, whereas others, such as AltaVista™, store every word of every page they find.

The terms "online community", "e-community", or "virtual community" mean a group of people that primarily interact via a computer network, rather than face to face, for social, professional, educational or other purposes. The interaction can use a variety of media formats, including wilds, blogs, chat rooms, Internet forums, instant messaging, email, and other forms of electronic media. Many media formats are used in social software separately or in combination, including text-based chatrooms and forums that use voice, video text or avatars.

The term "remote control" refers to a component of an electronics device, most commonly a television set, DVD player and/or home theater system for operating the device wirelessly, typically from a short line-of-sight distance. Remote control normally uses infrared and/or radio frequency (RF) signaling and can include WiFi, wireless USB, Bluetooth™ connectivity, motion sensor enabled capabilities and/or voice control. A touchscreen remote control is a handheld remote control device which uses a touchscreen user interface to replace most of the hard, built-in physical buttons used in normal remote control devices.

The term "satellite TV" refers to television programming delivered by the means of communications satellites and received by an outdoor antenna, usually a parabolic reflector generally referred to as a satellite dish, and as far as household usage is concerned, a satellite receiver either in the form of an external set-top box or a satellite tuner module built into a TV set.

The term "social network service" is a service provider that builds online communities of people, who share interests and/or activities, or who are interested in exploring the interests and activities of others. Most social network services are web-based and provide a variety of ways for users to interact, such as e-mail and instant messaging services.

The term "social network" refers to a web-based social network.

The term "gesture" refers to a user action that expresses an intended idea, action, meaning, result, and/or outcome. The user action can include manipulating a device (e.g., opening or closing a device, changing a device orientation, moving a trackball or wheel, etc.), movement of a body part in relation to the device, movement of an implement or tool in relation to the device, audio inputs, etc. A gesture may be made on a device (such as on the screen) or with the device to interact with the device.

The term "gesture capture" refers to a sense or otherwise a detection of an instance and/or type of user gesture. The gesture capture can occur in one or more areas of the screen. A gesture region can be on the display, where it may be referred to as a touch sensitive display or off the display where it may be referred to as a gesture capture area.

The term "electronic address" refers to any contactable address, including a telephone number, instant message handle, e-mail address, Universal Resource Locator (URL), Universal Resource Identifier (URI), Address of Record (AOR), electronic alias in a database, like addresses, and combinations thereof.

It shall be understood that the term "means," as used herein, shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "social media" can refer to the means of interactions among people in which they create, share, and exchange information and ideas in virtual communities and networks. Embodiments of social media can include a group of Internet-based applications that allow the creation and exchange of content. Furthermore, social media may depend on mobile and web-based technologies to create highly interactive platforms through which individuals and communities share, co-create, discuss, and modify user-generated content. Social media differentiates from traditional/industrial media in many aspects such as quality, reach, frequency, usability, immediacy, and permanence.

The term "social media site" can refer to a social network or social network service.

The term "social media posting" can refer to an item of content or a provider of content on a social media site.

The term "social media poster" can refer to an author of an item of content or a provider of content on a social media site.

The term "social media pile" can refer to a user interface where each social media posters is represented by a thumbnail or other visual indicia. The social media pile can include two or more thumbnails or visual indicia formed into an arrangement that resembles a pile.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

BRIEF DESCRIPTION OF THE DRAWINGS

FIG. 11A is a front view of an embodiment of an Intelligent TV screen;

FIG. 11C is a front view of an embodiment of an Intelligent TV screen;

FIG. 22C is a view of an embodiment of a user interface for an Intelligent TV;

FIG. 33A is a view of an embodiment of a user interface for an Intelligent TV;

FIG. 33B is a view of an embodiment of a user interface for an Intelligent TV;

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Presented herein are embodiments of a device. The device can be a network-enabled telecommunications device, such as a television, an electronic visual display device, or other smart device. The device can include one or more screens, or sections of a screen, that are configured to receive and present information from a number of sources. Further, the device can receive user input in unique ways. The overall design and functionality of the device provides for an enhanced user experience making the device more useful and more efficient.

Figure 1A:
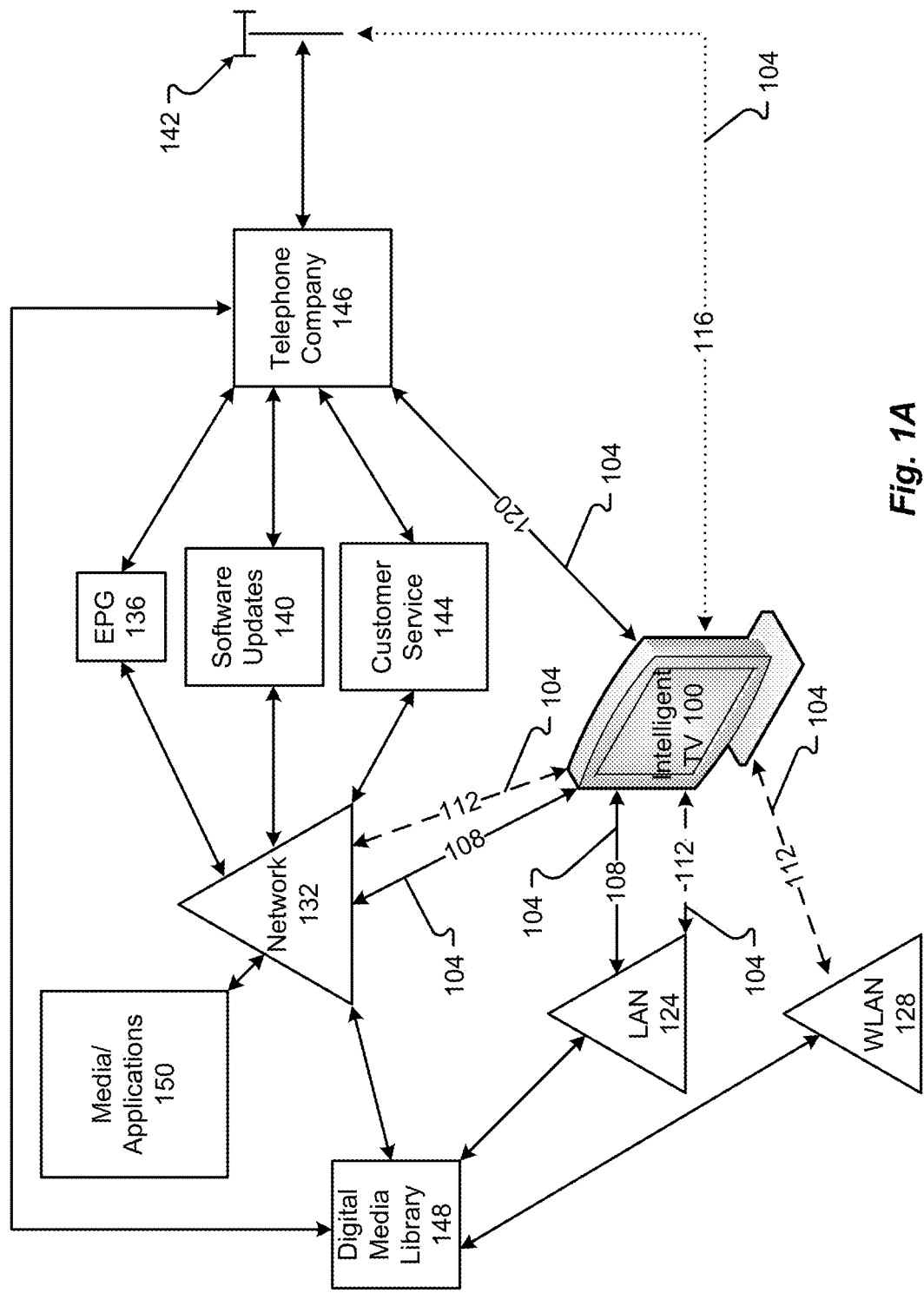
FIG. 1A includes a first view of an embodiment of an environment of an intelligent television.
Figure 1B:
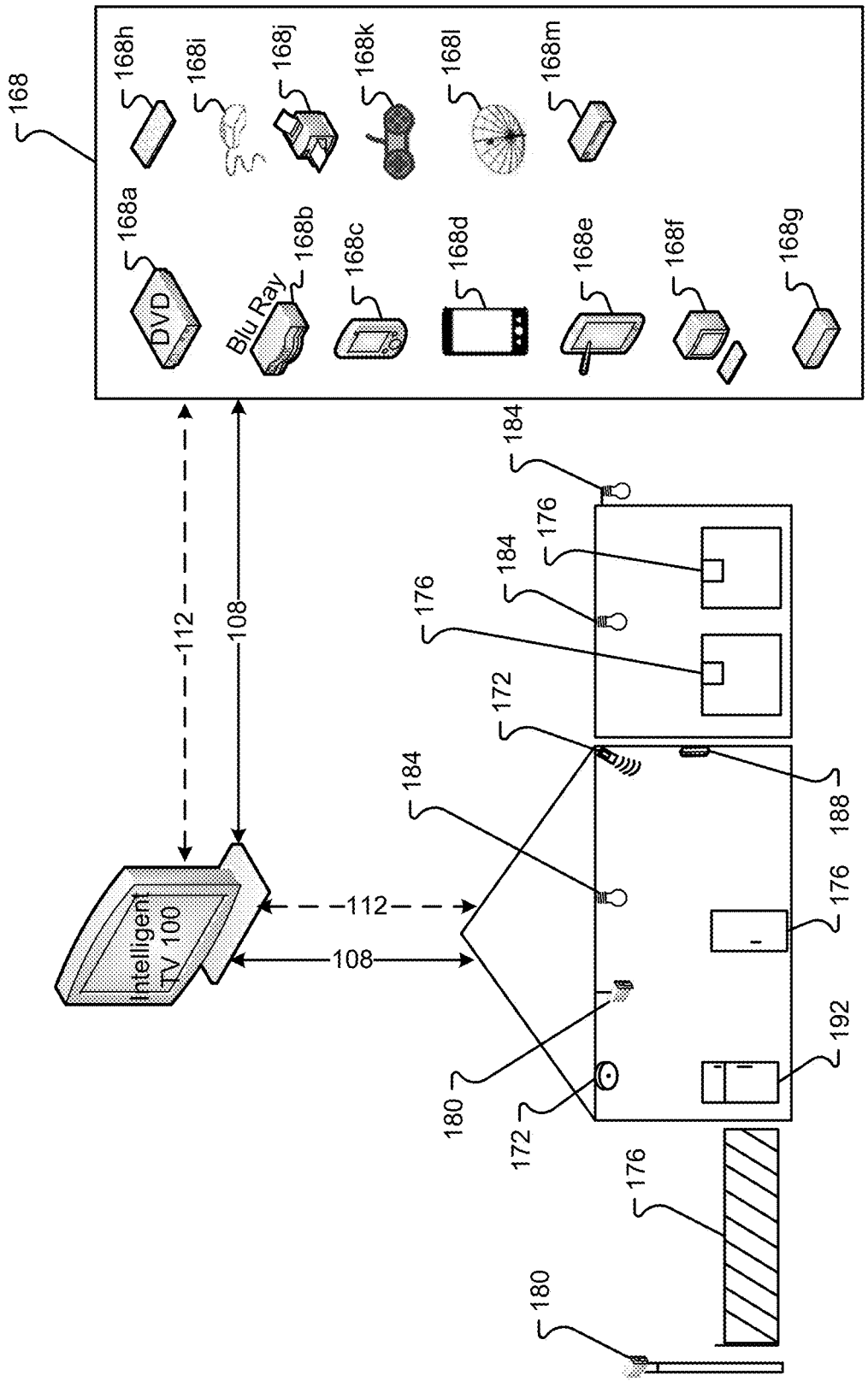
FIG. 1B includes a second view of an embodiment of an environment of an intelligent television.

Intelligent Television (TV) Environment:

Referring to FIGS. 1A and 1B, an Intelligent TV, or device, 100 is shown. It is anticipated that the Intelligent TV 100 may be used for entertainment, business applications, social interaction, content creation and/or consumption, and to organize and control one or more other devices that are in communication with the Intelligent TV 100. As can be appreciated, the Intelligent TV 100 can be used to enhance the user interactive experience whether at home or at work.

In some embodiments, the Intelligent TV 100 may be configured to receive and understand a variety of user and/or device inputs. For example, a user may interface with the Intelligent TV 100 via one or more physical or electrical controls, such as buttons, switches, touch sensitive screens/regions (e.g., capacitive touch, resistive touch, etc.), and/or other controls associated with the Intelligent TV 100. In some cases, the Intelligent TV 100 may include the one or more interactive controls. Additionally or alternatively, the one or more controls may be associated with a remote control. The remote control may communicate with the Intelligent TV 100 via wired and/or wireless signals. As can be appreciated, the remote control may operate via radio frequency (RF), infrared (IR), and/or a specific wireless communications protocol (e.g., Bluetooth™, Wi-Fi, etc.). In some cases, the controls, whether physical or electrical, may be configured (e.g., programmed) to suit a user's preferences.

Additionally or alternatively, smart phones, tablets, computers, laptops, netbooks, and other smart devices may be used to control the Intelligent TV 100. For example, control of the Intelligent TV 100 may be achieved via an application running on a smart device. The application may be configured to present a user with various Intelligent TV 100 controls in an intuitive user interface (UI) on a screen associated with the device 100. The screen may be a touch sensitive, or touch screen, display. Selections input by a user via the UI may be configured to control the Intelligent TV 100 by the application accessing one or more communication features associated with the smart device.

It is anticipated that the Intelligent TV 100 can receive input via various input devices including, but in no way limited to, video, audio, radio, light, tactile, and combinations thereof. Among other things, these input devices may be configured to allow the Intelligent TV 100 to see, recognize, and react to user gestures. For instance, a user may talk to the Intelligent TV 100 in a conversational manner. The Intelligent TV 100 may hear and understand voice commands in a manner similar to a smart device's intelligent personal assistant and voice-controlled navigator application (e.g., Apple's Siri, Android's Skyvi, Robin, his, and other applications).

The Intelligent TV 100 may also be a communications device which can establish network connections 104 through many alternate means, including wired 108 or wireless 112 means, over cellular networks 116 to connect via cellular base antenna 142 to telephone networks operated by telephone company 146, and by using a telephone line 120 to connect to telephone networks operated by telephone company 146. These connections 104 enable the Intelligent TV 100 to access one or more communication networks 132. The communication networks may comprise any type of known communication medium or collection of communication media and may use any type of protocols to transport messages or signals between endpoints. The communication networks may include wired and/or wireless communication technologies. The Internet is an example of a communication network 132 that constitutes an Internet Protocol (IP) network consisting of many computers, computing networks, and other communication devices located all over the world, which are connected through many telephone systems and other means.

Other examples of the communication network 132 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular network, and any other type of packet-switched or circuit-switched network known in the art. In addition, it can be appreciated that the communication network 132 need not be limited to any one network type, and instead may be comprised of a number of different networks and/or network types.

In some embodiments, the Intelligent TV 100 may be equipped with multiple communication means. The multiple communication means may allow the Intelligent TV 100 to communicate across Local Area Networks (LANs) 124, wireless local area networks (WLANs) 128, and other networks 132. The networks 132 may be connected in a redundant manner to ensure network access. In other words, if one connection is interrupted, the Intelligent TV 100 can use an alternate communications path to reestablish and/or maintain the network connection 104. Among other things, the Intelligent TV 100 may use these network connections 104 to send and receive information, interact with an electronic program guide (EPG) 136, receive software updates 140, contact customer service 144 (e.g., to receive help or service, etc.), and/or access remotely stored digital media libraries 148. In addition, these connections can allow the Intelligent TV 100 to make phone calls, send and/or receive email messages, send and/or receive text messages (such as email and instant messages), surf the Internet using an internet search engine, post blogs by a blogging service, and connect/interact with social media sites and/or an online community (e.g., Facebook™

Twitter™, LinkedIn™, Pinterest™, Google+™, MySpace™, and the like) maintained by a social network service. In combination with other components of the Intelligent TV 100 described in more detail below, these network connections 104 also enable the Intelligent TV 100 to conduct video teleconferences, electronic meetings, and other communications. The Intelligent TV 100 may capture and store images and sound, using associated cameras, microphones, and other sensors. Additionally or alternatively, the Intelligent TV 100 may create and save screen shots of media, images, and data displayed on a screen associated with the Intelligent TV 100.

Further, as shown in FIG. 1B, the Intelligent TV 100 can interact with other electronic devices 168 by either by the wired 108 and/or wireless 112 connections. As described herein, components of the Intelligent TV 100 allow the device 100 to be connected to devices 168 including, but not limited to, DVD players 168a, BluRay players 168b, portable digital media devices 168c, smart phones 168d, tablet devices 168e, personal computers 168f, external cable boxes 168g, keyboards 168h, pointing devices 168i, printers 168j, game controllers and/or game pads 168k, satellite dishes 168l, external display devices 168m, and other universal serial bus (USB), local area network (LAN), Bluetooth™, or high-definition multimedia interface (HDMI) compliant devices, and/or wireless devices. When connected to an external cable box 168g or satellite dish 168l, the Intelligent TV 100 can access additional media content. Also, as further described below, the Intelligent TV 100 is capable of receiving digital and/or analog signals broadcast by TV stations. The Intelligent TV 100 can be configured as one or more of a standard-definition television, enhanced television, and high-definition television. It may operate as one or more of cable, Internet, Internet Protocol, satellite, web, and/or smart television. The Intelligent TV 100 may also be used to control the operation of, and may interface with, other smart components such as security systems 172, door/gate controllers 176, remote video cameras 180, lighting systems 184, thermostats 188, refrigerators 192, and other appliances.

Figure 2A:
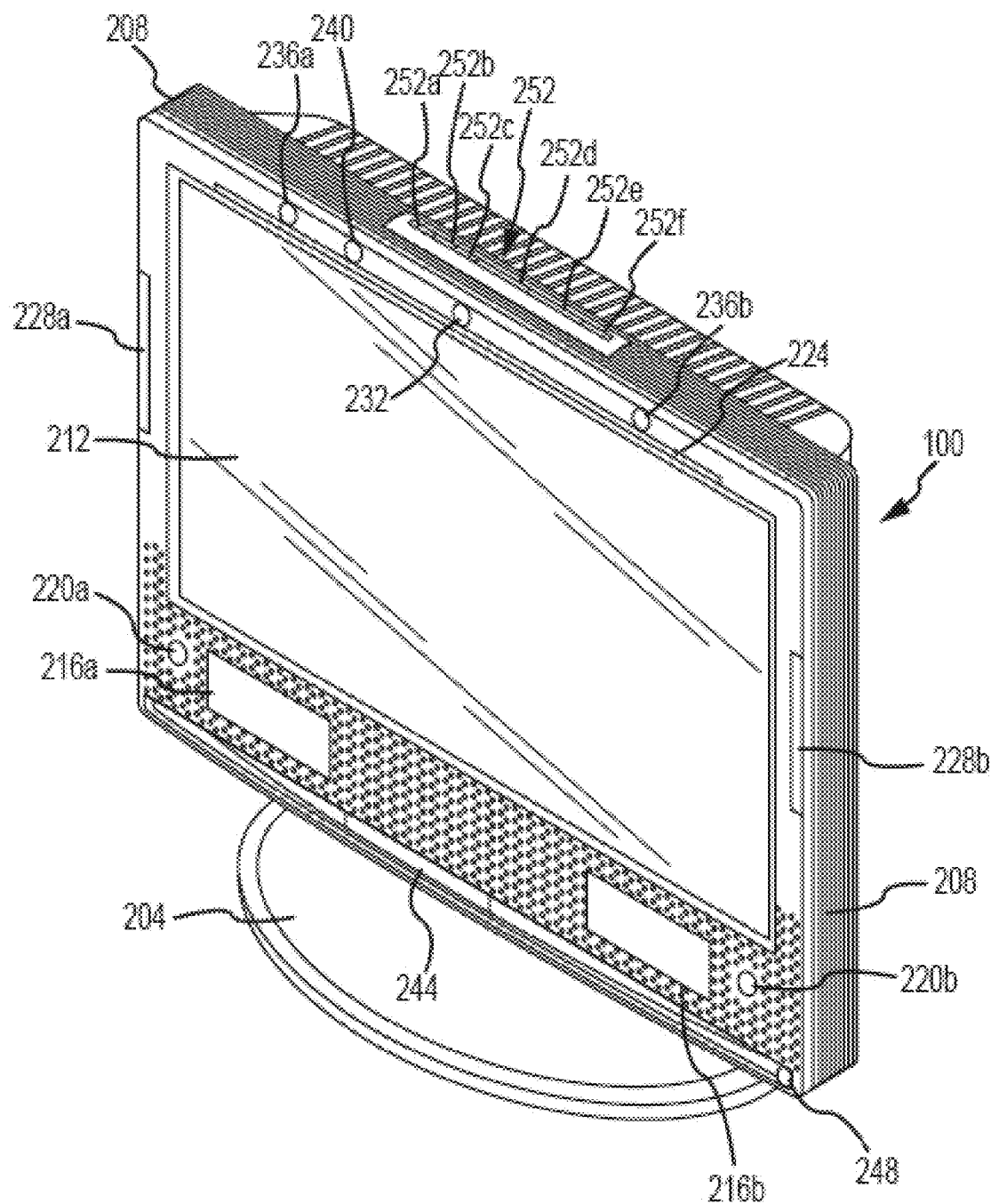
FIG. 2A includes a first view of an embodiment of an intelligent television.

Intelligent TV:

FIGS. 2A-2D illustrate components of the Intelligent TV 100. In general, as shown by FIG. 2A, the Intelligent TV 100 can be supported by a removable base or stand 204 that is attached to a frame 208. The frame 208 surrounds edges of a display screen 212, leaving a front surface of the display screen 212 uncovered. The display screen 212 may comprise a Liquid Crystal Display (LCD) screen, a plasma screen, Light Emitting Diode (LED) screen, or other screen types. In embodiments, the entire front surface of the screen 212 may be touch sensitive and capable of receiving input by the user touching the front surface of the screen 212.

The Intelligent TV 100 may include integrated speakers 216 and at least one microphone 220. A first area of the frame 208 may comprise a horizontal gesture capture region 224 and second areas comprise vertical gesture capture regions 228. The gesture capture regions 224, 228 may comprise areas or regions that are capable of receiving input by recognizing gestures made by the user, and in some examples, without the need for the user to actually touch the screen 212 surface of the Intelligent TV 100. However, the gesture capture regions 224, 228 may not include pixels that can perform a display function or capability.

One or more image capture devices 232, such as a camera, can be included for capturing still and/or video images. The image capture device 232 can include or be associated with additional elements, such as a flash or other light source 236 and a range finding device 240 to assist focusing of the image capture device. In addition, the microphone 220, gesture capture regions 224, 228, image capture devices 232, and the range finding device 240 may be used by the Intelligent TV 100 to recognize individual users. Additionally or alternatively, the Intelligent TV 100 may learn and remember preferences associated with the individual users. In some embodiments, the learning and remembering (i.e., identifying and recalling stored information) may be associated with the recognition of a user.

An IR transmitter and receiver 244 may also be provided to connect the Intelligent TV 100 with a remote control device (not shown) or other IR devices. Additionally or alternatively, the remote control device may transmit wireless signals via RF, light, and/or a means other than IR. Also shown in FIG. 2A is an audio jack 248, which may be hidden behind a panel that is hinged or removable. The audio jack 248 accommodates a tip, ring, sleeve (TRS) connector, for example, to allow the user to utilize headphones, a headset, or other external audio equipment.

The Intelligent TV 100 can also include a number of buttons 252. For example, FIG. 2A illustrates the buttons 252 on the top of the Intelligent TV 100, although the buttons could be placed at other locations. As shown, the Intelligent TV 100 includes six buttons 252a-f, which can be configured for specific inputs. For example, the first button 252a may be configured as an on/off button used to control overall system power to the Intelligent TV 100. The buttons 252 may be configured to, in combination or alone, control a number of aspects of the Intelligent TV 100. Some non-limiting examples include, but are not limited to, overall system volume, brightness, the image capture device, the microphone, and initiation/termination of a video conference. Instead of separate buttons, two of the buttons may be combined into a rocker button. This rocker button arrangement may be useful in situations where the buttons are configured to control features such as volume or brightness. In some embodiments, one or more of the buttons 252 are capable of supporting different user commands. By way of example, a normal press has a duration commonly of less than about 1 second and resembles a quick input. A medium press has a duration commonly of 1 second or more but less than about 12 seconds. A long press has a duration commonly of about 12 seconds or more. The function of the buttons is normally specific to the application that is active on the Intelligent TV 100. In the video conference application for instance and depending on the particular button, a normal, medium, or long press can mean end the video conference, increase or decrease the volume, increase a rate speed associated with a response to an input, and toggle microphone mute. Depending on the particular button, a normal, medium, or long press can also control the image capture device 232 to increase zoom, decrease zoom, take a photograph, or record video.

Figure 2B:
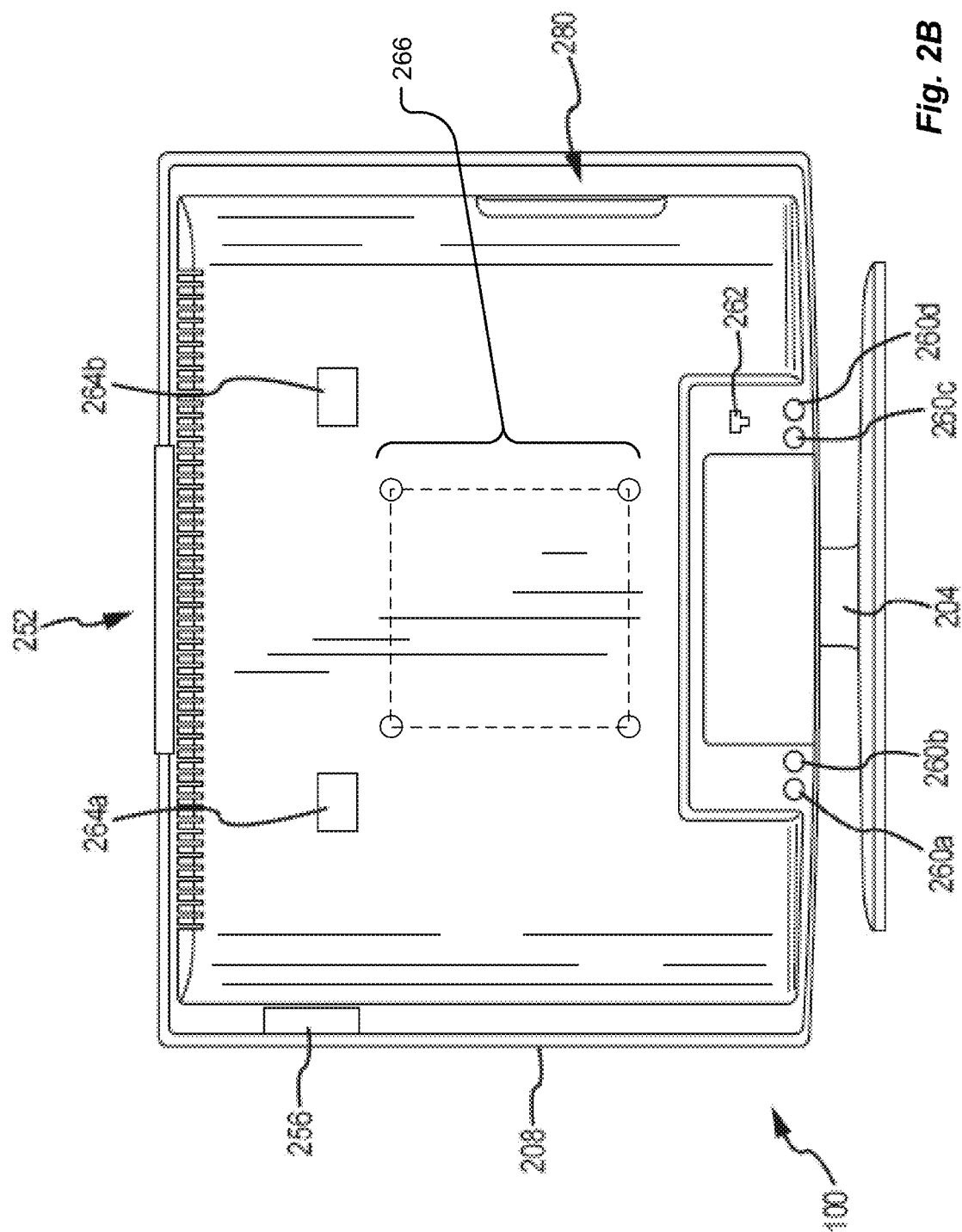
FIG. 2B includes a second view of an embodiment of an intelligent television.

In support of communications functions or capabilities, the Intelligent TV 100 can include one or more shared or dedicated antennae 256 and wired broadband connections 260 as shown in FIG. 2B. The antennae 256 also enable the Intelligent TV 100 to receive digital and/or analog broadcast TV channels. The wired broadband connections 260 are, for example, a Digital Subscriber Line (DSL), an optical line, an Ethernet port, an IEEE 1394 interface, or other interfaces. The Intelligent TV 100 also has a telephone line jack 262 to further provide communications capability.

In addition to the removable base 204, the Intelligent TV 100 may include hardware and mounting points 264 on a rear surface to facilitate mounting the Intelligent TV 100 to a surface, such as a wall. In one example, the Intelligent TV 100 may incorporate at least one Video Equipment Standards Association (VESA) mounting interface for attaching the device 100 to the surface.

Figure 2C:
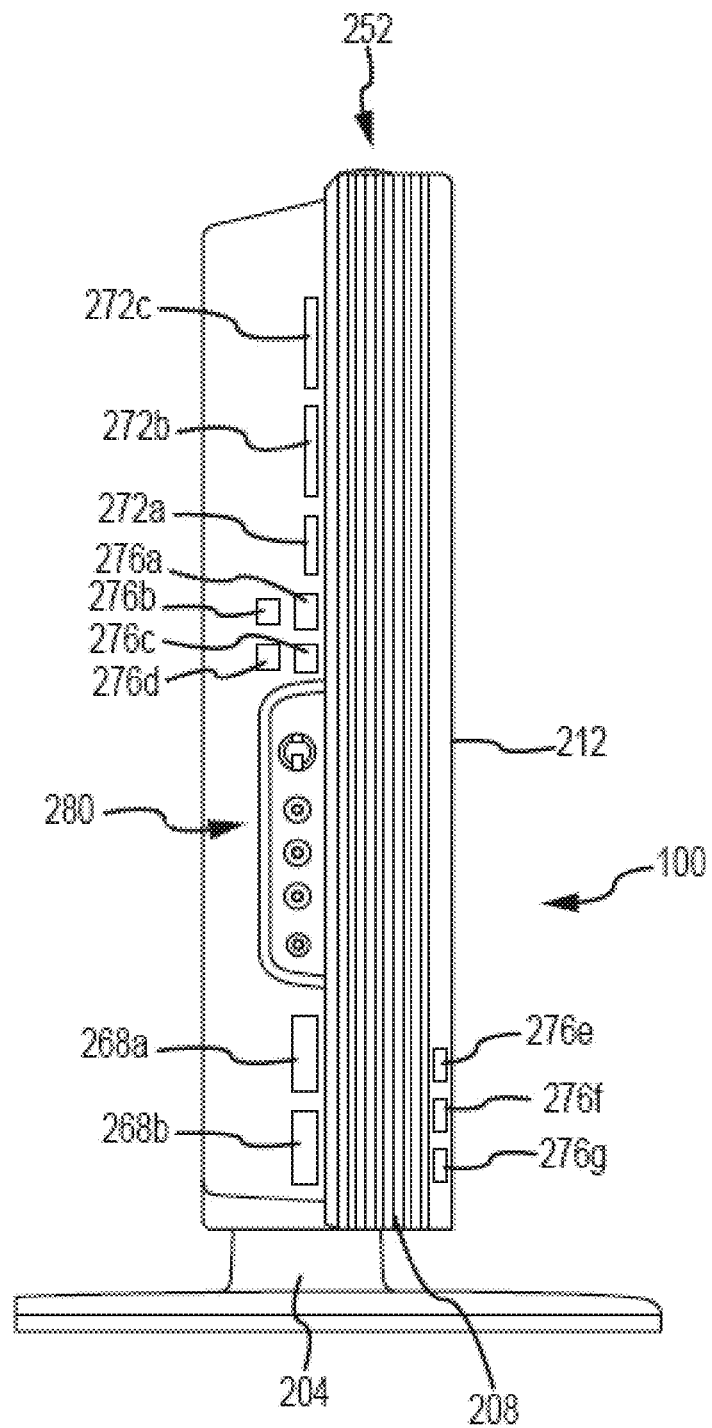
FIG. 2C includes a third view of an embodiment of an intelligent television.
Figure 2D:
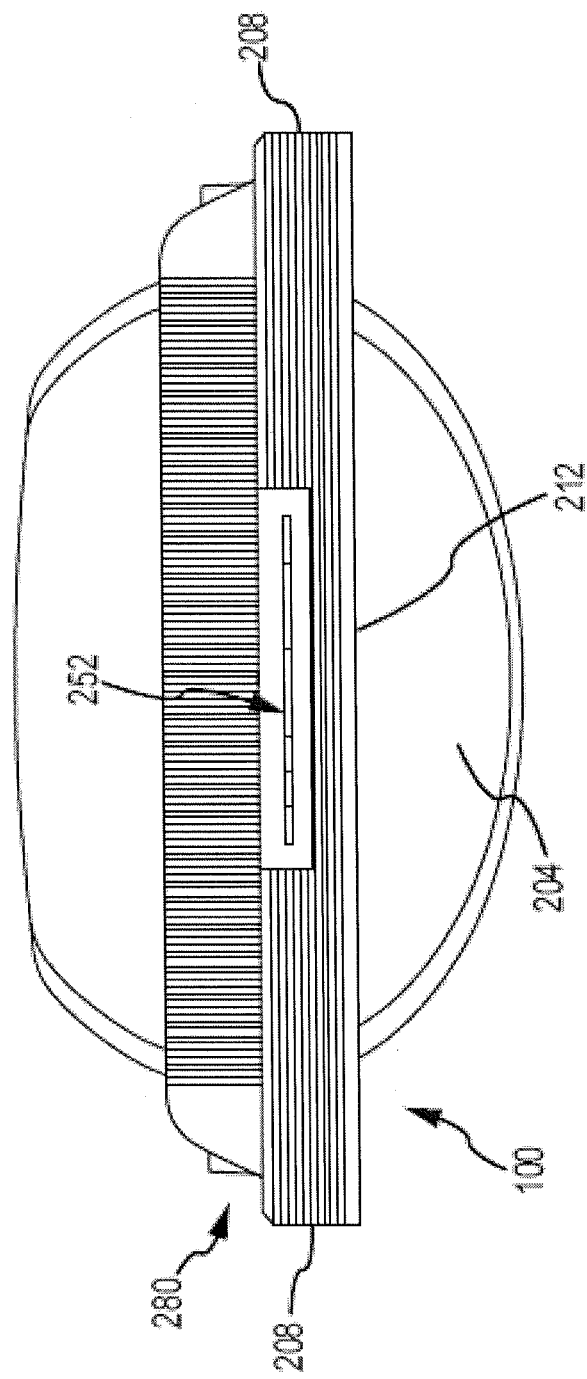
FIG. 2D includes a fourth view of an embodiment of an intelligent television.

As shown in FIG. 2C, the Intelligent TV 100 may include docking interfaces or ports 268. The docking ports 268 may include proprietary or universal ports to support the interconnection of the Intelligent TV 100 to other devices or components, which may or may not include additional or different capabilities from those integral to the Intelligent TV 100. In addition to supporting an exchange of communication signals between the Intelligent TV 100 and a connected device or component, the docking ports 268 can support the supply of power to the connected device or component. The docking ports 268 can also comprise an intelligent element that comprises a docking module for controlling communications or other interactions between the Intelligent TV 100 and the connected device or component.

The Intelligent TV 100 also includes a number of card slots 272 and network or peripheral interface ports 276. The card slots 272 may accommodate different types of cards including subscriber identity modules (SIM), secure digital (SD) cards, MiniSD cards, flash memory cards, and other cards. Ports 276 in embodiments may include input/output (I/O) ports, such as universal serial bus (USB) ports, parallel ports, game ports, and high-definition multimedia interface (HDMI) connectors.

An audio/video (A/V) I/O module 280 can be included to provide audio to an interconnected speaker or other device, and to receive audio input from a connected microphone or other device. As an example, the audio input/output interface 280 may comprise an associated amplifier and analog-to-digital converter.

Figure 3:
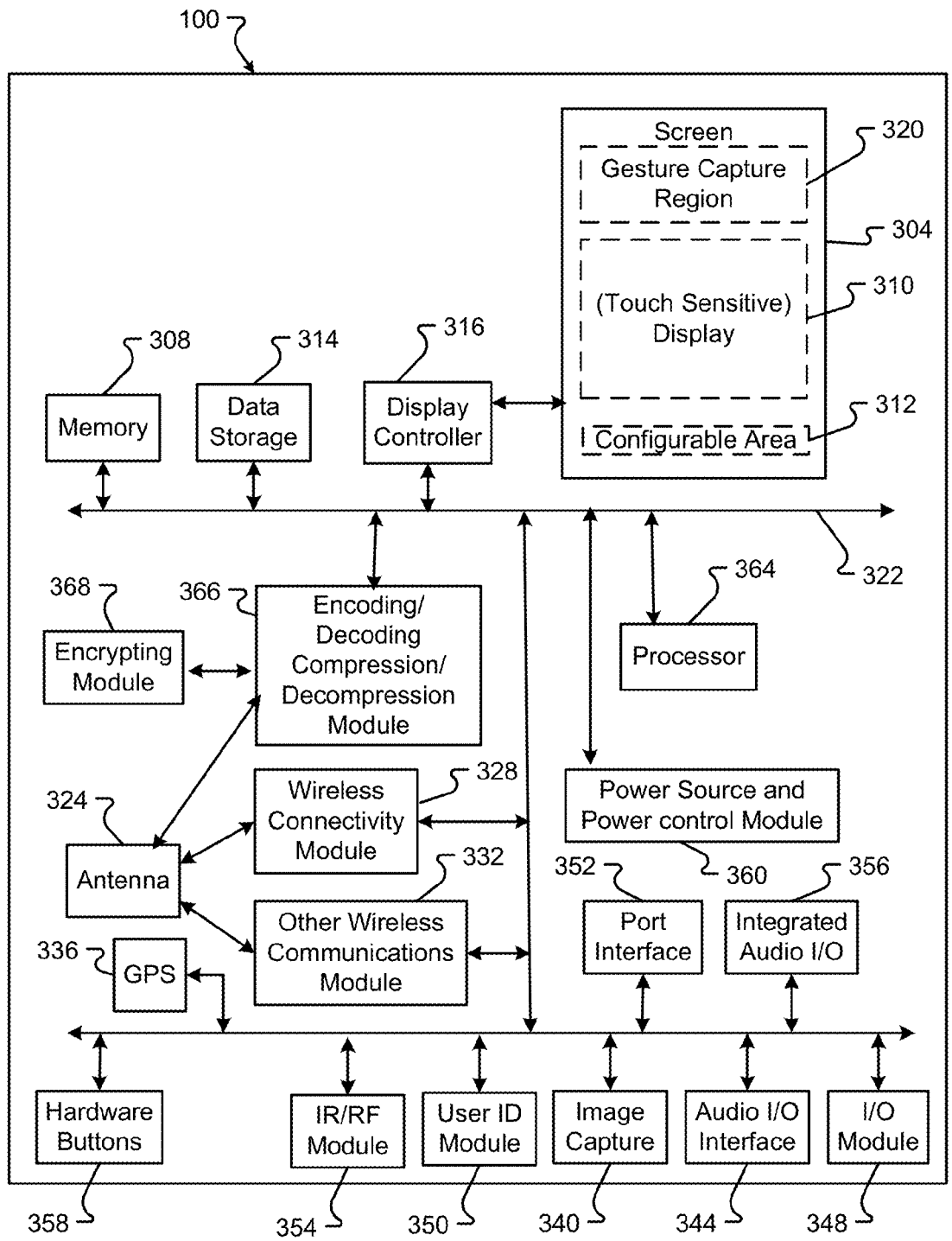
FIG. 3 is a block diagram of an embodiment of the hardware of an intelligent television.

Hardware Features:

FIG. 3 illustrates components of a Intelligent TV 100 in accordance with embodiments of the present disclosure. In general, the Intelligent TV 100 includes a primary screen 304. Screen 304 can be a touch sensitive screen and can include different operative areas.

For example, a first operative area, within the screen 304, may comprise a display 310. In some embodiments, the display 310 may be touch sensitive. In general, the display 310 may comprise a full color, display.

A second area within the screen 304 may comprise a gesture capture region 320. The gesture capture region 320 may comprise an area or region that is outside of the display 310 area, and that is capable of receiving input, for example in the form of gestures provided by a user. However, the gesture capture region 320 does not include pixels that can perform a display function or capability.

A third region of the screen 304 may comprise a configurable area 312. The configurable area 312 is capable of receiving input and has display or limited display capabilities. In embodiments, the configurable area 312 may present different input options to the user. For example, the configurable area 312 may display buttons or other relatable items. Moreover, the identity of displayed buttons, or whether any buttons are displayed at all within the configurable area 312 of a screen 304, may be determined from the context in which the Intelligent TV 100 is used and/or operated.

In an exemplary touch sensitive screen 304 embodiment, the touch sensitive screen 304 comprises a liquid crystal display extending across at least those regions of the touch sensitive screen 304 that are capable of providing visual output to a user, and a capacitive input matrix over those regions of the touch sensitive screen 304 that are capable of receiving input from the user.

One or more display controllers 316 may be provided for controlling the operation of the screen 304. The display controller 316 may control the operation of the touch sensitive screen 304, including input (touch sensing) and output (display) functions. The display controller 316 may also control the operation of the screen 304 and may interface with other inputs, such as infrared and/or radio input signals (e.g., door/gate controllers, alarm system components, etc.). In accordance with still other embodiments, the functions of a display controller 316 may be incorporated into other components, such as a processor 364.

The processor 364 may comprise a general purpose programmable processor or controller for executing application programming or instructions. In accordance with at least some embodiments, the processor 364 may include multiple processor cores, and/or implement multiple virtual processors. In accordance with still other embodiments, the processor 364 may include multiple physical processors. As a particular example, the processor 364 may comprise a specially configured application specific integrated circuit (ASIC) or other integrated circuit, a digital signal processor, a controller, a hardwired electronic or logic circuit, a programmable logic device or gate array, a special purpose computer, or the like. The processor 364 generally functions to run programming code or instructions implementing various functions of the Intelligent TV 100.

In support of connectivity functions or capabilities, the Intelligent TV 100 can include a module for encoding/decoding and/or compression/decompression 366 for receiving and managing digital television information. Encoding/decoding compression/decompression module 366 enables decompression and/or decoding of analog and/or digital information dispatched by a public television chain or in a private television network and received across antenna 324, I/O module 348, wireless connectivity module 328, and/or other wireless communications module 332. The television information may be sent to screen 304 and/or attached speakers receiving analog or digital reception signals. Any encoding/decoding and compression/decompression is performable on the basis of various formats (e.g., audio, video, and data). Encrypting module 368 is in communication with encoding/decoding compression/decompression module 366 and enables the confidentiality of all the data received or transmitted by the user or supplier.

In support of communications functions or capabilities, the Intelligent TV 100 can include a wireless connectivity module 328. As examples, the wireless connectivity module 328 can comprise a GSM, CDMA, FDMA and/or analog cellular telephony transceiver capable of supporting voice, multimedia and/or data transfers over a cellular network. Alternatively or in addition, the Intelligent TV 100 can include an additional or other wireless communications module 332. As examples, the other wireless communications module 332 can comprise a Wi-Fi, Blutooth™, WiMax, infrared, or other wireless communications link. The wireless connectivity module 328 and the other wireless communications module 332 can each be associated with a shared or a dedicated antenna 324 and a shared or dedicated I/O module 348.

An input/output module 348 and associated ports may be included to support communications over wired networks or links, for example with other communication devices, server devices, and/or peripheral devices. Examples of an input/output module 348 include an Ethernet port, a Universal Serial Bus (USB) port, Thunderbolt™ or Light Peak interface, Institute of Electrical and Electronics Engineers (IEEE) 1394 port, or other interface.

An audio input/output interface/device(s) 344 can be included to provide analog audio to an interconnected speaker or other device, and to receive analog audio input from a connected microphone or other device. As an example, the audio input/output interface/device(s) 344 may comprise an associated amplifier and analog-to-digital converter. Alternatively or in addition, the Intelligent TV 100 can include an integrated audio input/output device 356 and/or an audio jack for interconnecting an external speaker or microphone. For example, an integrated speaker and an integrated microphone can be provided, to support near talk or speaker phone operations.

A port interface 352 may be included. The port interface 352 may include proprietary or universal ports to support the interconnection of the device 100 to other devices or components, such as a dock, which may or may not include additional or different capabilities from those integral to the device 100. In addition to supporting an exchange of communication signals between the device 100 and another device or component, the docking port 136 and/or port interface 352 can support the supply of power to or from the device 100. The port interface 352 also comprises an intelligent element that comprises a docking module for controlling communications or other interactions between the Intelligent TV 100 and a connected device or component. The docking module may interface with software applications that allow for the remote control of other devices or components (e.g., media centers, media players, and computer systems).

An Intelligent TV 100 may also include memory 308 for use in connection with the execution of application programming or instructions by the processor 364, and for the temporary or long term storage of program instructions and/or data. As examples, the memory 308 may comprise RAM, DRAM, SDRAM, or other solid state memory. Alternatively or in addition, data storage 314 may be provided. Like the memory 308, the data storage 314 may comprise a solid state memory device or devices. Alternatively or in addition, the data storage 314 may comprise a hard disk drive or other random access memory.

Hardware buttons 358 can be included for example for use in connection with certain control operations. One or more image capture interfaces/devices 340, such as a camera, can be included for capturing still and/or video images. Alternatively or in addition, an image capture interface/device 340 can include a scanner, code reader, or motion sensor. An image capture interface/device 340 can include or be associated with additional elements, such as a flash or other light source. The image capture interfaces/devices 340 may interface with a user ID module 350 that assists in identifying users of the Intelligent TV 100.

The Intelligent TV 100 can also include a global positioning system (GPS) receiver 336. In accordance with embodiments of the present invention, the GPS receiver 336 may further comprise a GPS module that is capable of providing absolute location information to other components of the Intelligent TV 100. As will be appreciated, other satellite-positioning system receivers can be used in lieu of or in addition to GPS.

Power can be supplied to the components of the Intelligent TV 100 from a power source and/or power control module 360. The power control module 360 can, for example, include a battery, an AC-to-DC converter, power control logic, and/or ports for interconnecting the Intelligent TV 100 to an external source of power.

Communication between components of the Intelligent TV 100 is provided by bus 322. Bus 322 may comprise one or more physical buses for control, addressing, and/or data transmission. Bus 322 may be parallel, serial, a hybrid thereof, or other technology.

Figure 4:
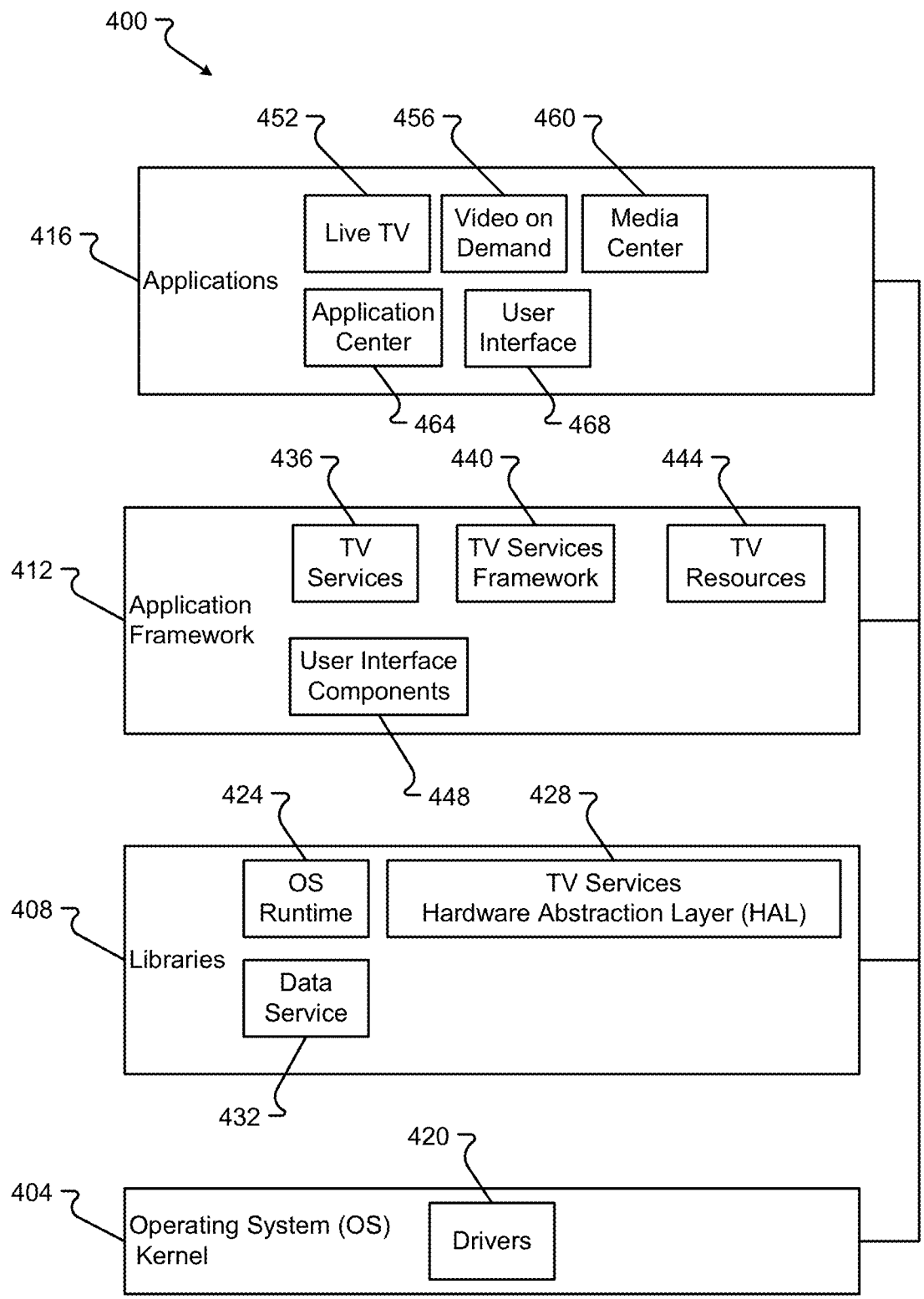
FIG. 4 is a block diagram of an embodiment of the intelligent television software and/or firmware.

Firmware and Software:

An embodiment of the software system components and modules 400 is shown in FIG. 4. The software system 400 may comprise one or more layers including, but not limited to, an operating system kernel 404, one or more libraries 408, an application framework 412, and one or more applications 416. The one or more layers 404-416 can communicate with each other to perform functions for the Intelligent TV 100.

An operating system (OS) kernel 404 contains the primary functions that allow the software to interact with hardware associated with the Intelligent TV 100. Kernel 404 can include a collection of software that manages the computer hardware resources and provides services for other computer programs or software code. The operating system kernel 404 is the main component of the operating system and acts as an intermediary between the applications and data processing done with the hardware components. Part of the operating system kernel 404 can include one or more device drivers 420. A device driver 420 can be any code within the operating system that helps operate or control a device or hardware attached to or associated with the Intelligent TV. The driver 420 can include code for operating video, audio, and/or other multimedia components of the Intelligent TV 100. Examples of drivers include display, camera, flash, binder (IPC), keypad, WiFi, and audio drivers.

Library 408 can contain code or other components that may be accessed and implemented during the operation of the software system 400. The library 408 may contain one or more of, but is not limited to, an operating system runtime library 424, a TV services hardware abstraction layer (HAL) library 428, and/or a data service library 432. The OS runtime library 424 may contain the code required by the operating system kernel 404 or other operating system functions to be executed during the runtime of the software system 400. The library can include the code that is initiated during the running of the software system 400.

The TV services hardware abstraction layer library 428 can include code required by TV services either executed in the application framework 412 or an application 416. The TV services HAL library 428 is specific to the Intelligent TV 100 operations that control different functions of the Intelligent TV. The TV service HAL library 428 can also be formed from other types of application languages or embodiments of different types of code or formats for code beyond the hardware abstraction layer.

Figure 6:
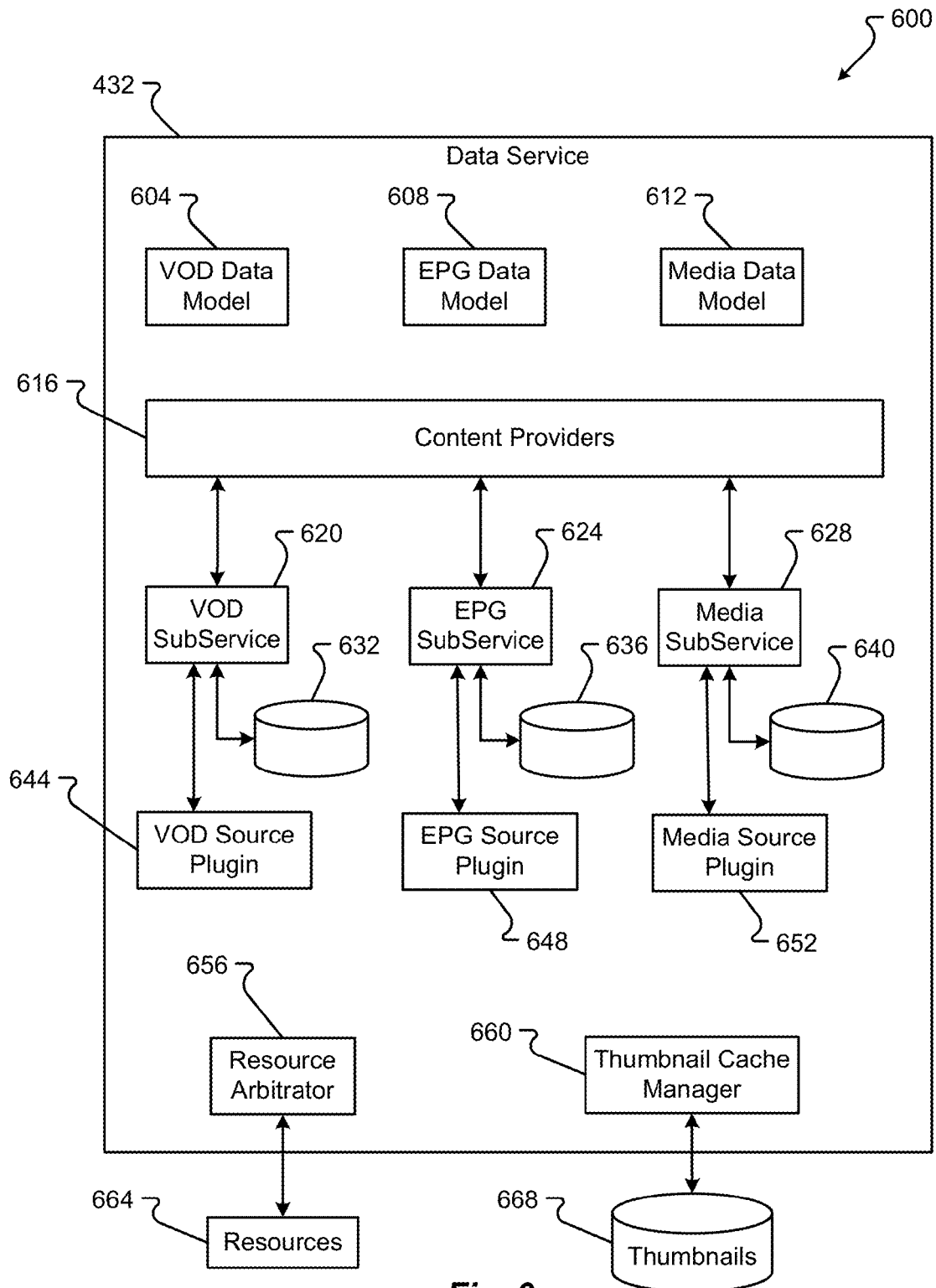
FIG. 6 is a third block diagram of an embodiment of the intelligent television software and/or firmware.

The data services library 432 can include the one or more components or codes to implement components for the data services function. The data services function can be implemented in the application framework 412 and/or applications layer 416. An embodiment of a function of the data services and the type of components that may be included is shown in FIG. 6.

The application framework 412 can include a general abstraction for providing functionality that can be selected by one or more applications 416 to provide specific application functions or software for those applications. Thus, the framework 412 can include one or more different services, or other applications, that can be accessed by the applications 416 to provide general functions across two or more applications. Such functions include, for example, management of one or more of windows or panels, surfaces, activities, content, and resources, The application framework 412 can include one or more, but is not limited to, TV services 434, TV services framework 440, TV resources 444, and user interface components 448.

The TV services framework 440 can provide an additional abstraction for different TV services. TV services framework 440 allows for the general access and function of services that are associated with the TV functionality. The TV services 436 are general services provided within the TV services framework 440 that can be accessed by applications in the applications layer 416. The TV resources 444 provide code for accessing TV resources 444 including any type of storage, video, audio, or other functionality provided with the Intelligent TV 100. The TV resources 444, TV services 436, and TV services framework 440 provide for the different implementations of TV functionality that may occur with the Intelligent TV 100.

One or more user interface components 448 can provide general components for display of the Intelligent TV 100. The user interface components 448 might be general components that may be accessed by different applications provided in the application framework 412. The user interface components 448 may be accessed to provide for panels and silos as described in conjunction with FIG. 5.

The applications layer 416 can both contain and execute applications associated with the Intelligent TV 100. Applications layer 416 may include one or more of, but is not limited to, a live TV application 452, a video on demand application 456, a media center application 460, an application center application 464, and a user interface application 468. The live TV application 452 can provide live TV over different signal sources. For example, the live TV application 452 can provide TV from input from cable television, over air broadcasts, from satellite services, or other types of live TV services. Live TV application 452 may then present the multimedia presentation or video and audio presentation of the live television signal over the display of the Intelligent TV 100.

The video on demand application 456 can provide for video from different storage sources. Unlike Live TV application 452, video on demand 456 provides for display of videos that are accessed from some memory source. The sources of the video on demand can be associated with users or with the Intelligent TV or some other type of service. For example, the video on demand 456 may be provided from an iTunes library stored in a cloud, from a local disc storage that contains stored video programs, or from some other source.

The media center application 460 can provide applications for different types of media presentation. For example, the media center 460 can provide for displaying pictures or audio that is different from, but still accessible by the user and different from live TV or video on demand. The media center 460 allows for the access of different sources to obtain the media in the display of such media on the Intelligent TV 100.

The application center 464 allows for the provision, storage and use of applications. An application can be a game, a productivity application, or some other application generally associated with computer systems or other devices, but may be operated within the Intelligent TV. An application center 464 may obtain these applications from different sources, store them locally and then execute those types of applications for the user on the Intelligent TV 100.

Figure 5:
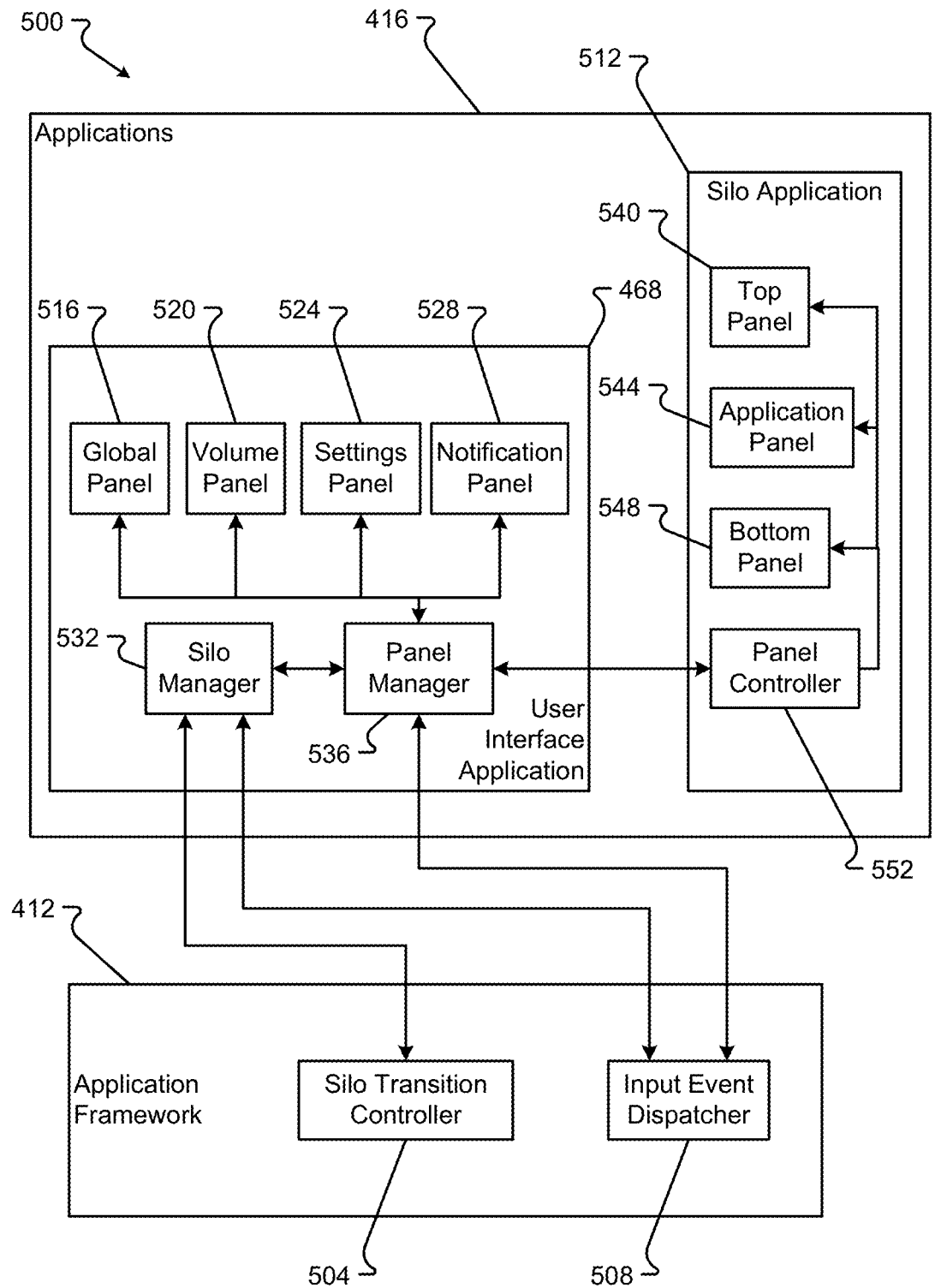
FIG. 5 is a second block diagram of an embodiment of the intelligent television software and/or firmware.

User interface application 468 provides for the specific user interfaces associated with the Intelligent TV 100. These user interfaces can include the silos and panels that are described in FIG. 5. An embodiment of the user interface software 500 is shown in FIG. 5. Here the application framework 412 contains one or more code components which help control the user interface events while one or more applications in the applications layer 416 affects the user interface use for the Intelligent TV 100. The application framework 412 can include a silo transition controller 504 and/or an input event dispatcher 508. There may be more or fewer code components in the application framework 412 than those shown in FIG. 5. The silo transition controller 504 contains the code and language that manages the transitions between one or more silos. A silo can be a vertical user interface feature on the Intelligent TV that contains information for user. The transition controller 504 can manage the changes between two silos when an event occurs in the user interface. The input event dispatcher 508 can receive user interface events that may be received from the operating system and provided to the input event dispatcher 508. These events can include selections of buttons on a remote control or on the TV or other types of user interface inputs. The input event dispatcher 508 may then send these events to a silo manager 532 or panel manager 536 depending on the type of the event. The silo transition controller 504 can interface with the silo manager 532 to affect changes in the silos.

The applications layer 416 can include a user interface application 468 and/or a silo application 512. The applications layer 416 can include more or fewer user interface applications as necessary to control the user interface of the Intelligent TV 100 than those shown in FIG. 5. The user interface application 468 can include a silo manager 532, a panel manager 536, and one or more types of panels 516-528. The silo manager 532 manages the display and/or features of silos. The silo manager 532 can receive or send information from the silo transition controller 504 or the input event dispatcher 508 to change the silos displayed and/or to determine types of input received in the silos.

A panel manager 536 is operable to display panels in the user interface to manage transitions between those panels or to affect user interface inputs received in the panel. The panel manager 536 may thus be in communication with different user interface panels such as a global panel 516, a volume panel 520, a settings panel 524, and/or a notification panel 528. The panel manager 536 can display these types of panels depending on the inputs received from the input event dispatcher 508. The global panel 516 may include information that is associated with the home screen or top level hierarchal information for the user. A volume panel 520 may display information about an audio volume control or other settings for volume. A settings panel 524 can include information displayed about the settings of the audio or video, or other settable characteristics of the Intelligent TV 100. A notification panel 528 can provide information about notifications to a user. These notifications can be associated with information, such as, video on demand displays, favorites, currently provided programs, or other information. Notifications can be associated with the media or with some type of setting, or operation or the Intelligent TV 100. The panel manager 536 may be in communication with the panel controller 552 of the silo application 512.

The panel controller 552 may operate to control portions of the panels of the types described previously. Thus, the panel controller 552 may be in communication with a top panel application 540, an application panel 544, and/or bottom panel 548. These types of panels may be differently displayed in the user interface of the Intelligent TV 100. The panel control thus may be based on the configuration of the system or the type of display being used currently, put the types of panels 516-528 into a certain display orientation governed by the top panel application 540, application panel 544, or bottom panel application 548.

An embodiment of the data service 432 and the operation of the data management is shown in FIG. 6. The data management 600 can include one or more code components that are associated with different types of data. For example, there may be code components within the data service 432 that execute and are associated with video on demand, the electronic program guide, or media data. There may be more or fewer types of data service 432 components than those shown in FIG. 6. Each of the different types of data may include a data model 604-612. The data models govern what information is to be stored and how that information will be stored by the data service. Thus, the data model can govern regardless of where the data comes from, how the data will be received or managed within the Intelligent TV system. Thus, the data model 604, 608, and/or 612, can provide a translation ability or affect the ability to translate data from one form to another to be used by the Intelligent TV 100.

The different types of data services (video on demand, electronic programming guide, media) each have a data subservice 620, 624, and/or 628 that is in communication with one or more internal and/or external content providers 616. The data subservices 620, 624, and 628 that communicate with the content providers 616 to obtain data that may then be stored in databases 632, 636, and 640. The subservices 620, 624, and 628 may communicate with and initiate or enable one or more source plug-ins 644, 648, and 652 to communicate with the content provider. For each content provider 616, there may be a different source plug-in 644, 648, and 652. Thus, if there is more than one source of content for the data, each of the data subservices 620, 624, and 628 may determine and then enable or initiate a different source plug-in 644, 648, and/or 652. The content providers 616 may also provide information to a resource arbitrator 656 and/or thumbnail cache manager 660. The resource arbitrator 656 may operate to communicate with resources 664 that are external to the data service 432. Thus, the resource arbitrator 656 may communicate with cloud based storage, network based storage, or other types of external storage in the resources 664. This information may then be provided through the content provider module 616 to the data subservices 620, 624, 628. Likewise, a thumbnail cache manager 660 may obtain thumbnail information from one of the data subservices 620, 624, 628 and store that information in the thumbnails database 668. Further, the thumbnail cache manager 660 may extract or retrieve that information from the thumbnails database 668 to provide to one of the data subservices 620, 624, 628.

Figure 13:
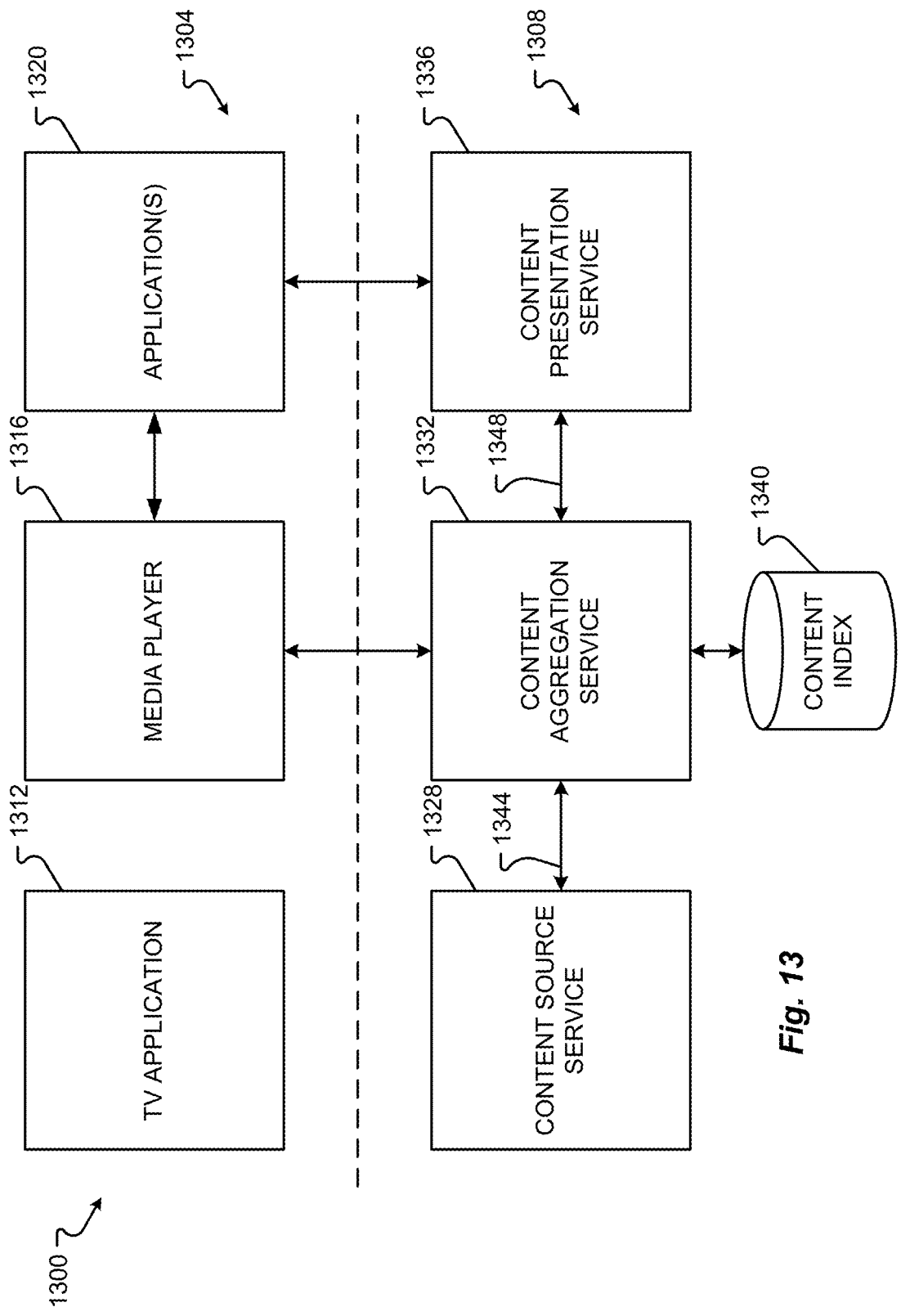
FIG. 13 is a block diagram of an embodiment of a content data service.

An exemplary content aggregation architecture 1300 is shown in FIG. 13. The architecture can include a user interface layer 1304 and a content aggregation layer 1308. The user interface layer 1304 may include a TV application 1312, media player 1316, and application(s) 1320. The TV application 1312 enables the viewer to view channels received via an appropriate transmission medium, such as cable, satellite, and/or the Internet. The media player 1316 views other types of media received via an appropriate transmission medium, such as the Internet. The application(s) 1320 include other TV-related (pre-installed) applications, such as content viewing, content searching, device viewing, and setup algorithms, and coordinates with the media player 1316 to provide information to the viewer.

The content source layer 1308 includes, as data services, a content source service 1328, a content aggregation service 1332 and a content presentation service 1336. The content source service 1328 can manage content source investigators, including local and/or network file system(s), digital network device manager (which discovers handheld and non-handheld devices (e.g., digital media servers, players, renderers, controllers, printers, uploaders, downloaders, network connectivity functions, and interoperability units) by known techniques, such as a multicast universal plug and play or UPnP discovery techniques, and, for each discovered device, retrieves, parses, and encodes device descriptors, notifies the content source service of the newly discovered device, and provides information, such as an index, on previously discovered devices), Internet Protocol Television or IPTV, digital television or DTV (including high definition and enhanced TV), third party services (such as those referenced above), and applications (such as Android applications).

Content source investigators can track content sources and are typically configured as binaries. The content source service 1328 starts content source investigators and maintains open and persistent channels for communications. The communications include query or command and response pairs. The content aggregation service 1332 can manage content metadata fetchers, such as for video, audio, and/or picture metadata. The content presentation service 1336 may provide interfaces to the content index 1340, such as an Android application interface and digital device interfaces.

The content source service 1328 can send and receive communications 1344 to and from the content aggregation service 1332. The communications can include notifications regarding new and removed digital devices and/or content and search queries and results. The content aggregation service 1332 can send and receive communications 1348 to and from the content presentation service 1336 including device and/or content lookup notifications, content-of-interest advisories and notifications, and search queries and results.

When a search is performed, particularly when the user is searching or browsing content, a user request may be received from the user interface layer 1300, by the content presentation service 1336, which responsively opens a socket and sends the request to the content aggregation service 1332. The content aggregation service 1332 first returns results from the local database 1340. The local database 1340 includes an index or data model and indexed metadata. The content source service 1328 further issues search and browse requests for all content source investigators and other data management systems. The results are forwarded to the content aggregation service 1332, which updates the database 1340 to reflect the further search results and provides the original content aggregation database search results and the data updates, reflecting the additional content source service search results, over the previously opened socket to the content presentation service 1336. The content presentation service 1336 then provides the results to one or more components in the user interface layer 1300 for presentation to the viewer. When the search session is over (e.g., the search session is terminated by the user or by an action associated with user), the user interface layer 1300 disconnects the socket. As shown, media can be provided directly by the content aggregation service 1332 to the media player 1316 for presentation to the user.

Figure 7:
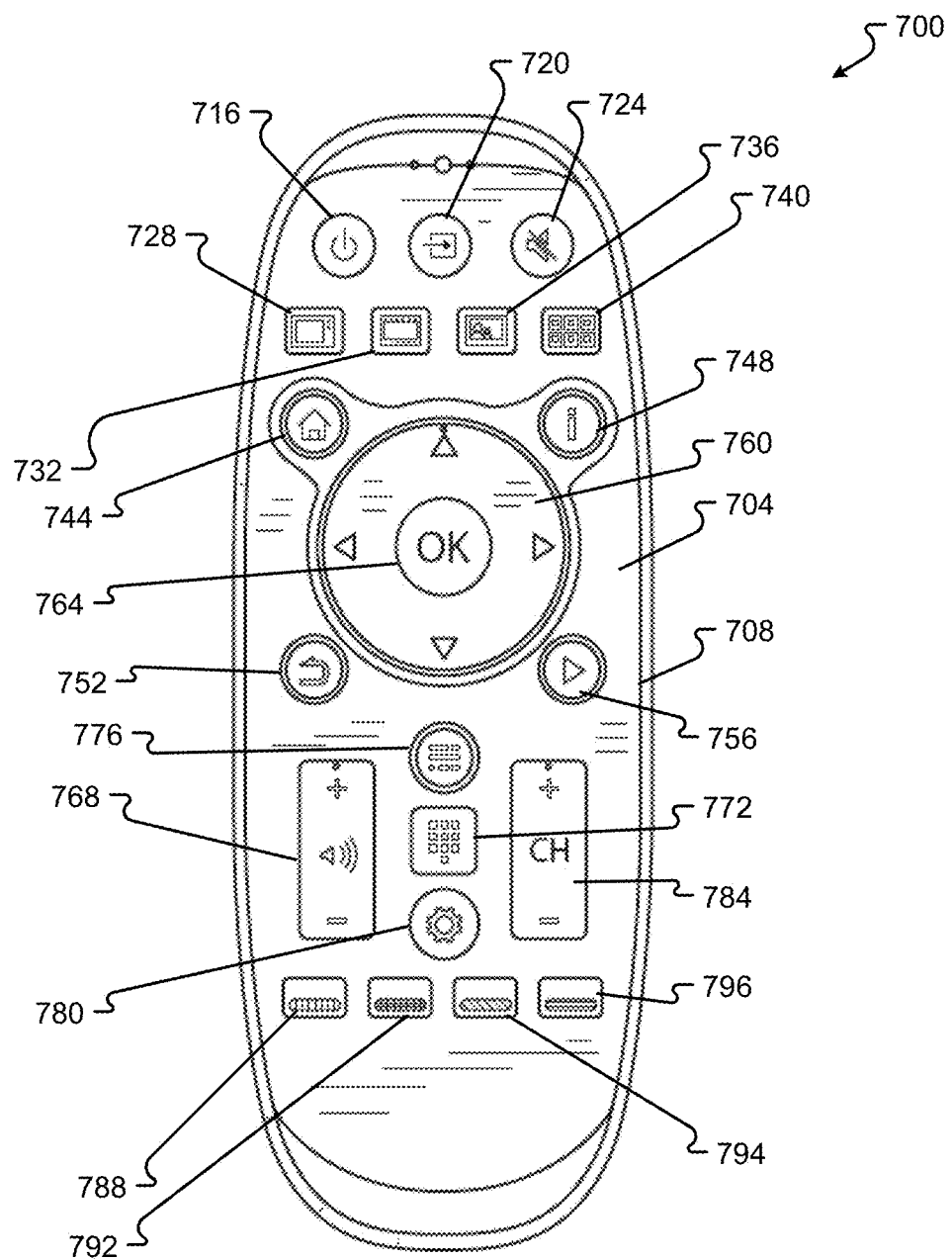
FIG. 7 is a plan view of an embodiment of a handheld remote control.
Figure 8:
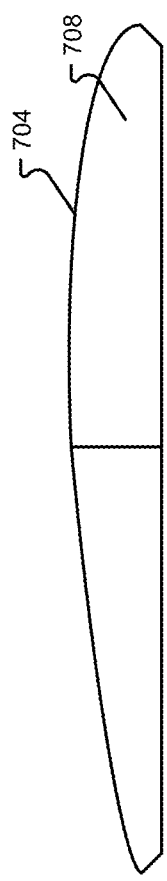
FIG. 8 is a side view of an embodiment of a remote control.
Figure 9A:
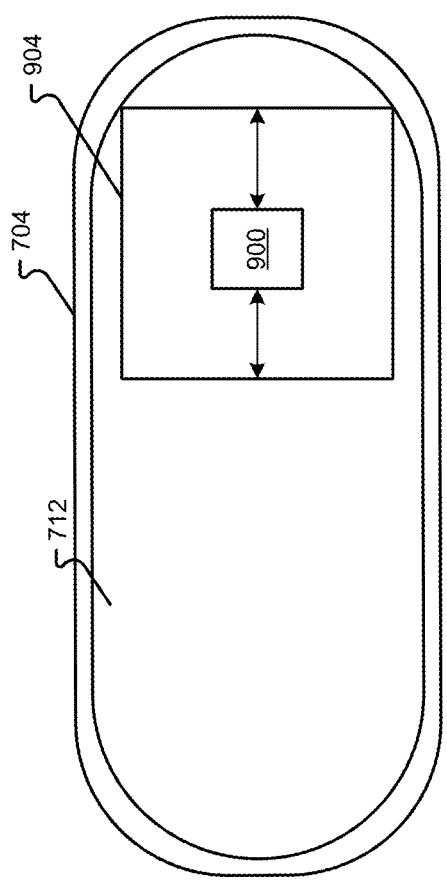
FIG. 9A is a bottom view of an embodiment of a remote control with a joystick in a neutral position.

Remote Control:

A handheld remote control can be provided to enable user interaction with the Intelligent TV 100. An exemplary handheld remote control is shown in FIGS. 7-9. The remote control 700 can include one or more of, but is not limited to, top, side and bottom housings 704, 708, and 712, an (on/off) power button 716, an input source button 720 (to select input source such as Live TV, video on demand, media center, application center, high definition multimedia interface or HDMI, component or COMP, audio/Video or A/V, digital or analog television or DTV/ATV, and video graphics array (VGA)), a (volume) mute button 724, a Live TV button 728

(to activate or select the Live TV silo), a video on demand (VOD) button 732 (to activate or select the video on demand silo), a media center button 736 (to activate or select the media center application or silo, which access various types of media such as music, TV programming, videos, and the like), an application center button 740 (to activate or select the application center application or silo), a global panel button 744, an application panel button 748, a back button 752 (to select a prior user operation or Intelligent TV state and/or navigate up a hierarchy of any displayed image or object(s) (in which case the back button 752 does not navigate within application panels or across application silos), a play button 756 (to play or pause media), a D-pad 760 (which includes north, east, west, and south directional arrows to navigate among displayed images and/or move between levels of an application's or object's hierarchy such as application view navigation, panel navigation, and collection navigation), an OK (or select) button 764 (to select a highlighted displayed image (such as displayed speed control, rewind, forward, play, and pause objects and/or objects on menu bar or in a menu box) and/or navigate down a hierarchy of any displayed image or object(s)), a rocker-type volume-up and volume-down button 768 (to adjust the volume), a menu/guide button 772 (to select for display a menu or guide of programming), a 0-9 (number) button 776 (to display a number pad on the TV screen), a settings button 780 (which launches an application to access current and change TV settings (such as channel settings and settings used to adjust picture and sound effects (e.g., image mode (e.g., standard, playground, game, cinema, concert, and studio), brightness, contrast, saturation, color temperature, energy savings, 3D noise reduction, hue, sharpness, zoom mode (e.g., full screen, standard, smart zoom, and dot-to-dot), picture position, 3D mode, for picture, and sound retrieval system or SRS TruSurround, sound mode (e.g., standard, live 1, live 2, theatre, music, speech, user equalizer mode, Left/Right speaker balance, auto volume control, Sony/Philips Interconnect Format or S/PDIF (off, auto, pulse code modulation or PCM) for sound) and system settings (such as system (e.g., selected language for graphical user interface, user geographical and/or geopolitical location information, input method, area settings, and sleep time), network (e.g., WiFi, WiFi hotspot, WiFi direct, Point-to-Point Protocol over Ethernet or PPPoE (asymmetric digital subscriber line or ADSL), Ethernet) settings (e.g., enabled and disabled and selected and non-selected) and information (e.g., network information (e.g., electronic address such as Internet Protocol or IP address, subnet mask, gateway, domain name server information, domain name, Media Access Control or MAC address, service set identification or SSID, security information, and password information) and inline status), manage applications (e.g., currently installed applications, currently executing applications, and internal and external computer readable medium usage), and view user information regarding the Intelligent TV 100)), a rocker-type channel-up and channel-down button 784 (to increment or decrement the selected channel), and first, second, third and fourth hotkeys 788, 792, 794, and 796, and/or a moveable joystick 900 on a bottom of the remote control 700. The first, second, third, and fourth hotkeys are generally assigned different colors, which color indexing is depicted as visual indicia on a selected panel to show the currently assigned function, if any, for each hotkey. As can be seen, the actuator layout can provide a highly efficient, satisfactory, and easily usable experience to the end user.

Unlike the functional associations and functions of many of the actuators, those of some of the actuators are not readily apparent. A number of examples will now be discussed by way of illustration.

The media center button 736, when selected, can provide information regarding music, videos, photographs, collections or groupings of music, videos, and/or photographs, and internal and external computational devices (such as personal computers, laptops, tablet computers, wireless phones, removable computer readable media, and the like), which can be grouped in a selected manner (such as favorites, most recently viewed, most watched or viewed, and most recently added). The information can includes previews (which can include selected portions of the media content, duration, file size, date created, date last watched, times watched or viewed, and audio and/or video format information).

The application center button 740, when selected, may provide information regarding pre-installed and downloaded applications. Unlike downloaded applications, pre-installed applications cannot be removed by the user or manually updated. Exemplary pre-installed applications include web browser, settings control, and content search algorithms. By way of illustration, the application center button 740 can provide a scrollable graphical grid of icons (each icon being associated with an application) currently available in the application center.

The global panel button 744, when selected, can provide the user, via one or more panels or windows, with access to one or more of, but not limited to, silos, notifications, a web browser, system settings, and/or information associated therewith. For example, the global panel button 744 can enable the user to determine what external devices are currently connected to and/or disconnected from the Intelligent TV 100, determine what inputs (e.g., HDMI ports) are currently available for connecting to external devices, determine a connection and/or operational status of a selected external device and/or network (e.g., WiFi connected, Ethernet connected, and offline), assign a custom (or user selected) name to each input source, determine what content is currently being offered on Live TV, on demand, the media center, and/or the application center, access vendor messages and notifications to the user (e.g., system and/or application updates are available), activate the Internet browser, and/or access shortcuts on a displayed shortcut bar to more frequently used and desired applications. Common shortcuts are Internet browser (e.g., Internet search engine), system settings, and notifications. The common types of panels are for information (which is typically information related to a currently displayed image and/or content (e.g., title, date/time, audio/visual indicator, rating, and genre), browse requests, and/or search requests (such as search term field)). Each of the panel types may include a panel navigation bar, detailed information or relevant content to the panel function, operation and/or purpose, and a hotkey bar (defining currently enabled functional associations of hotkeys).

The application panel button 748, when selected, can display an application window or panel. One application panel may be an information panel regarding a selected (pre-installed or previously downloaded) application icon. The information panel can one or more of identify the selected application, provide a description of the functionality (including application developer and/or vendor, version, release, and/or last update date and a category or type of application based on the application's functionality) and user ratings and/or degree of other user downloading of the application (e.g., a star rating assigned based on one or more of the foregoing inputs), provide the option to launch, remove, update, and add to favorites the identified application, and provide a listing of selectable links of other (not yet downloaded) recommended applications that provide similar functionality to the identified application. The latter listing can, in turn, provide a description of the functionality (including application developer and/or vendor, version, release, and/or last update date and a category or type of application based on the application's functionality) and user ratings and/or degree of other user downloading of the application (e.g., a star rating assigned based on one or more of the foregoing inputs).

The functions of the first, second, third, and fourth hotkeys 788, 792, 794, and 796 can change depending on system state, context, and/or, within a selected screen and/or panel, based on a content or currently selected portion of (or relative cursor position on) the screen. Commonly, a currently assigned function of any of the first, second, third, and fourth hotkeys 788, 792, 794, and 796 depends on a currently accessed silo and/or panel (with which the user is currently interacting within the silo). In other words, a first function of one of the first, second, third, and fourth hotkeys 788, 792, 794, and 796 is activated by the respective hotkey in a first system state while a different second function is activated by the respective hotkey in a different second system state. In another example, a third function of one of the first, second, third, and fourth hotkeys 788, 792, 794, and 796 is activated by the respective hotkey when a user focus (or currently selected cursor position or screen portion) is at a first screen position while a different fourth function is activated by the respective hotkey when a user focus (or currently selected cursor position or screen portion) is at a different second screen position. The first screen position can, for instance, be within an icon while the second screen position is outside of the icon. Hotkey functionality that could be enabled when in the first screen position may be "configure" and "remove" and disabled is "add", and, when in the second position hotkey functionality enabled can be "add" and disabled is "configure" and "remove". Generally, the states of hotkeys can include normal (for enabled actions or functions), disabled (when an action or function is temporarily disabled), pressed (when selected by a user to command an action or function to be performed), and unavailable (when no association between the hotkey and an action or function is currently available). While examples of hotkey functions are discussed below, it is to be understood that these are not intended to be exhaustive or limiting examples.

The first hotkey 788, when selected in a first system state, can enable the user to assign, change, or edit a name of an input source. It is typically enabled only when the input source of HDMI, Comp/YPbPr (e.g., component video cables), video output, and VGA is in focus. When selected in a second system state, the first hotkey 788 can return the user to a top of a scrollable collection of objects, such as application icons.

The second hotkey 792 may show all or less. In other words, the hotkey 792 can allow the user to show all inputs, including the unconnected/undetected ones and to hide the unconnected/undetected inputs, e.g., to expand and collapse the silo/input list. Each input source can have one of two states, namely connected/detected and unconnected/undetected. Some input sources, including Live TV, video on demand, media center, and application center are always connected/detected.

Figure 9B:
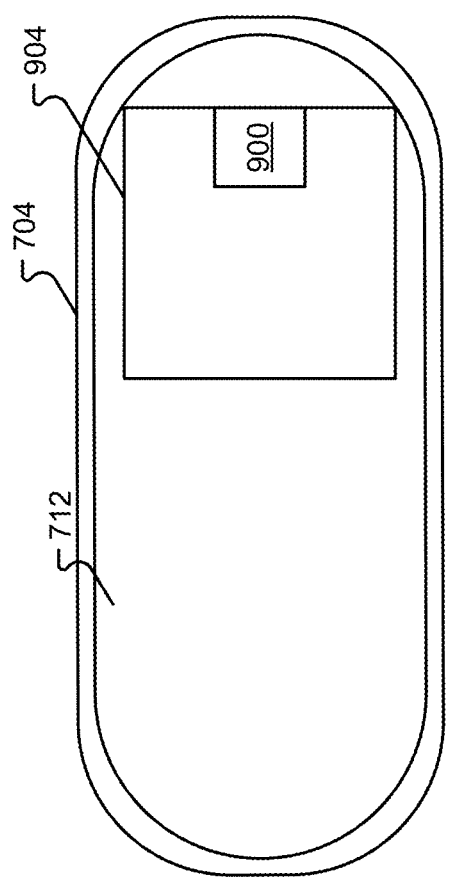
FIG. 9B is a bottom view of an embodiment of a remote control with the joystick in a lower position.
Figure 9C:
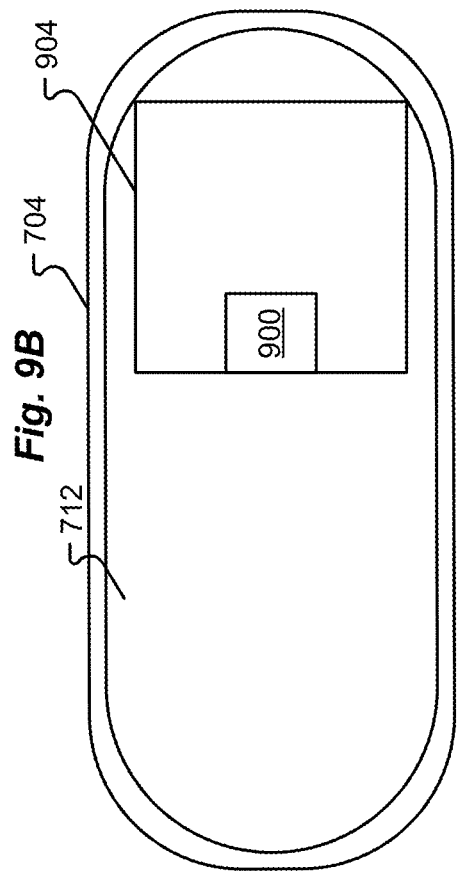
FIG. 9C is a bottom view of an embodiment of a remote control with the joystick in an upper position.
Figure 11B:
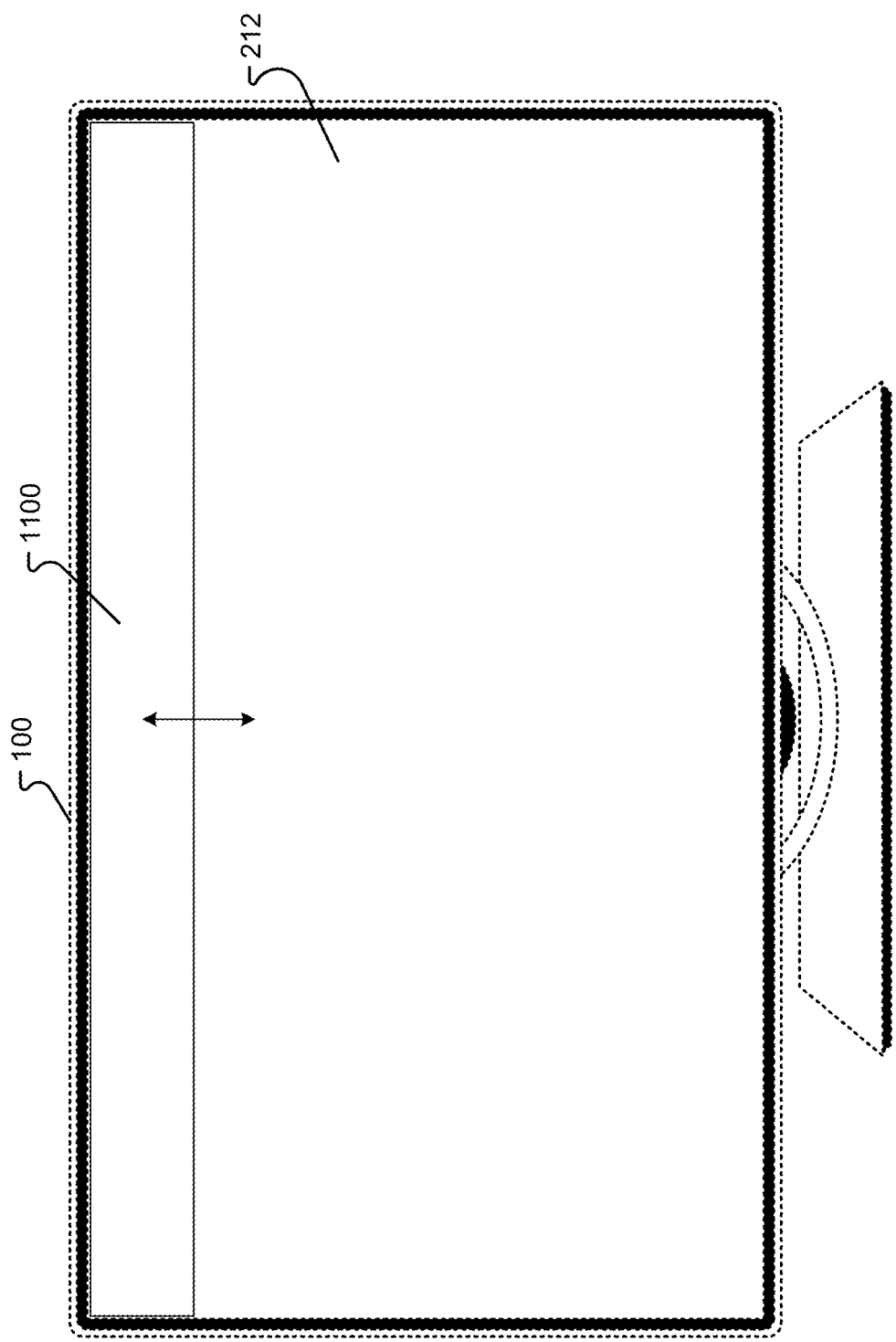
FIG. 11B is a front view of an embodiment of an Intelligent TV screen.

The moveable joystick 900 on the bottom of the remote control 700, when manipulated, can cause a displayed image on the Intelligent TV 100 screen to be displaced a proportional amount. In other words, the displayed image is displaced substantially simultaneously with displacement of the joystick 900 within the joystick aperture 904 in the bottom housing 712 of the remote control. As shown in FIGS. 9B-C, the joystick 900 moves or slides between forward and reverse positions. Releasing the joystick 900 causes the joystick 900 to return to the center position of FIG. 9A, and the window to move or slide upwardly (when the joystick is released from the joystick position of FIG. 9B) or downwardly (when the joystick is released from the joystick position of FIG. 9C) until it disappears from view as shown in FIG. 11A. The effect on the screen of the Intelligent TV 100 is shown in FIGS. 11A-C. In FIG. 11A, video content, such as TV programming, a video, movie, and the like, is being displayed by front surface of the screen 212. In FIG. 11B, the joystick 900 is moved or slid to the upper position of FIG. 9B, and a drop down window or panel 1100 moves or slides down (at the substantially the same rate of joystick 900 movement) at the top of the screen 212. In FIG. 11C, the joystick 900 is moved or slid to the lower position of FIG. 9C, and a drop up window or panel 1100 moves or slides up (at the substantially the same rate of joystick 900 movement) at the bottom of the screen 212. The window 1100 partially covers the video content appearing on the remainder of the screen 212 and/or causes a portion of the screen 212 displaying video content to move and/or compress up or down the height of the window 1100.

The window 1100 can include one or more of information (which is typically information related to a currently displayed image and/or content (e.g., panel navigation bar, detailed information (e.g., title, date/time, audio/visual indicator, rating, and genre), and hotkey bar (defining current functional associations of hotkeys)), browse requests, and/or search requests. Commonly, the window 1100 includes suitable information about the content (such as name, duration, and/or remaining viewing duration of content), settings information, TV or system control information, application (activation) icons (such as for pre-installed and/or downloaded applications such as application center, media center and Web browser), and/or information about input source(s), When the joystick 900 is in either the forward or reverse position, the user can select an actuator on the front of the remote control, such as the OK button 764, and be taken, by displayed images on the screen 212, to another location in the user interface, such as a desktop. This process can be done in a nonintrusive manner and without affecting the flow of content that is pushed up or down. The joystick 900 could be moved, additionally or differently, from side-to-side to cause the window to appear at the left or right edge of the screen 212.

Figure 10:
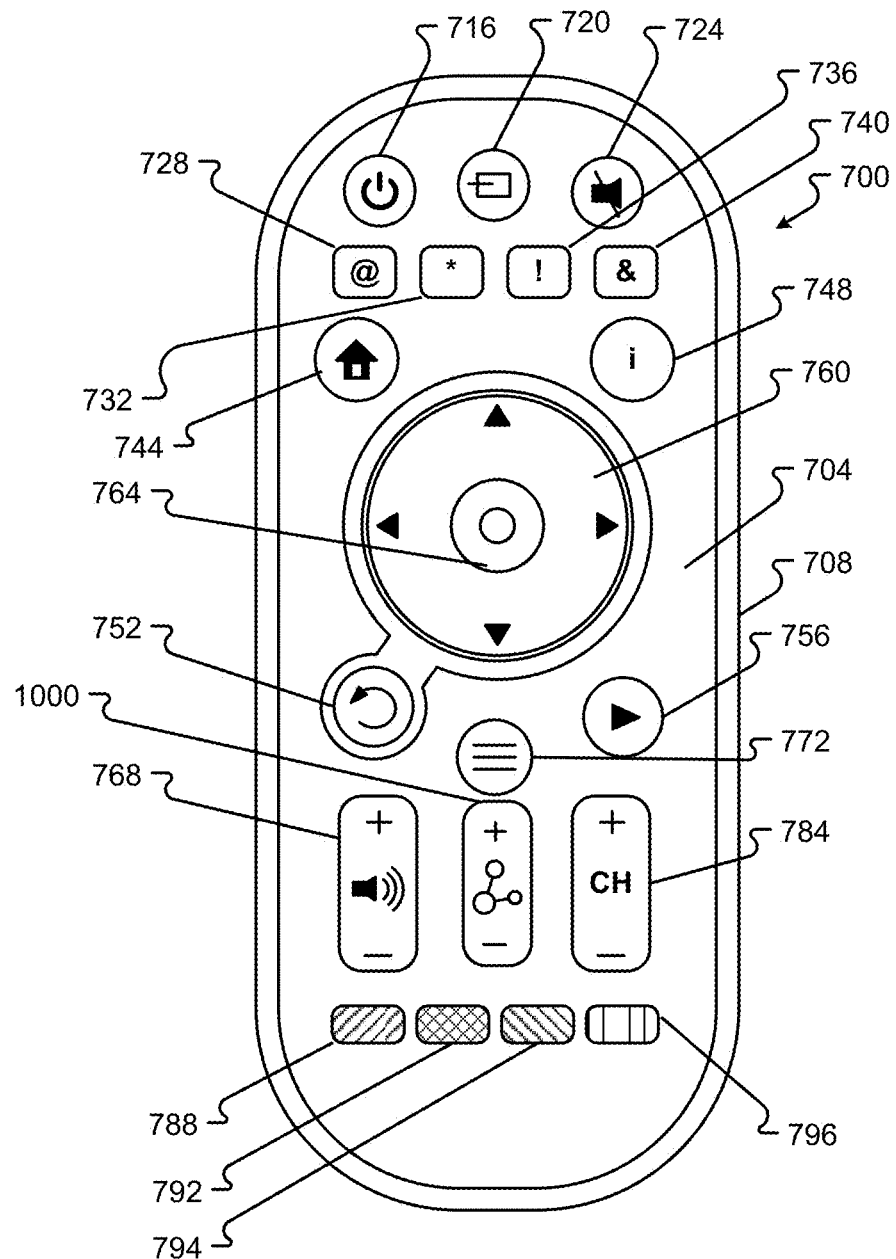
FIG. 10 is a plan view of another embodiment of a handheld remote control.

An alternative actuator configuration is shown in FIG. 10. The actuators are substantially the same as those of FIGS. 7-9 except that the social network button 1000, when selected, can automatically select content and publish, via a social network service or other social media, the content to a social network or online community. User or viewer comments and/or other messages can be included in the outbound message. For example, all or one or frames or portions of media content (such as a video, music, a photograph, a picture, or text) can be provided automatically to a predetermined or selected group of people via Linked-In™, Myspace™, Twitter™, YouTube™, DailyMotion™, Facebook™, Google+™) or Second Life™. The user, upon activating the button 1000 could, in response, select a social forum or media upon which the selected content (which is the content displayed to the user when the social network button 1000 is activated) is to be posted and/or a predetermined group within that social media to which the content is to be posted. Alternatively, these selections could be preconfigured or preselected by the user.

The social network button can also be used to "turn up" or "turn down" a social volume visualization. The Intelligent TV 100 can create dynamically a visualization of aggregated connections (and inbound and/or outbound messages) from a variety of social networks. The aggregation (and inbound and outbound messages) can be depicted graphically on the screen as a volume of connections to influence the viewer user. With a social volume visualization, selected contents of each linked social network profile of a social contact (and inbound and/or outbound messages from or to the linked social network contact and/or current activity of the social contact (such as watching the same programming or content the viewer is currently watching) can be presented in a separate tile (or visually displayed object). The size of the tile can be related to any number of criteria, including a relationship of the linked social contact (e.g., a relative degree of importance or type of relationship can determine the relative size of the tile, a degree of influence of the linked social contact to the current viewer, a geographic proximity of the linked social contact to the current viewer, a degree to which the currently provided media content is of interest to both the viewer and linked social contact (e.g., both parties enjoy war movies, murder mysteries, musicals, comedies, and the like), an assigned ranking of the linked viewer by the viewer, a type of social network type linking the viewer with the linked social contact, a current activity of the social network contact (e.g., currently watching the same content that the viewer is currently watching), a current online or offline status of the linked social contact, and a social network grouping type or category to which both the viewer and linked social contact belong (e.g., work contact, best friend, family member, etc.).

The viewer can designate a portion of the screen to depict the social network aggregation. By turning the social volume up (+) or down (−), the viewer can increase the size and/or numbers of linked contact tiles provided to the viewer. In other words, by increasing the social volume the viewer can view, access, and/or push more social content from those of his or her social networks associated with him or her in a memory of the Intelligent TV. By decreasing the social volume, the viewer can view, access, and/or push less social content from his or her associated social networks. By selecting the mute button 724, the viewer can stop or pause any interactivity with his or her associated social networks (e.g., inbound or outbound messages). Social volume and/or mute can be separated into two (or more) volume settings for outbound and inbound social network activity. By way of illustration, a first volume setting, control, and/or button can control the volume for outbound social network activity (e.g., outbound social messages) while a second (different) volume setting, control, and/or button can control the volume for inbound social network activity (e.g., inbound social messages). By way of further illustration, a first mute setting, control, and/or button can stop or pause outbound social network activity (e.g., outbound social messages) while a second (different) mute setting, control, and/or button can stop or pause inbound social network activity (e.g., inbound social messages).

Figure 12:
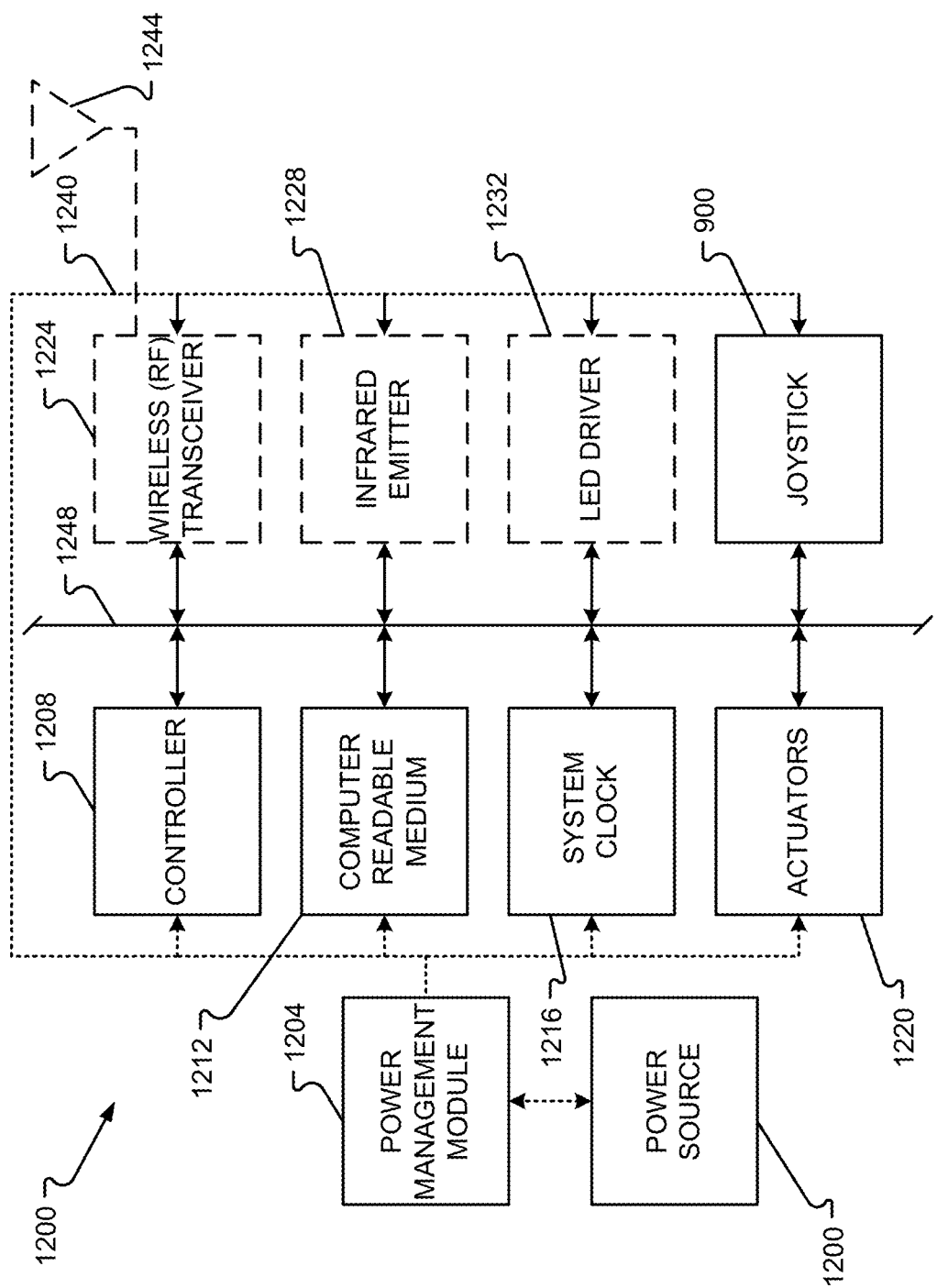
FIG. 12 is a block diagram of an embodiment of a handheld remote control of either FIG. 7 or 10.

A functional block diagram of the remote control is shown in FIG. 12. The remote control 700 includes a controller 1208 to control and supervise remote control operations, optional wireless (RF) transceiver 1224 and antenna 1244 to send and receive wireless signals to and from the Intelligent TV 100 and other external components, optional infrared emitter 1228 to emit infrared signals to the Intelligent TV 100, optional light emitting diode or LED driver 1232 to control LED operation to provide video-enabled feedback to the user, actuators 1220 (including the various buttons and other actuators discussed above in connection with FIGS. 7 and 10), and joystick 900, all interconnected via a bus 1248. An on board power source 1200 and power management module 1204 provide power to each of these components via power circuitry 1240. The infrared emitter 1228 and receiver (not shown) on the Intelligent TV system 100 can be used to determine a displayed object illuminated by the infrared signal and therefore adjust the displayed image, for example to indicate a focus of the user (e.g., illuminate a displayed object or show cursor position relative to displayed objects on the screen) and to determine and activate a desired command of the user. This can be done by tracking a position of the remote control in relation to infrared tracking reference points (e.g., a sensor bar or infrared LED's) positioned on or adjacent to the screen of the Intelligent TV 100. Motion tracking can further be augmented using position information received from a multi-axis gyroscope and/or accelerometer on board the remote control (not shown).

Figure 14A:
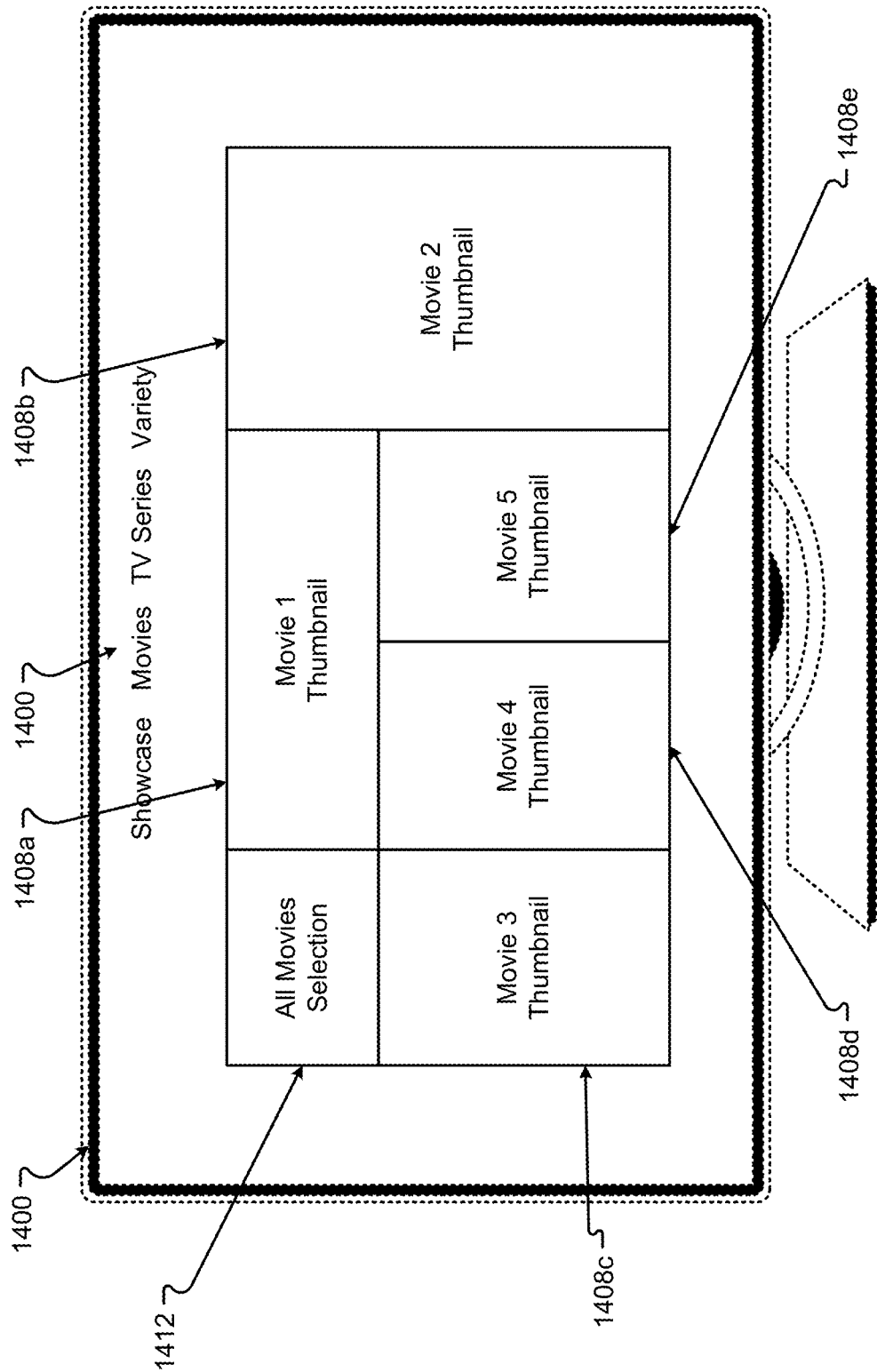
FIG. 14A is a view of an embodiment of a user interface for an Intelligent TV.
Figure 14B:
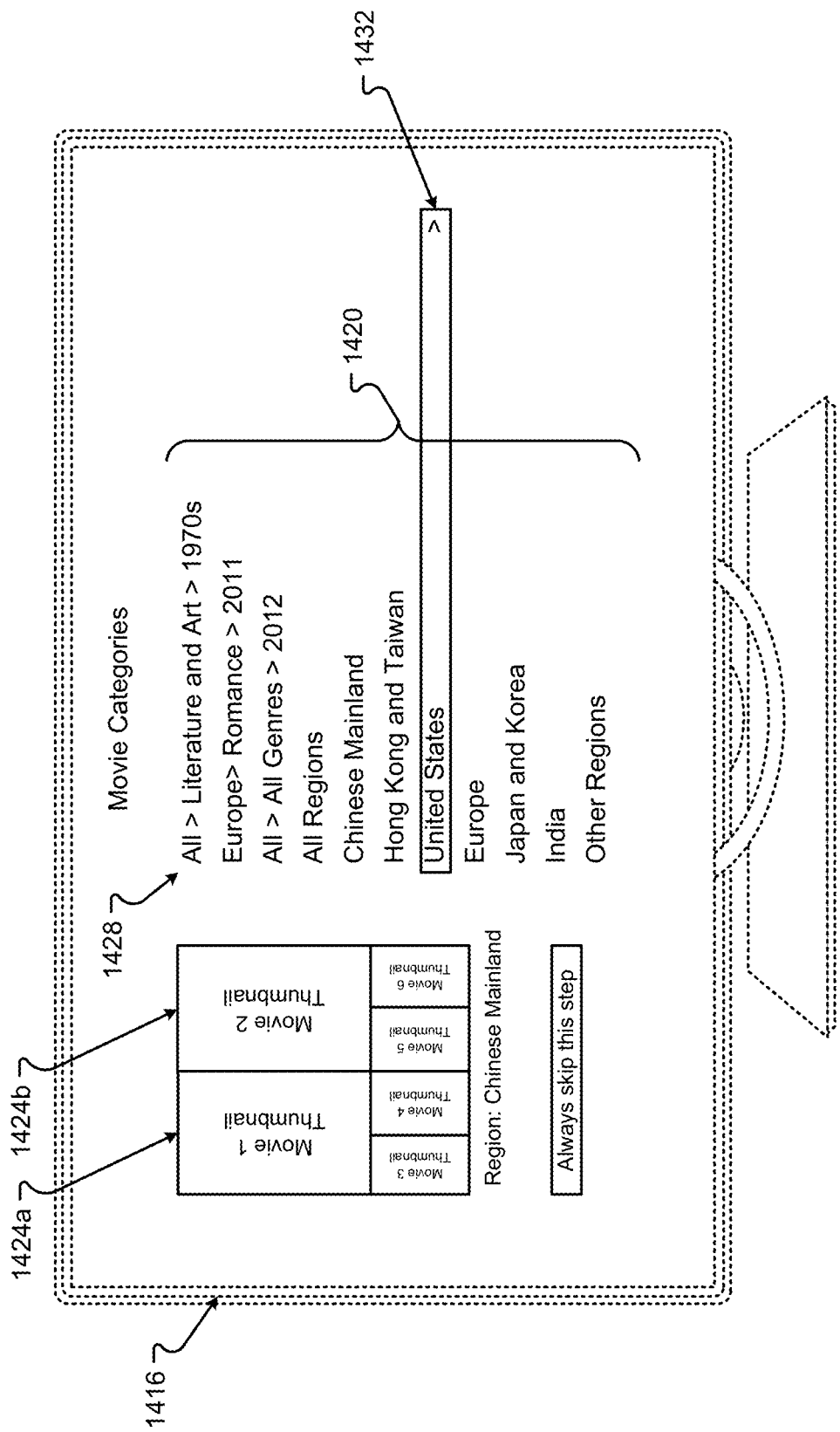
FIG. 14B is a view of an embodiment of a user interface for an Intelligent TV.

A series of television screen shots are depicted in FIGS. 14A through 14H. These screen shots depict a navigation through different menus or user interfaces related to the selection of content for a movie center or media center application. A first screen shot 1400 depicts a top menu for selecting a movie after selecting a movies category 1404. User interface 1400 can include several thumbnail depictions of movies that may be selectable to view, 1408a through 1408f. Another selectable icon 1412 may be selected to view movies or selections of movies based on different categories. If the icon 1412 is selected, a new user interface 1416 is provided as shown in FIG. 14B.

Figure 14C:
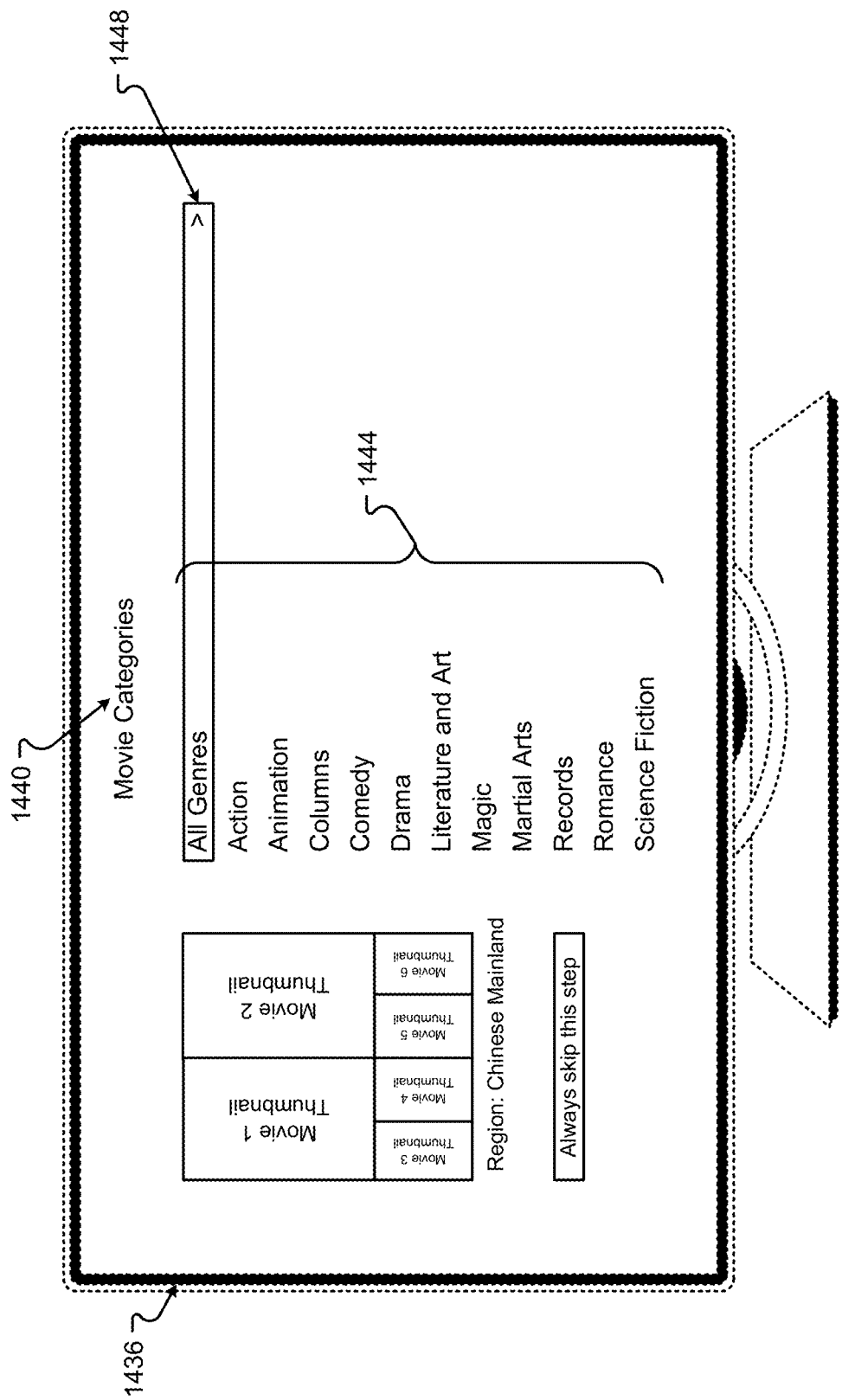
FIG. 14C is a view of an embodiment of a user interface for an Intelligent TV.

In new user interface 1416, the movie selections are organized by high level categories 1420. Furthermore, thumbnails 1424A and 1424B, etc., are also provided that may provide direct access to the displayed movies associated with the thumbnails depicted on screen 1416. The categories 1420 may include one or more selectable category names 1428. These selectable categories 1428 can include different methods of organizing the movies within the media center. If selectable category 1432 is selected, a new user interface 1436 is provided as shown in FIG. 14C.

Figure 14D:
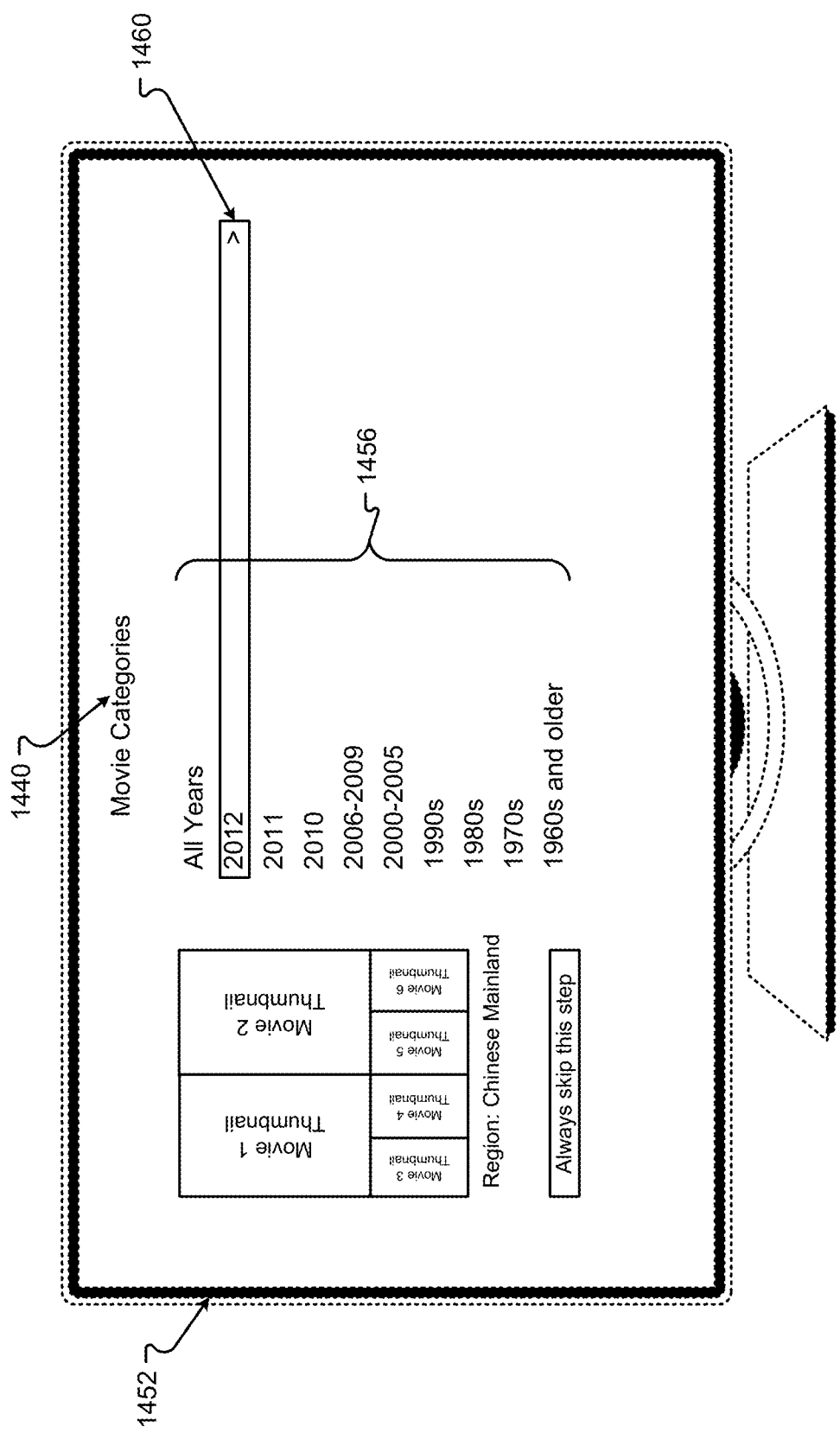
FIG. 14D is a view of an embodiment of a user interface for an Intelligent TV.
Figure 14E:
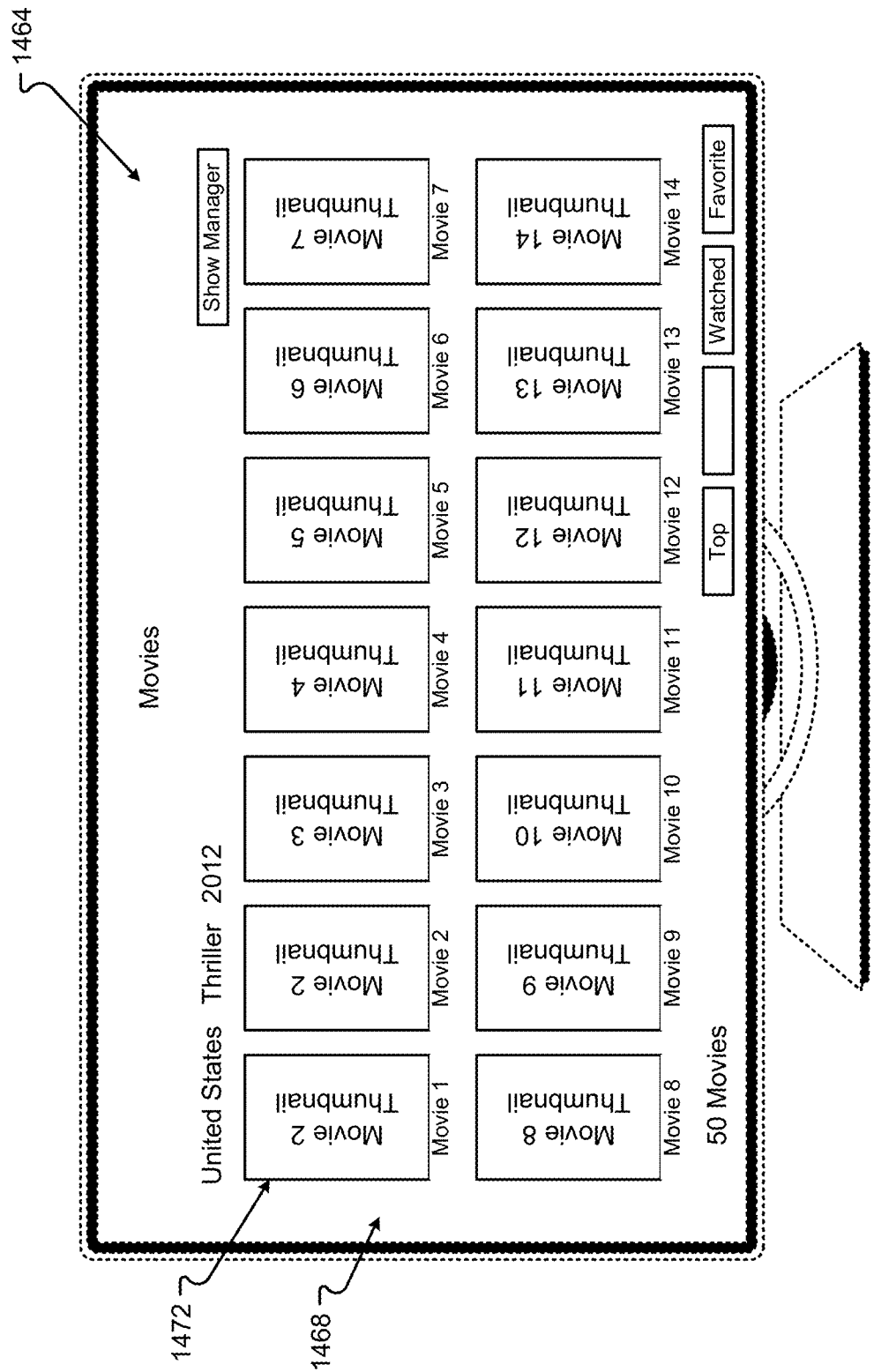
FIG. 14E is a view of an embodiment of a user interface for an Intelligent TV.

In new user interface 1436, the movie categories 1440 are further organized into different categories 1444. By selecting user selectable category 1448, a new user interface 1452 is provided as shown in FIG. 14D. Here, the categories are further broken down by year as shown in selections 1456. If user selection 1460 is selected by the user using a user interface device, a new user interface presentation 1464 is provided as shown in FIG. 14E.

Figure 14F:
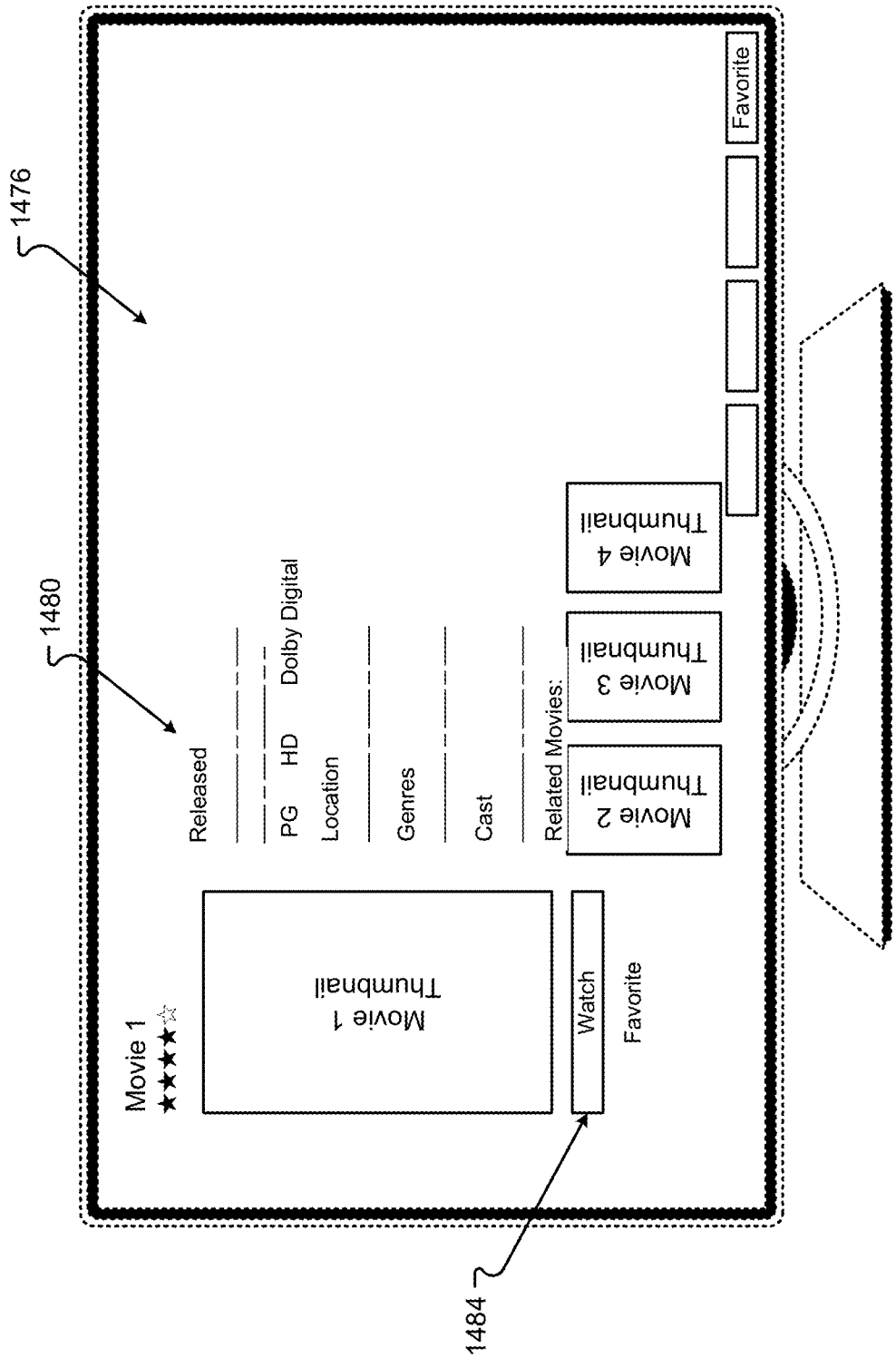
FIG. 14F is a view of an embodiment of a user interface for an Intelligent TV.
Figure 14G:
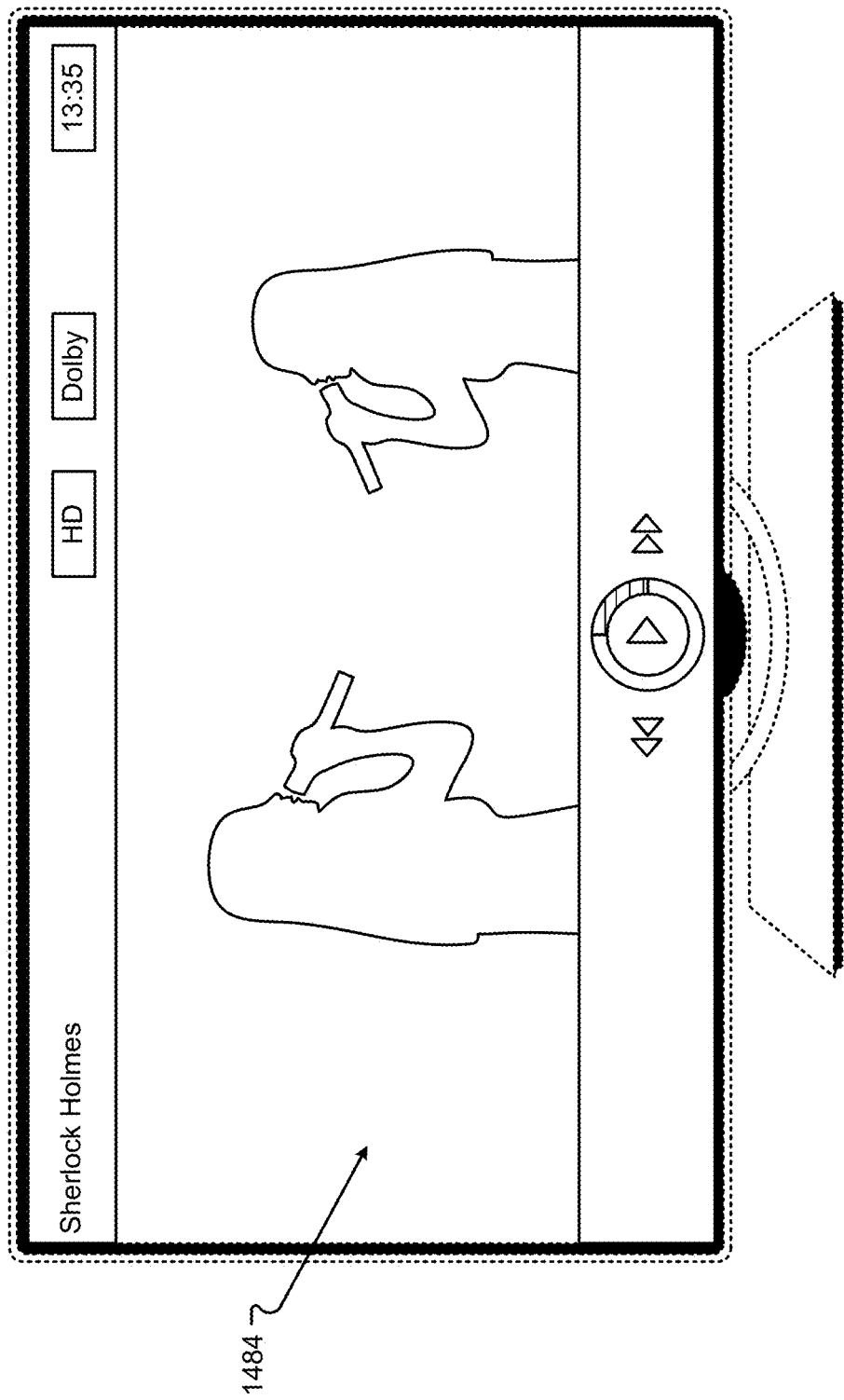
FIG. 14G is a view of an embodiment of a user interface for an Intelligent TV.
Figure 14H:
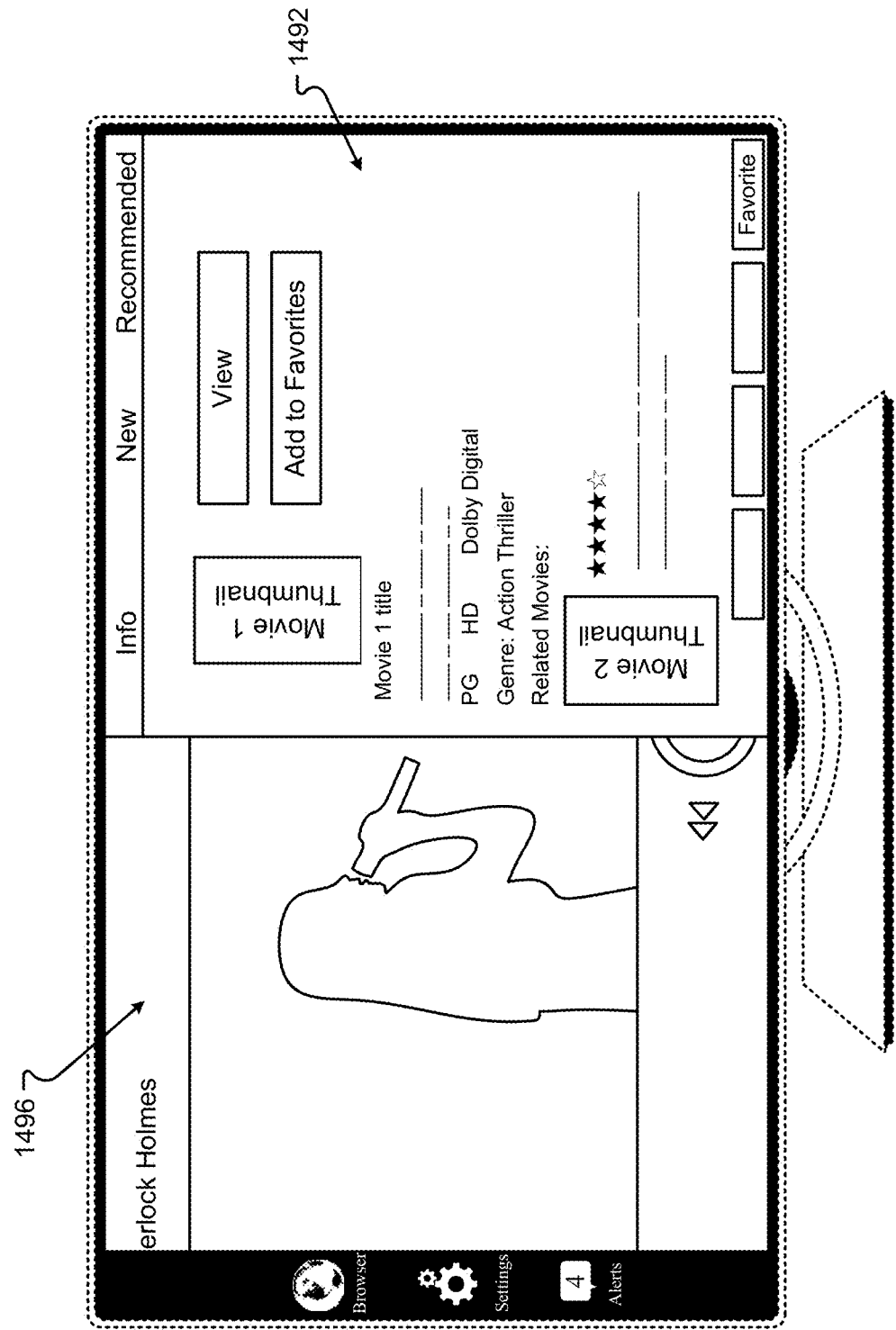
FIG. 14H is a view of an embodiment of a user interface for an Intelligent TV.

One or more movie thumbnails may then be shown that are associated with the selected categories. The movie thumbnails 1468 may each be selectable to present the movie associated with the thumbnail for the user. If movie thumbnail 1472 is selected, then the movie associated with the thumbnail 1472 may be shown or information screen 1476, as depicted in FIG. 14F, may be provided. The user interface screen 1476 may provide information 1480 for the movie selected in user interface screen 1464. The user selects the user selectable device 1484 to play the movie. In user interface 1476, the movie associated with the information 1480 may then be presented, as shown in user interface 1488 in FIG. 14G. The user, at some point, may access an applications panel 1492, as depicted in user interface 1496 in FIG. 14H. The applications panel 1492 may provide information about the movie being displayed in user interface 1496. The above process shows the steps and different user interfaces that are created and presented to the user when going through a series of steps to select media to play on the television.

A series of user interface screens 15A through 15E depict a process of user interface interactions that occur if a user selects a back button 752 to proceed through screens to reach higher menus or media center user interfaces. A first user interface 1496 is similar to that shown in FIG. 14H. Here, the application panel 1492 can be presented over a movie being presented in the screen 1496 of the television 100. Upon hitting the back button, the user interface 1488 is again presented, as shown in FIG. 15B. The application panel 1492 is hidden, and the movie can be presented in user interface 1488.

Figure 15A:
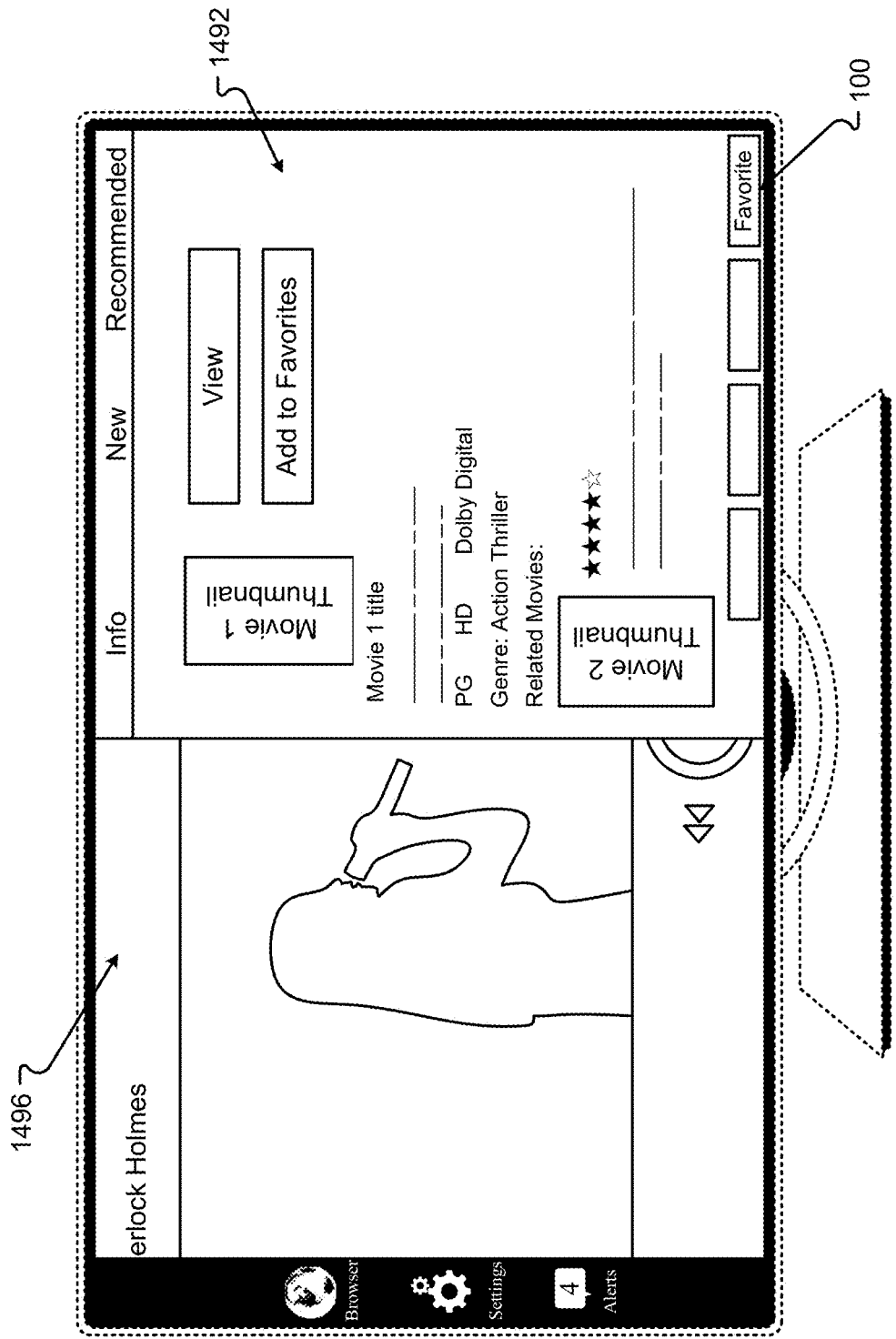
FIG. 15A is a view of an embodiment of a user interface for an Intelligent TV.
Figure 15B:
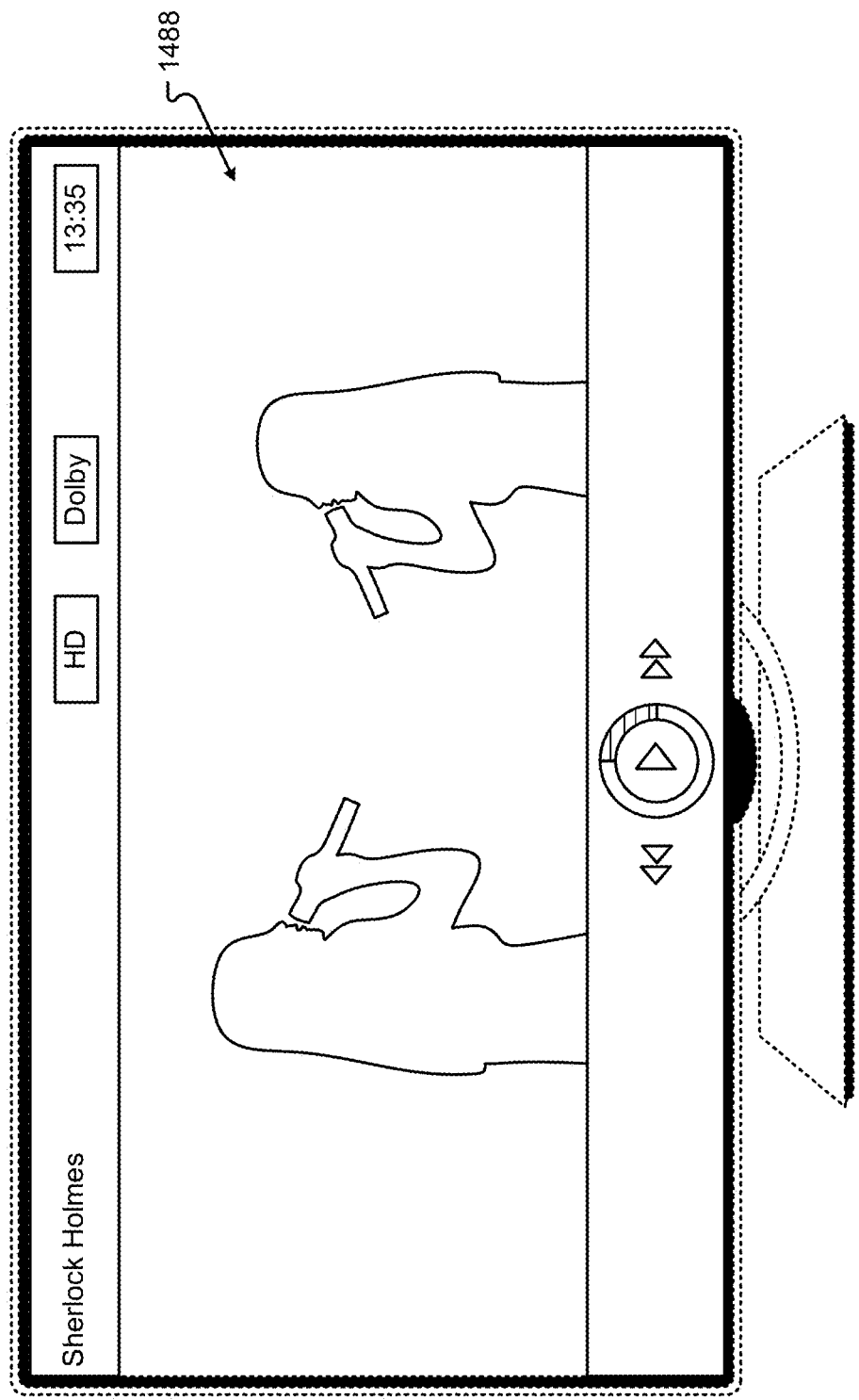
FIG. 15B is a view of an embodiment of a user interface for an Intelligent TV.
Figure 15C:
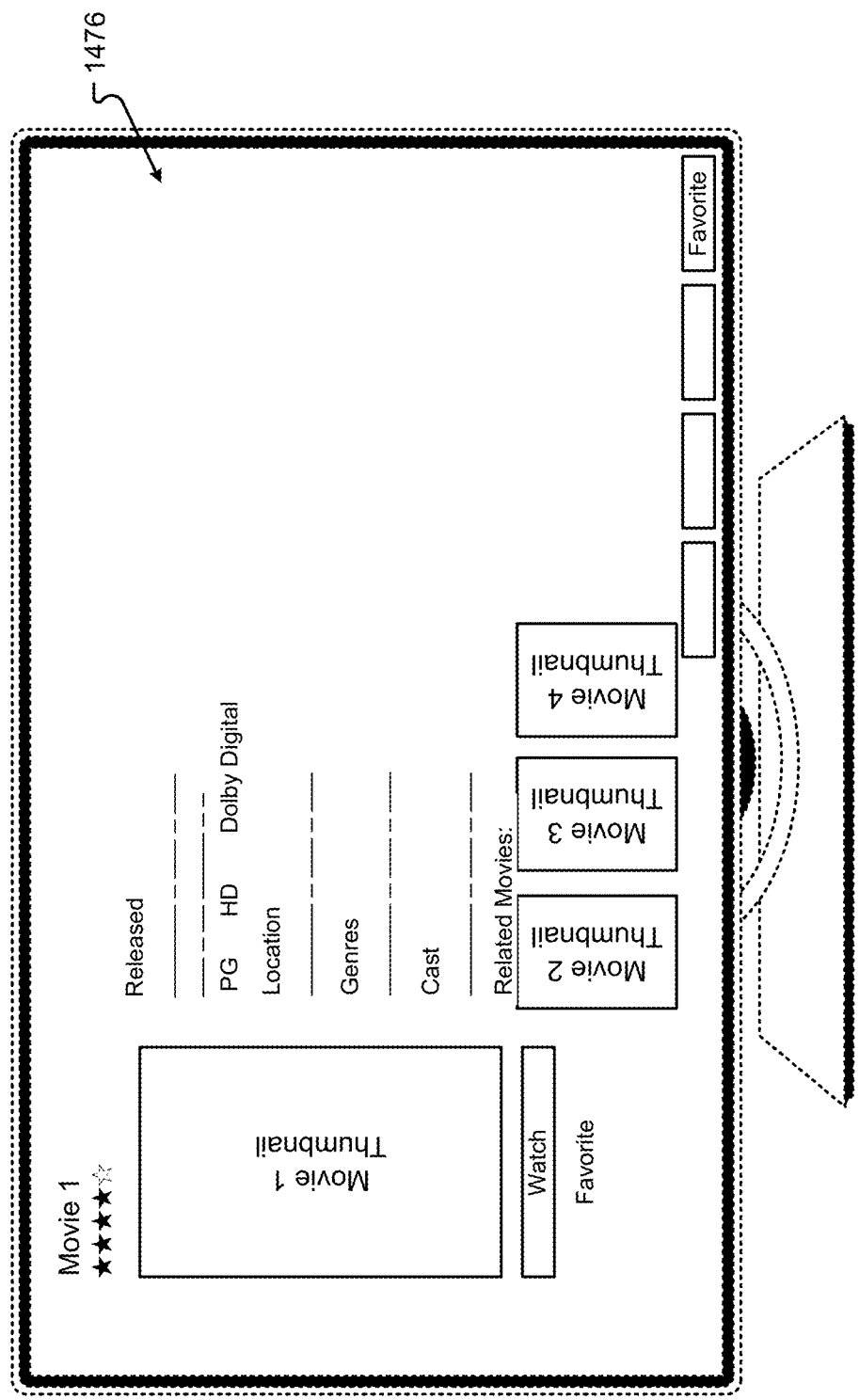
FIG. 15C is a view of an embodiment of a user interface for an Intelligent TV.
Figure 15D:
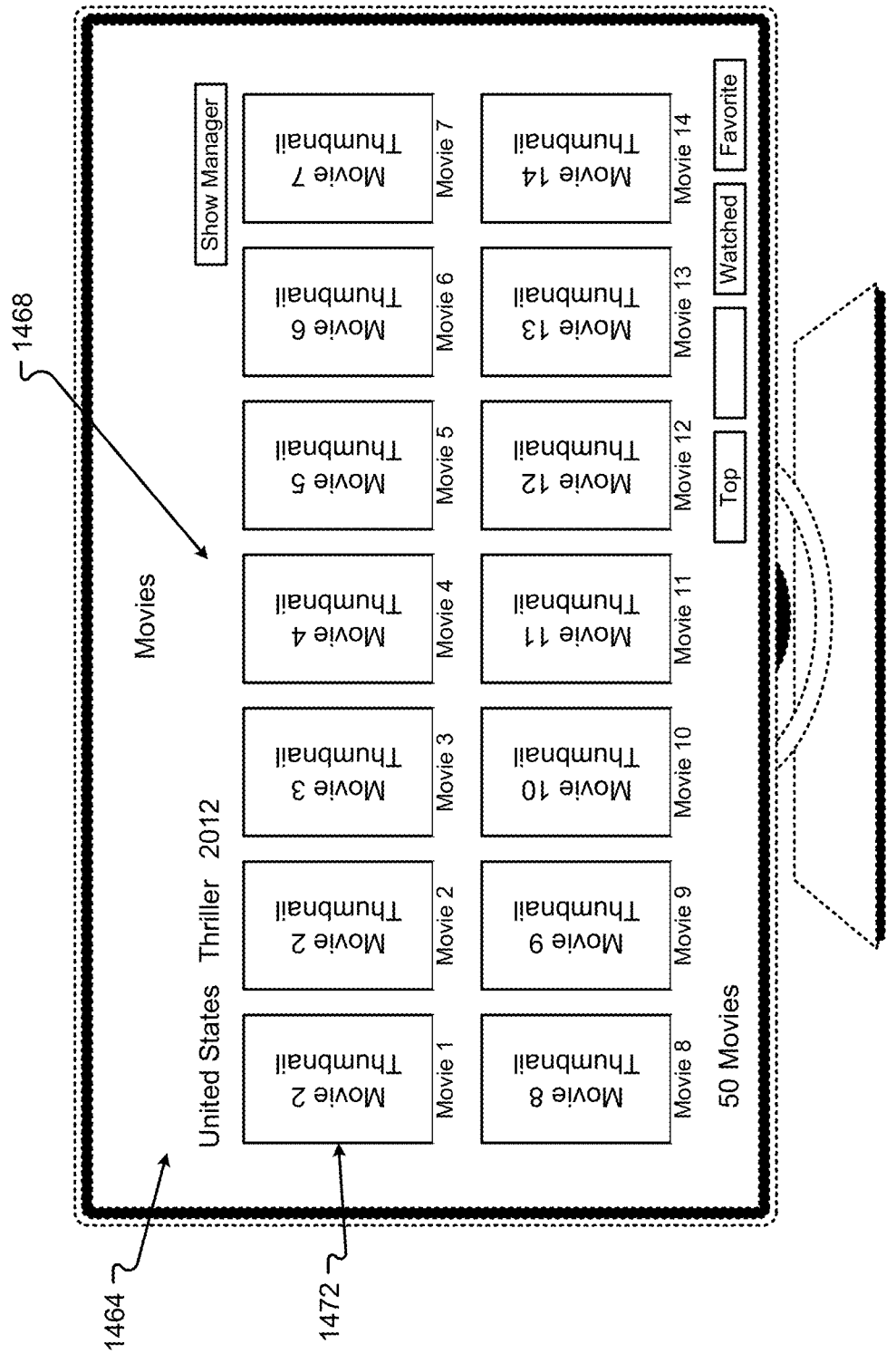
FIG. 15D is a view of an embodiment of a user interface for an Intelligent TV.
Figure 15E:
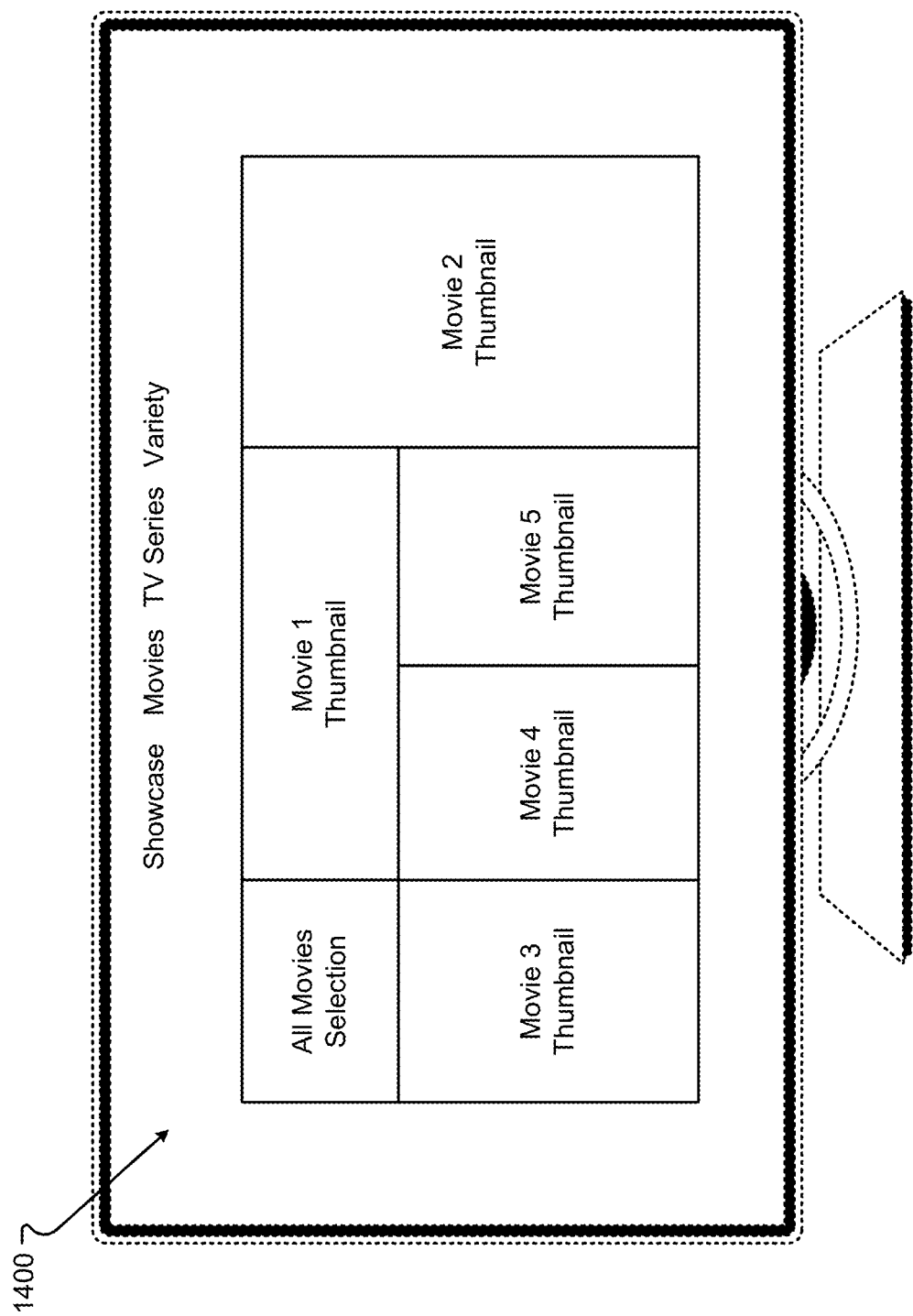
FIG. 15E is a view of an embodiment of a user interface for an Intelligent TV.

Upon hitting the back button 752 again, user interface 1476 is again presented to the user as shown in FIG. 15C. Upon hitting the back button again, user interface 1464 is again presented with thumbnail 1472 shown in the catalog listing 1468 of the different movies in the category previously selected as shown in FIG. 15D. Upon hitting the back button for another time, user interface 1400 is again provided showing a top level menu for the movies as shown in FIG. 15E.

In this way, the back button makes a more logical progression of menus for the user, and the user need not go through the same selections but may arrive at a top selection to more quickly navigate back to a search function for a different movie. The user need not go through screens which may not be applicable to a search for a new movie. This type of logical progression, using the back button, is more efficient and easier to understand for a user than going through several menus that the user may not be understood or the user may not remember navigating through.

Figure 16:
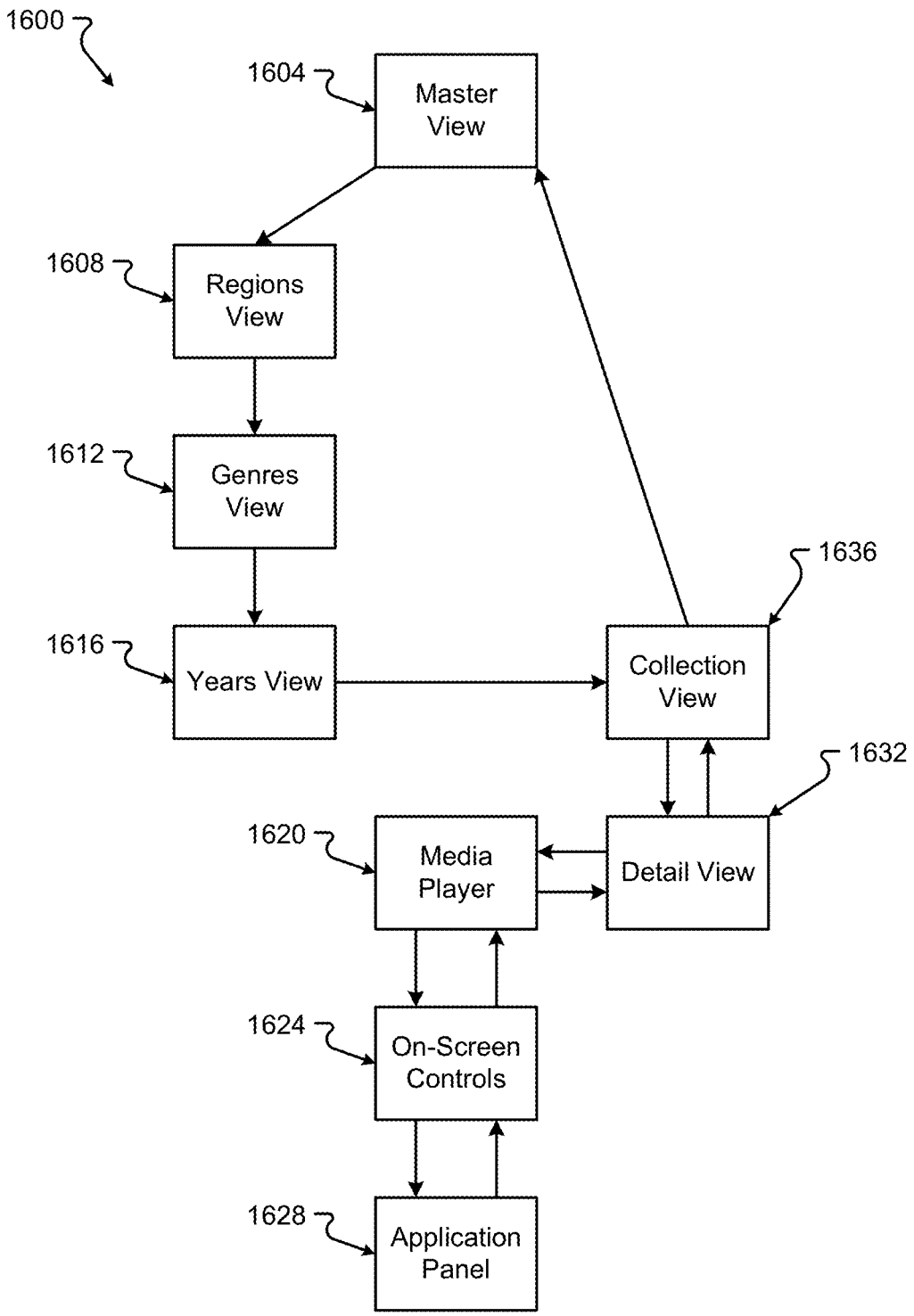
FIG. 16 is a block diagram of an embodiment of a user interface process flow from a top view to a lowest view.

A logical progression 1600 for the navigation through different user interfaces is shown in FIG. 16. As shown in the logical progression 1600, the user may begin with a master view 1604, which may be the same or similar to user interface 1400. Upon selecting user interface device 1412, a regions view 1608 may be provided, which may be the same or similar to user interface 1416. Upon selecting a category, such as category 1432, a "genres" view 1612 may be presented. A genres view 1612 may be the same or similar to user interface 1436. Upon selecting user interface device 1448, a "years" view 1616 may be provided, which may be the same or similar to user interface 1452. In some circumstances, upon selecting user interface device, 1460, a collection view, 1636, may be displayed. The collection view many be the same or similar to the user interface 1464. Upon selecting movie thumbnail 1472, a detailed view 1632 may be viewed, which may be the same or similar to user interface 1476. Upon selecting the watch user interface device 1484, a media player 1620 may be presented, which can play the selected video, which may be the same or similar to user interface 1488. Upon selecting an application panel remote control button, or other remote control buttons 748, an onscreen controls panel 1624 may be provided; an application panel 1492 may be presented over the top of the movie presentation as shown in user interface 1496 and FIG. 14H.

To navigate back through the different views using the back button, the applications panel 1628, shown in FIG. 15A, may be hidden and show only the onscreen controls 1624, as shown in FIG. 15B. Another selection of the back button 752 may hide the onscreen controls and provide only the media player 1620. Upon selecting the back button again, the detailed view 1632 may be shown as shown in FIG. 15C. Another selection of back button may show only the collection view 1636 shown in 15D. Then, a final selection of the back button may provide the master view 1604, as shown in FIG. 15E. Thus, the navigation to a media selection, and the controls or panels associated therewith, may be different than the process of backing the process out to a top level master view 1604.

Figure 17:
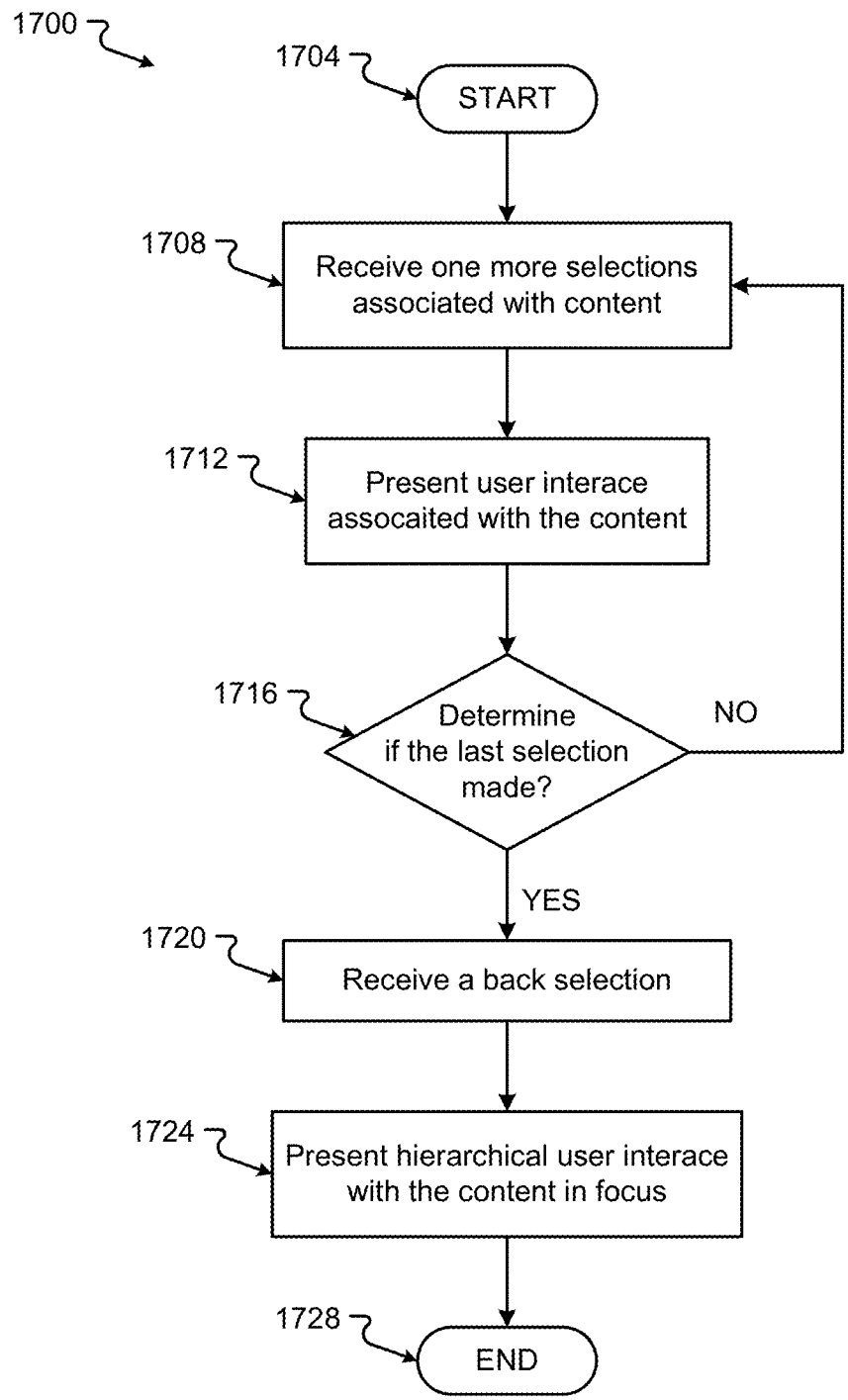
FIG. 17 is a view of an embodiment of a user interface for an Intelligent TV.

An embodiment of a method 1700 for navigating through selections in user interfaces presented in an intelligent television 100 is shown in FIG. 17. While a general order for the steps of the method 1700 is shown in FIG. 17. Generally, the method 1700 starts with a start operation 1704 and ends with an end operation 1728. The method 1700 can include more or fewer steps or can arrange the order of the steps differently than those shown in FIG. 17. The method 1700 can be executed as a set of computer-executable instructions, executed by a computer system, and encoded or stored on a computer readable medium. Further, the method 1700 can be executed by a gate or other hardware device or component in an Application Specific Integrated Circuit, a Field Programmable Gate Array, or other type of hardware device. Hereinafter, the method 1700 shall be explained with reference to the systems, components, modules, software, data structures, user interfaces, etc. described herein.

A remote control 700 may receive one or more selections associated with content, in step 1708. The selections may be made through directional pad 760, menu button 728 through button 740, or other selection devices. The signals may be transferred wirelessly from the remote control 700 to the IR/RF module 354 of the intelligent television 100. The IR/RF module 354 may transmit these signals then to a processor 364 or other type of hardware. The signals may then be processed through a driver 420 associated with the operating system (OS) kernel 404. The OS kernel 404 may then transfer the signal information to an application 416.

The application framework 412 may include an input event dispatcher 508, which may present or provide information to a silo manager 532 or a panel manager 536, that can control different panels or user interfaces of the applications 416. The input event dispatcher 508 may then provide for the signal information to allow the application 416 to provide or present a user interface associated with the content selection, in step 712. The user interfaces selected may be those as shown in FIGS. 14A through 14H.

After each selection, the processor 364 may determine if that is the last selection made, in step 1716. Here, the processor 364 may wait for another selection of content or may determine if a different user interface selection is provided that changes the navigation of the user interfaces. For example, if the user selects a back button 752, on the remote control 700, the processor 364 may determine that the last selection was made in the current navigation series. If there is another selection made, the method 1700 may proceed NO back to step 1708 to receive another selection. Thus, the user may navigate through a series of user interfaces, as described in conjunction with FIGS. 14A though 14H and FIG. 16. If this is the last selection made, the method 1700 may proceed YES to step 1720, where the remote control 700 may receive a back selection, in step 1720.

In step 1720, the remote control 700 may receive a selection of a back button 752. This signal may then be transmitted to the IR/RF module 354 and onto the processor 364. The drivers 420 may interpret the selection in the OS kernel 404 and send this information to an application 416. The interpretation of the selection by the application 416 may require the application 416 to present a hierarchical user interface with the content remaining in focus, in step 1724. Thus, the user may proceed back out of the navigation in conjunction with FIGS. 15A through 15E. In this way, the content displayed in user interface 1496 remains the focus, and need not go through the several menu selections 1608, 1612, 1616, that required the user to find the content shown in user interface 1496. Rather, the content remains in focus, and, if the user attempts to go back down though the menus, the user may quickly access the content that remains in focus.

Figure 18A:
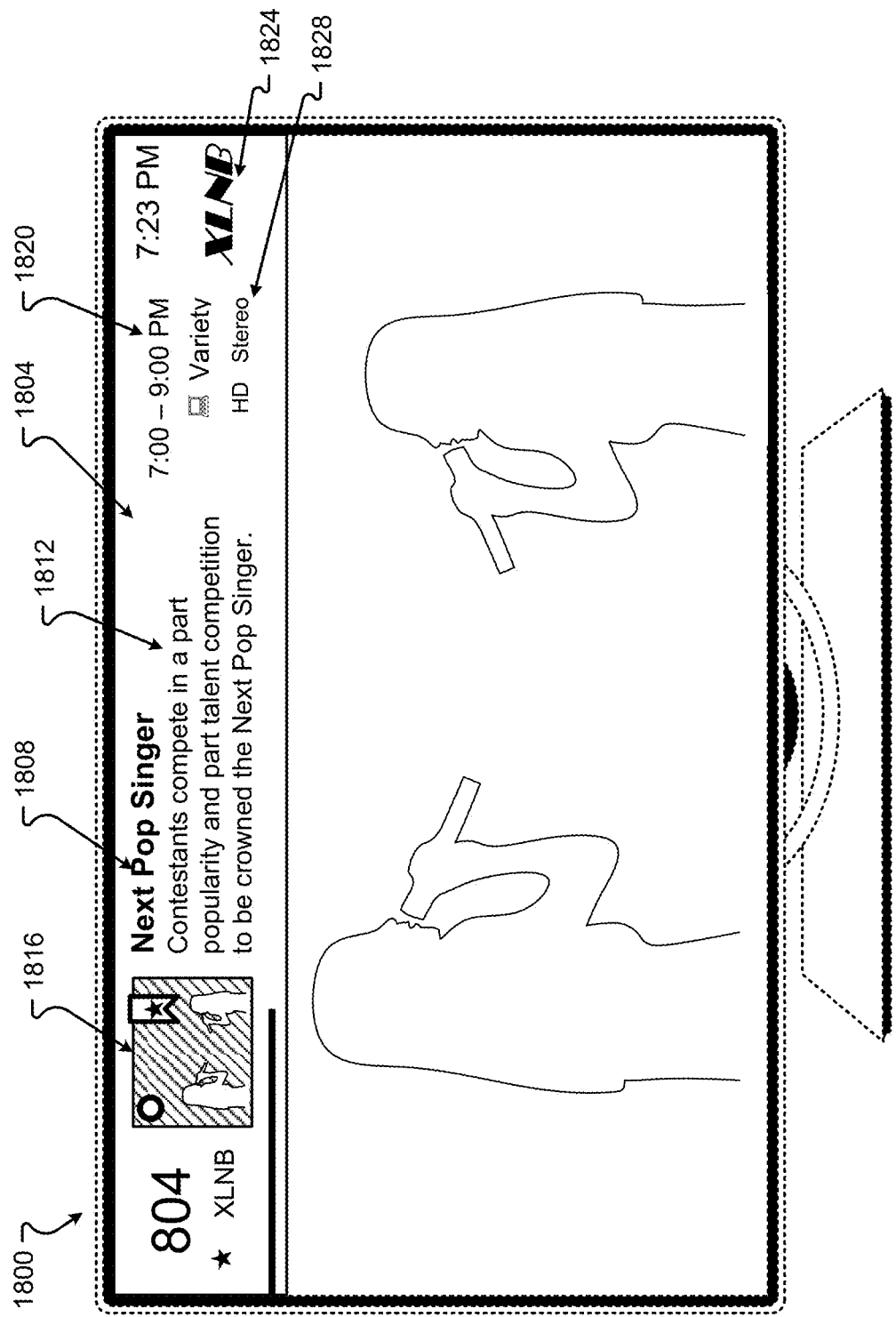
FIG. 18A is a view of an embodiment of a user interface for an Intelligent TV.
Figure 18B:
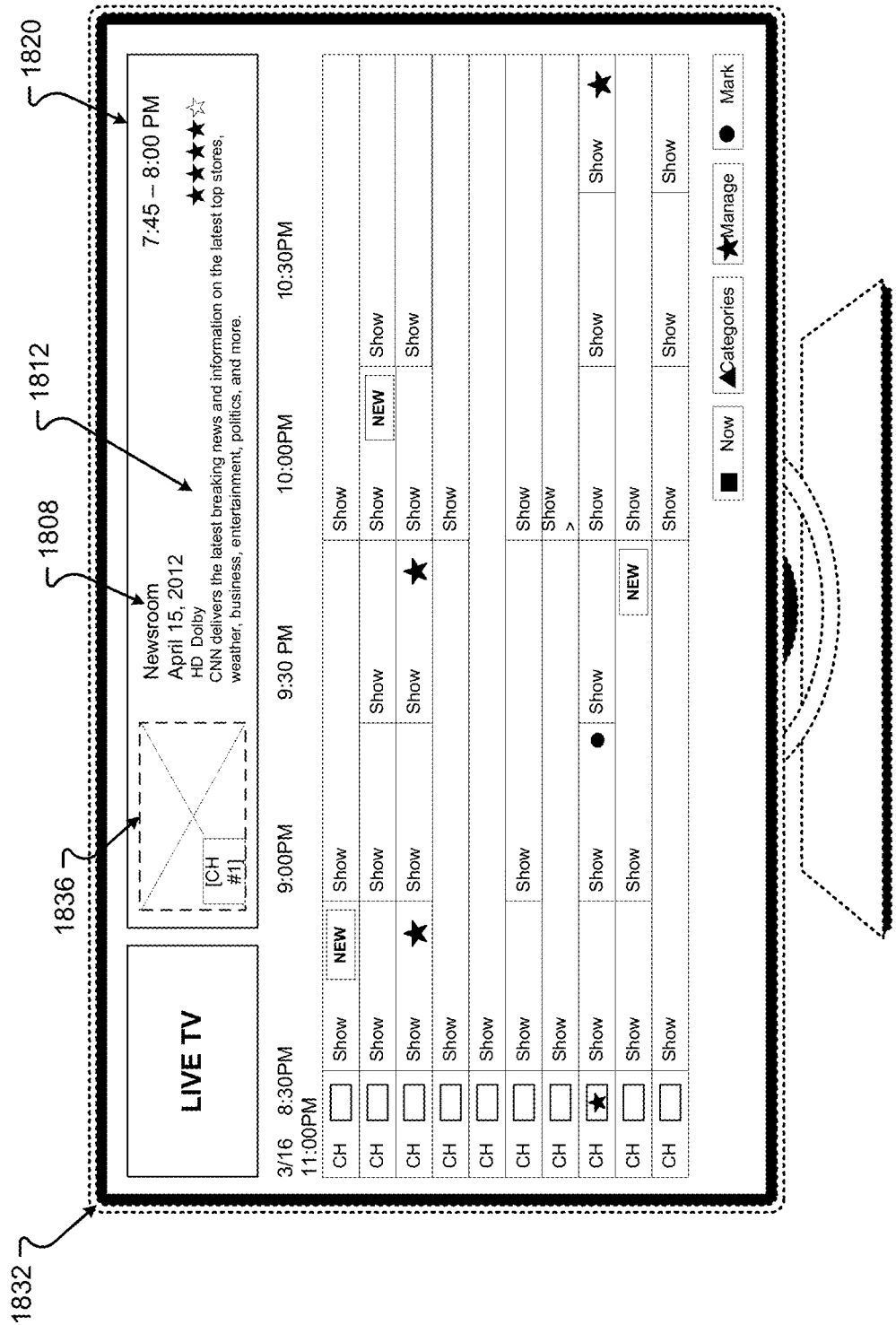
FIG. 18B is a view of an embodiment of a user interface for an Intelligent TV.
Figure 18C:
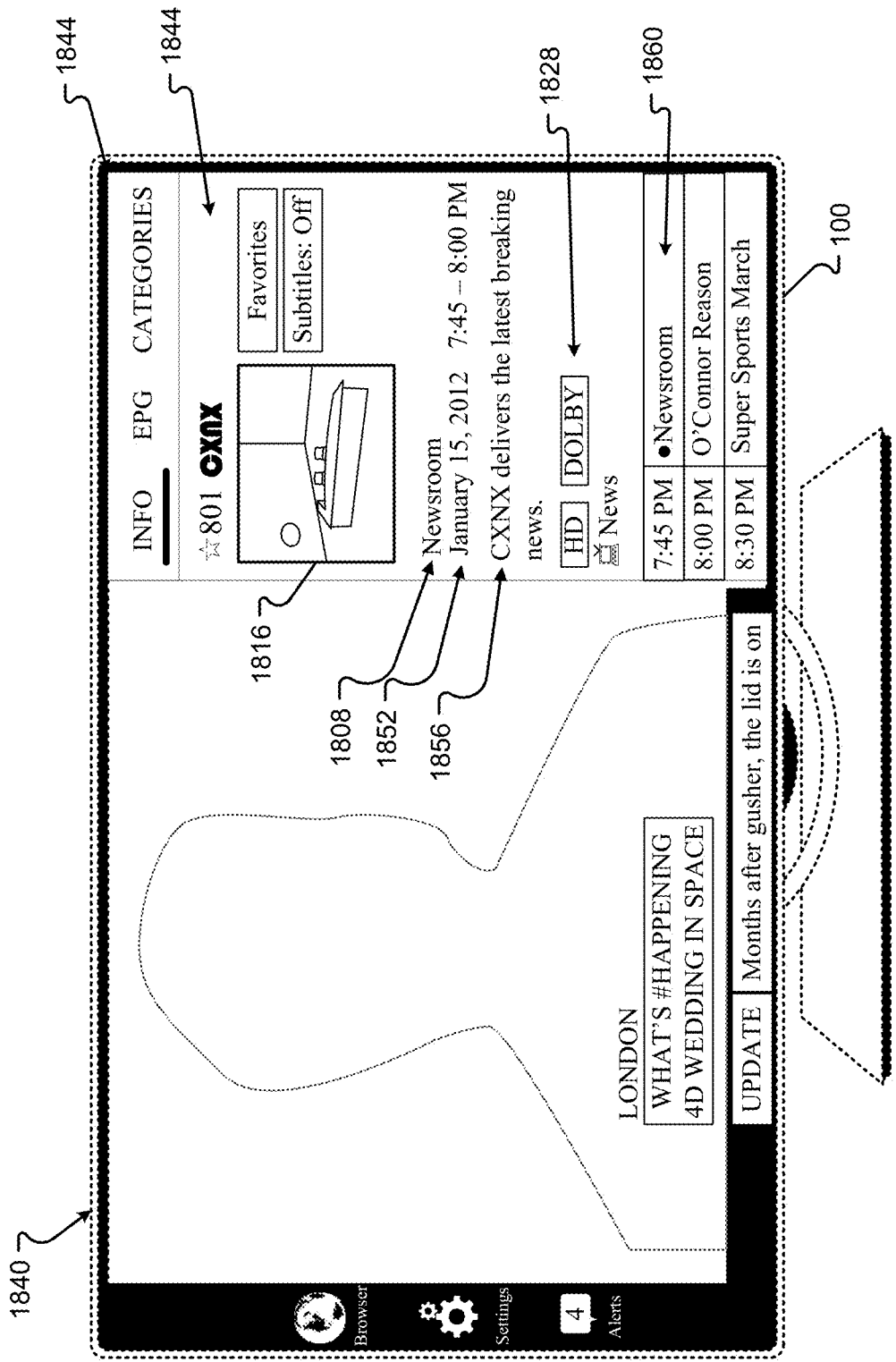
FIG. 18C is a view of an embodiment of a user interface for an Intelligent TV.

A series of user interfaces 1800, 1832, and 1840 showing different depictions of content information associated with content selected or displayed in a user interface are shown in FIGS. 18A through 18C. A first user interface 1800 is shown in FIG. 18A. Content information 1804 can be displayed in a banner. The banner 1804 can include information, such as one or more of, but not limited to a title for the content 1808, a description of the content 1812, thumbnail 1816 associated with the content, a time the content is being played in a live TV application, 1820, a network 1824 upon which the content is being presented, and other information 1828 associated with the content.

In a separate user interface 1832, shown in FIG. 18B, a new content information collection 1836 is shown. Here, the title 1808, description 1812, and time 1820 may remain displayed. A thumbnail 1816 may also be displayed, however, at least some of the information shown in user interface 1800 may not be shown in banner 1836 and user interface 1832.

A new user interface 1840 is shown with an application panel 1844 with information 1848 presented. Here, the thumbnail 1816 may also be displayed, along with a title 1808 for the content. A new time and date stamp 1852 may be shown with more information about the time at which the content is displayed. A new longer description 1856 may be presented. Other information 1828 may also be displayed along with a small guide 1860. Thus, more information may be displayed in the application panel 1844 than was displayed in the other user interfaces 1800, 1832 shown in FIGS. 18A and 18B. In this way, the same content and its associated metadata may be presented in several different ways, depending on the user interface presented.

Figure 19A:
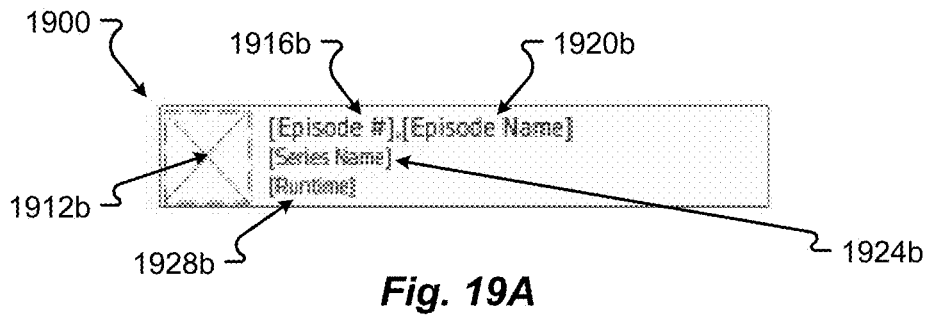
FIG. 19A is a view of an embodiment of a user interface for an Intelligent TV.
Figure 19B:
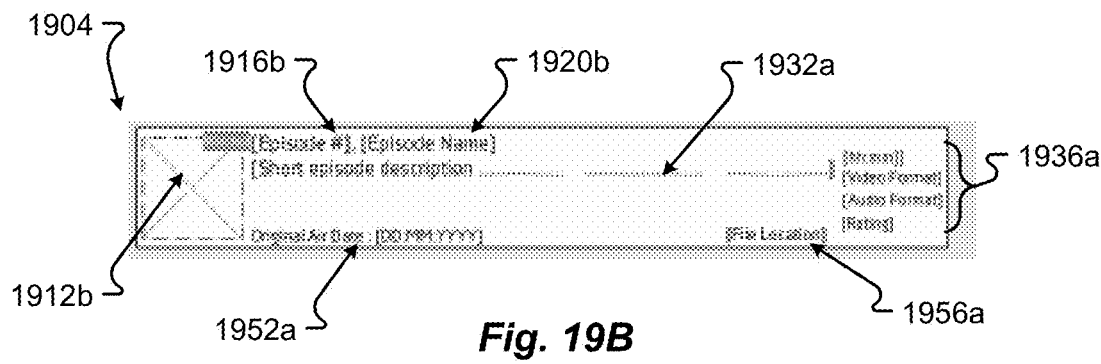
FIG. 19B is a view of an embodiment of a user interface for an Intelligent TV.
Figure 19C:
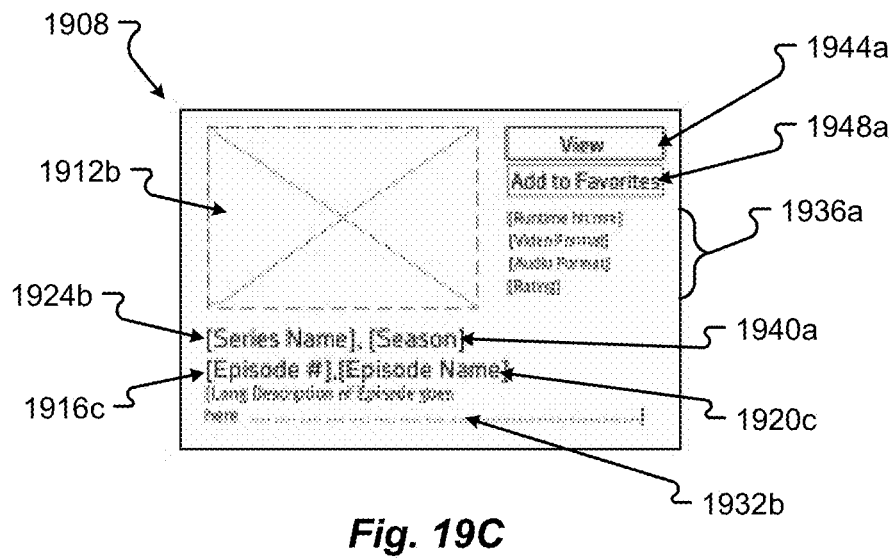
FIG. 19C is a view of an embodiment of a user interface for an Intelligent TV.

For example, three different views of the content information are shown in FIGS. 19A through 19C. In a first display 1900, a series of information is shown which may include the episode number 1916A, the episode name 1920A, a thumbnail 1912A, a runtime listing 1928A, and a series name 1924A. This presentation may be similar to that shown in user interface 1800.

A second user interface 1904 may show similar information, including the episode number 1916, the episode name 1920, and the thumbnail 1912. However, new or additional information may be displayed, including the original air date 1952A, a file location 1956A, and other information 1936A. Further, a description may also be provided in Section 1932A.

A third depiction of the content information 1908 is shown in FIG. 19C. Here, some similar information, including the thumbnail 1912, the episode number 1916, and the episode name 1920, may be shown as depicted in the other user interfaces 1900 and 1904. Further, some of the information may be provided that was shown in FIG. 19B, including the additional information 1936B, and the description 1932B. However, further information, including a season listing 1940A, a favorites selection 1948A, and a view selection 1944A, may also be included which provides additional information above the other user interfaces 1900 and 1904. Thus, the metadata associated with the content may be displayed in several different views depending on the selections of the user and what user interface presentations are being made.

Figure 20:
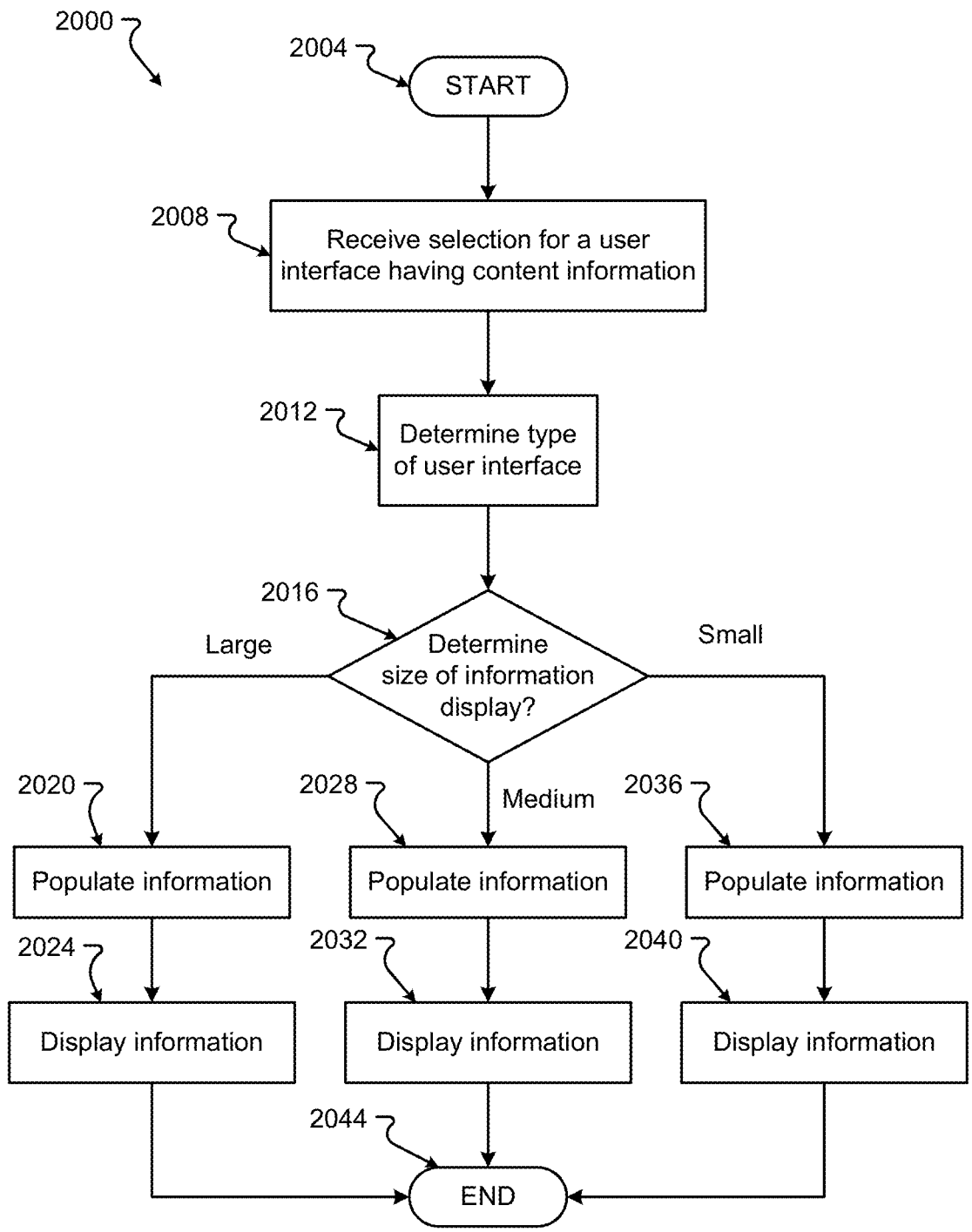
FIG. 20 is a flowchart view of an embodiment of a method for providing a user interface in an Intelligent TV.

A method 2000 for the depiction of information associated with content in one or more different ways is shown in FIG. 20. While a general order for the steps of the method 2000 is shown in FIG. 20. Generally, the method 2000 starts with a start operation 2004 and ends with an end operation 2044. The method 2000 can include more or fewer steps or can arrange the order of the steps differently than those shown in FIG. 20. The method 2000 can be executed as a set of computer-executable instructions, executed by a computer system, and encoded or stored on a computer readable medium. Further, the method 2000 can be executed by a gate or other hardware device or component in an Application Specific Integrated Circuit, a Field Programmable Gate Array, or other type of hardware device. Hereinafter, the method 2000 shall be explained with reference to the systems, components, modules, software, data structures, user interfaces, etc. described herein.

A remote control 700 can receive a selection for a user interface having content information, in step 2008. Here, the user may select one or more user interface buttons 720A through 740, a directional pad selection 760, or some other selection that requires the presentation of a user interface containing content information. The information or signal is sent from the remote control through the IR/RF module 354 to the processor 364. The processor 364 can execute one or more drivers 420 in the OS kernel 404. The signal information is then sent to the application framework 412, which may provide signals for interpretation to applications 416. The application framework 412 or an application 416 may then determine the type of user interface requested, in step 2012. The user interfaces may be similar to those shown in FIGS. 18A through 19C.

Based on the user interface determined in step 2012, the application framework 412 and/or application 416 may then determine the size of the content information display, in step 2016. For example, there may be different size displays of content information as described in conjunction with FIGS. 19A through 19C. Depending on the size of the information display, more or less information about the content may be displayed in the user interface selected. The silo manager 532 or panel manager 536 may receive a signal from the processor 364, through driver 420, and then through an input event dispatcher 508 to create a user interface, as shown in FIGS. 18A though 18C, with content information displays, 1900, 1904, 1908.

If the requested user interface includes a LARGE content information display 1908, the panel manager 536 or silo manager 538 may populate information within the large display 1908, in step 2020. The populated information may then be displayed, in step 2024, in the user interface. For example, large content information display 1908 may be as shown in FIG. 18C in the application panel 1844.

If the content information is displayed in the MEDIUM display 1904, the panel manager 536 or silo manager 538 may populate the information within the display 1904, in step 2028. The information may then be displayed, in step 2032, and a user interface, similar to that show in FIG. 18B, may be presented.

If the content information is a SMALL display 1900, the panel manger 536 or silo manager 532 may populate the information, in step 2036, and display that information, in step 2040. The display of information in the small display may be as that shown in FIG. 18A.

Figure 21:
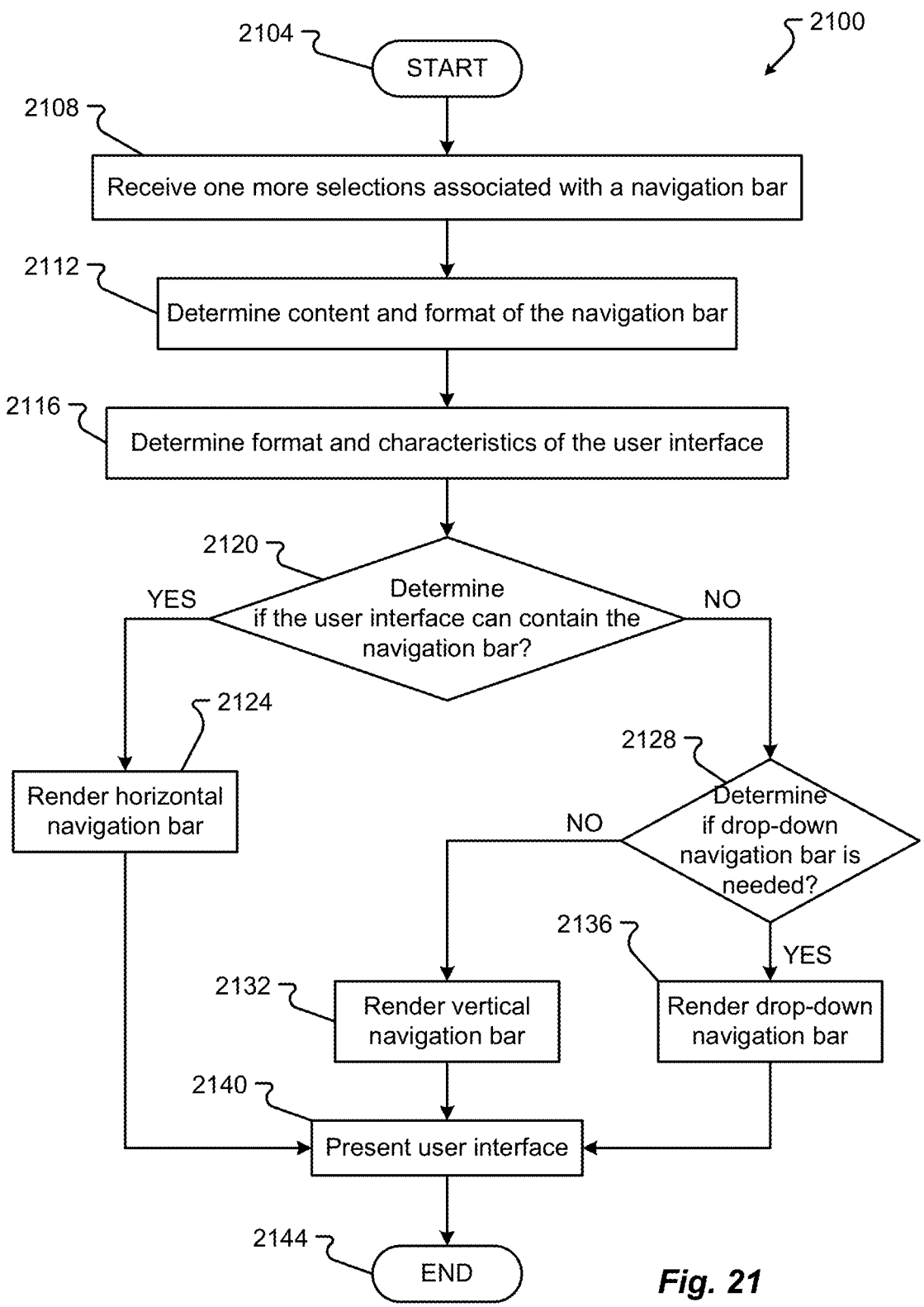
FIG. 21 is a flowchart view of an embodiment of a method for providing a user interface in an Intelligent TV.

Embodiment of a method 2100 for providing a dynamically formatted navigation bar shown in FIG. 21. While a general order for the steps of the method 2100 is shown in FIG. 21. Generally, the method 2100 starts with a start operation 2104 and ends with an end operation 2144. The method 2100 can include more or fewer steps or can arrange the order of the steps differently than those shown in FIG. 21. The method 2100 can be executed as a set of computer-executable instructions, executed by a computer system, and encoded or stored on a computer readable medium. Further, the method 2100 can be executed by a gate or other hardware device or component in an Application Specific Integrated Circuit, a Field Programmable Gate Array, or other type of hardware device. Hereinafter, the method 2100 shall be explained with reference to the systems, components, modules, software, data structures, user interfaces, etc. described herein.

The Intelligent TV 100 receives one or more selections associated with a navigation bar, in step 2108. Here, the user may select a button associated with the remote control 700, or provide input into one or more other buttons on the Intelligent TV 100. These signals may be sent to the processor 364 through a port interface 352 or IR/RF module 354. The information may then be sent on to a driver 420 to be translated. The translated information can then be sent to a user interface application 468. The user interface application 468 can include the silo manager 532 and/or a panel manager 536, which may receive the signal through the input event dispatcher 508. The information may then be used to determine what selections were made, and what user interfaces need to be provided that have a navigation bar.

Figure 22A:
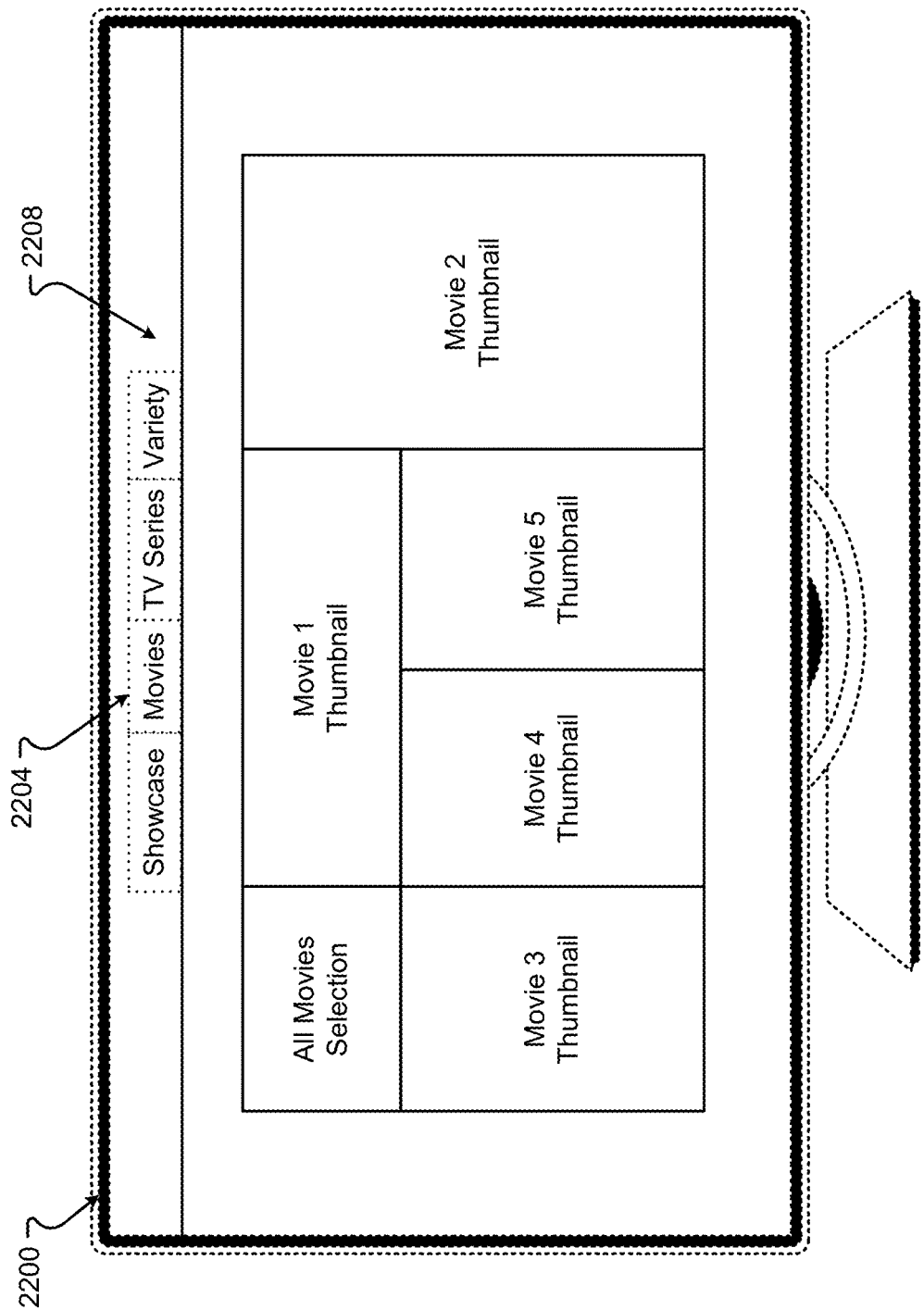
FIG. 22A is a view of an embodiment of a user interface for an Intelligent TV.
Figure 22B:
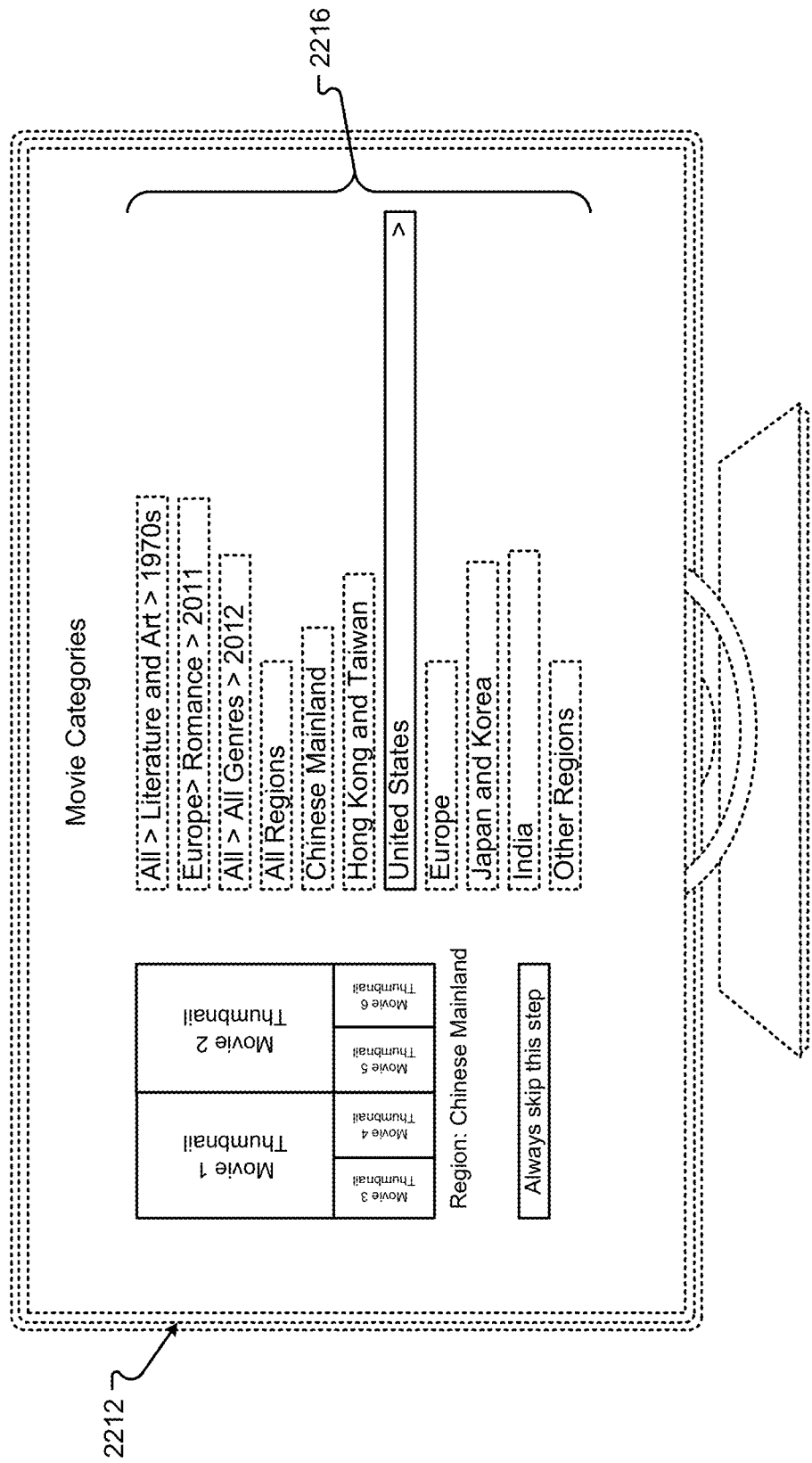
FIG. 22B is a view of an embodiment of a user interface for an Intelligent TV.

For example, the user may select the movies user interface device 2204, shown in user interface 2200 of FIG. 22A. This selection then causes a new user interface to be provided. With each user interface, the panel manager 536 can determine the content and format of the navigation bar, in step 2112. The content and format of the navigation bar may be set or changed depending on what needs to be viewed within each navigation bar. For example, the navigation bar 2208, in FIG. 22A, is a single banner navigation bar across the top of the screen with only four different user interface devices that may be selected by a user. However, if the content of that navigation bar is too great to be provided over the banner area, as shown in FIG. 22A, the user interface may have to change to another user interface 2212, as shown in FIG. 22B. Here, the navigation bar 2216 is displayed vertically as a series of user selectable devices arranged in rows. These rows are provided because the navigation bar could not displayed across the top of a banner with the amount of information that needs to be provided in the navigation bar.

Therefore, the panel manager 536 can determine the format and characteristics of the user interface, the content in the navigation bar, and/or what other information needs to be provided, in step 2116. These characteristics determine the location of the navigation bar and how the navigation bar may be navigated.

In step 2120, the panel manger 536 determines if the user interface, based on its format and characteristics, can contain the navigation bar based on the navigation bar's content and format, in step 2120. In some circumstances, the panel manger 536 must determine the space available for the navigation bar in the banner section of the user interface, or another section of the user interface, and the amount of content that needs to be displayed by the navigation bar. Based on the available space and the amount of space needed, the panel manager 536 can determine if the navigation bar can be displayed in certain situations or in certain locations. If the portion of the user interface can contain the navigation bar, then method 2100 proceeds YES to step 2124. However, if the user interface cannot contain the navigation bar, then method 2100 proceeds NO to step 2128.

In step 2124, the panel manager 536 renders the navigation bar similar to that shown in FIG. 22A. However, if the navigation bar cannot be contained in the banner, the panel manager 536 can determine if a drop down navigation bar is needed, in step 2128. Thus, the panel manager 536 determines if a drop down navigation bar, having one or more categories listed in the banner, similar to FIG. 22A, but with selectable drop down menus for each of the categories, can be displayed in the banner portion. If the drop down navigation bar is needed, then method 2100 proceeds YES to step 2136, where that drop down navigation bar is rendered, similar to that shown in FIG. 22C. However, if the drop down navigation bar is not needed, then method 2100 proceeds NO to step 2132, where the panel manager 536 can render a vertical navigation bar, similar to that shown in FIG. 22B.

Depending on which navigation bar and type user interface is determined, the panel manager 536 can present the user interface, in step 2140. An example of a drop down menu 2220 is shown in FIG. 22C. Here, in user interface 2220, there are several categories 2224, 2228, and 2232, each representing a drop down menu, similar to that shown in section 2236. This type of drop down menu bar allows for the consolidation of a great amount of space and data into the user interface.

Figure 23:
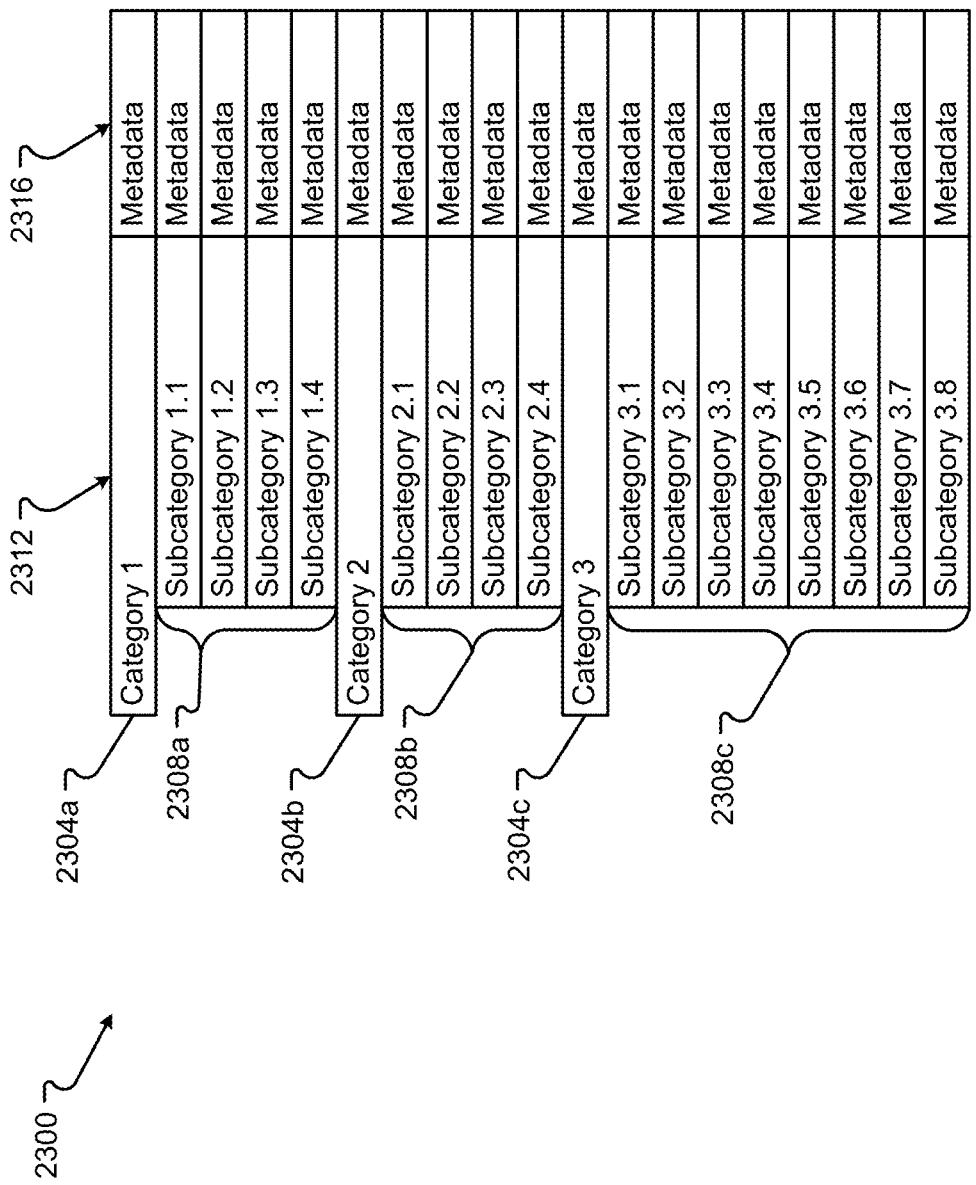
FIG. 23 is a view of an embodiment of a user interface for an Intelligent TV.

An embodiment of information used by the panel manager 536 to determine how to render the user interface of the navigation bar is shown in FIG. 23. Here, the database 2300 can contain information about categories that are to be displayed in the navigation bar. Thus, each navigation bar item may have a category 2312 and concomitant metadata 2316. Thus, the category 2312 can include the name of the information, while the metadata 2316 describes the space needed to display this category name.

Each category 2304a-2304c may have one or more subcategories 2308a-2308c. These subcategories 2308 may be the items that need to be displayed in a drop down menu or in a vertical navigation bar. A category 2312 can consist of the top level category, such as those shown in navigation bar 2208, in FIG. 22A. The subcategories 2308 may be similar to those shown in section 2236 of FIG. 22C. In the example shown in FIG. 23, there are three different categories, 2304a, b, and c, that each have their own subcategories, 2308a, b, and c. Each category 2304 can have different numbers of subcategories 2308 based on the type of category or the information associated therewith.

Figure 24:
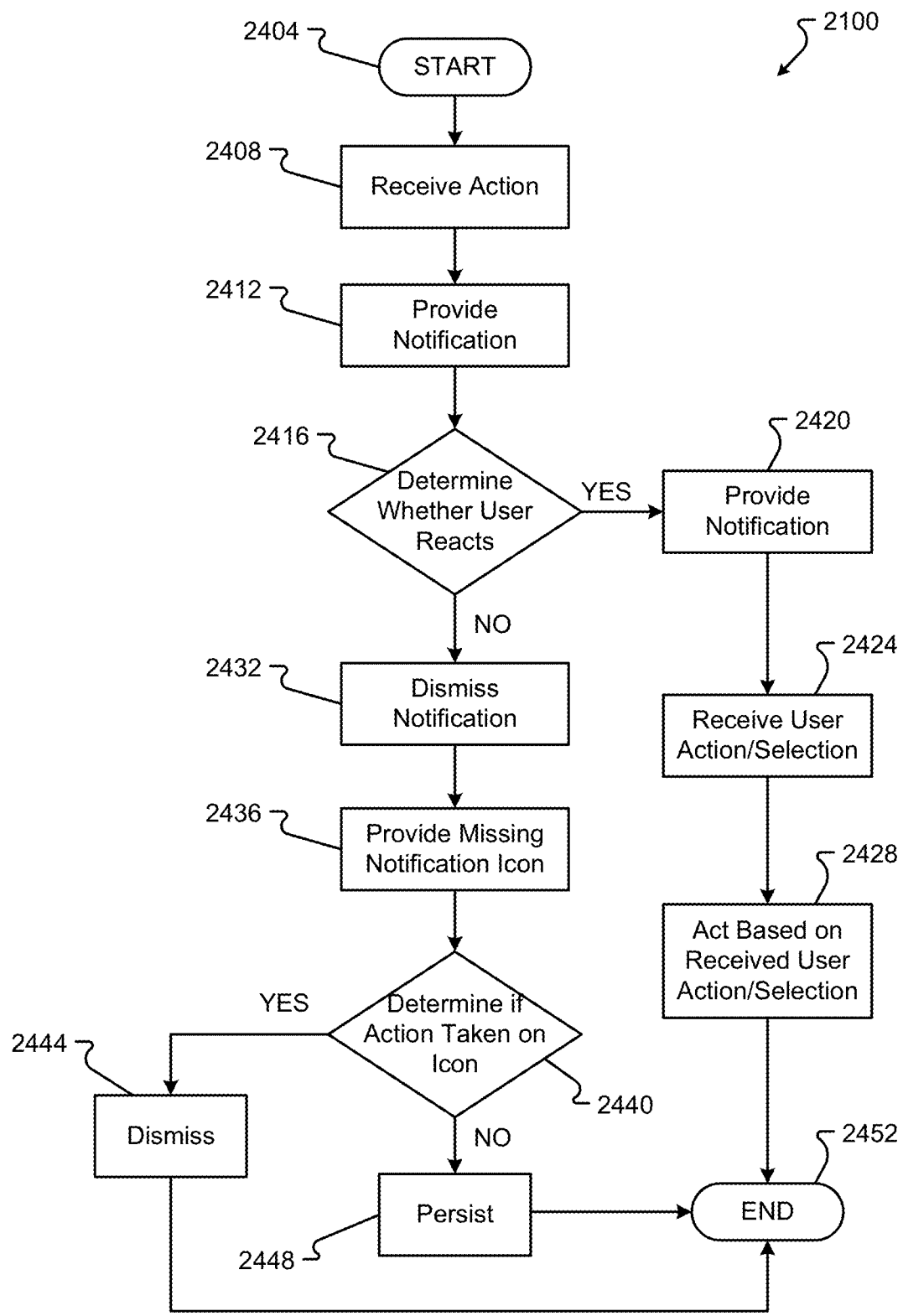
FIG. 24 is a flowchart view of an embodiment of a method for providing a user interface in an Intelligent TV.

An embodiment of a method 2400 to persist a notification alert may be as shown in FIG. 24. While a general order for the steps of the method 2400 is shown in FIG. 24. Generally, the method 2400 starts with a start operation 2404 and ends with an end operation 2452. The method 2400 can include more or fewer steps or can arrange the order of the steps differently than those shown in FIG. 24. The method 2400 can be executed as a set of computer-executable instructions, executed by a computer system, and encoded or stored on a computer readable medium. Further, the method 2400 can be executed by a gate or other hardware device or component in an Application Specific Integrated Circuit, a Field Programmable Gate Array, or other type of hardware device. Hereinafter, the method 2400 shall be explained with reference to the systems, components, modules, software, data structures, user interfaces, etc. described herein.

An Intelligent Television 100 can receive an action, in step 2408. The action may be any event captured by the input event dispatcher 508, or other device input or operation controlled by the OS kernel 404. An action can be events, such as, receiving an updated EPG, receiving a notification that a favorite program is beginning, or some other event.

The processor 364 may send the indication of the event to the user interface display 468. The user interface application 468 includes a panel manager 536 and a silo manager 532 to control the user interface. The panel manager 536 may send the event information to the notification panel 528. Notification panel 528 may then provide a notification, in step 2412. The notification panel module 528 can provide the information in a pop-up panel or user interface for the user to view.

The notification panel 528 may then determine whether the user reacts to the notification, in step 2416. The user can react by selecting some user interface device in the notification panel to switch the user interface to some other view. Further, the user may dismiss or close the notification panel. If the user selects information from the notification panel, then method 2400 proceeds YES to step 2420. However, if the user does not select the device(s) inside the notification panel, but dismisses or closes the panel, then method 2400 proceeds NO to step 2432, where the notification may be dismissed.

The notification panel 528 can provide notification information in step 2420. This information may allow the user to do some type of action or selection. For example, the notification information may alert the user that one of their favorite programs is about to start. There may be a device in the user notification information that allows the user to select the device and navigate to the content that the user has made a favorite.

The Intelligent Television 100 can receive the user action or selection in step 2424. Here, the user may select a button, on the remote control 700 or other user interface, that may select the user interface device and notification information explained in conjunction with step 2420. This user action selection may then trigger the user interface 468 to act on the selection, in step 2428. Thus, if, for example, the notification was for a favorite program about to begin, user interface 468 switches to that program or content for the user.

Figure 25:
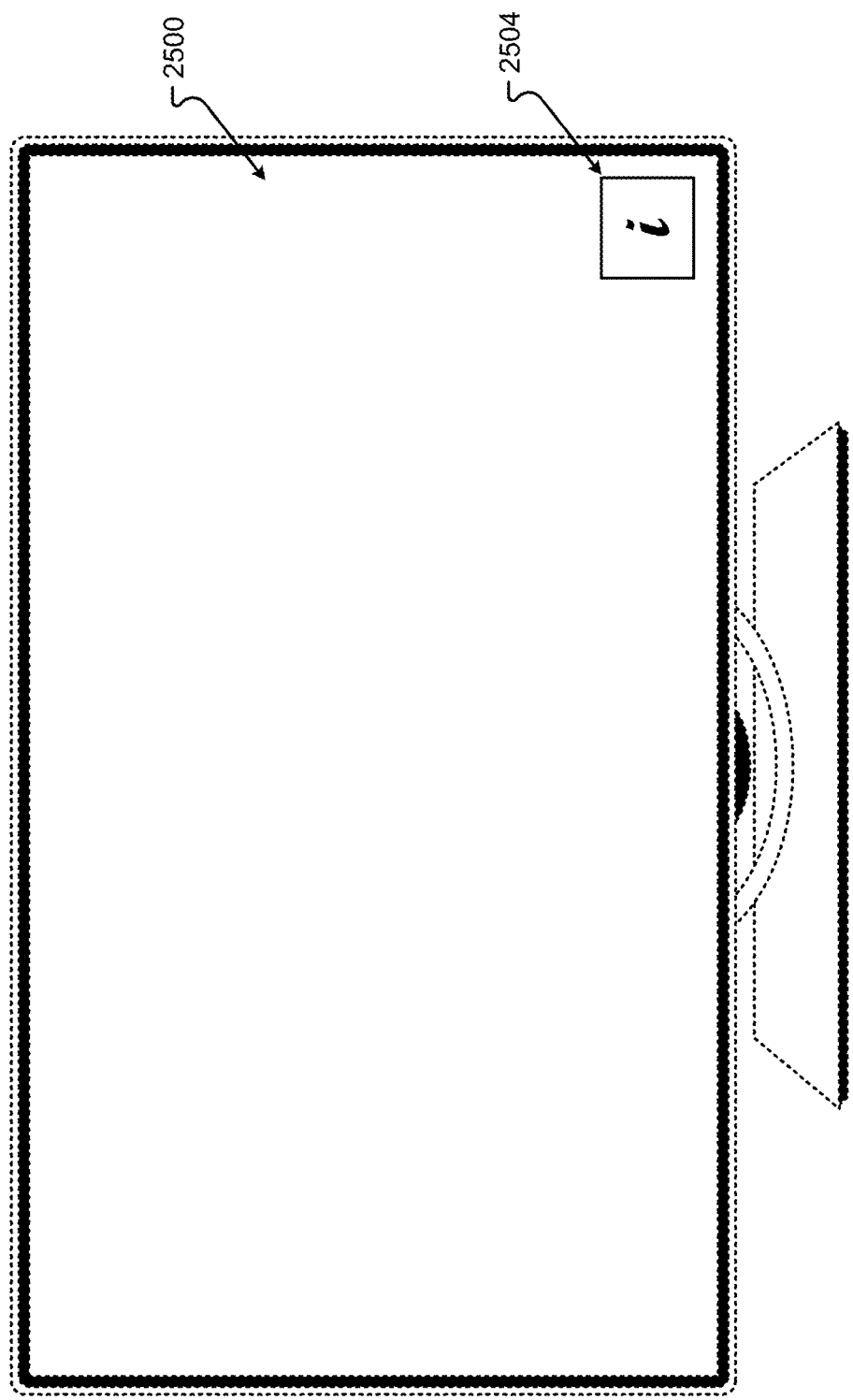
FIG. 25 is a view of an embodiment of a user interface for an Intelligent TV.

In step 2432, the user interface application panel manager 536 dismisses the notification by sending a signal to the notification panel 528 to discontinue the notification. Here, the notification panel 528 can dismiss the notification and may create a missing notification icon, in step 5436. As shown in FIG. 25, a user interface 2500 is presented with a dismissed or missed notification icon 2504 in one corner of the user interface display 2500. Thus, the user is alerted that a notification has not been read, as the icon persists for a period of time.

The notification panel 528 may then determine if an action is taken on the icon 2504, in step 2440. For example, an action may include the user selecting the icon by using a button on the remote control 700 to move a cursor or focus to the icon 2504, then selecting that icon 2504. If action is taken on the icon, the method 2400 proceeds YES to step 2444. If no action is taken, method 2400 proceeds NO to step 2448. If an action is taken on the icon, the icon notification information may be presented, as described in step 2420, or in other circumstances, the notification icon 2504 is dismissed by the notification panel 528, in step 2444. Thus, the notification panel 528 can eliminate the icon 2504 from user interface 2500.

If no action is taken, the notification panel 528 can persist or maintain the display of the icon 2504, in step 2448. Thus, the notification icon 2504 can remain on the user interface 2500 until the user takes some action, to either view the notification or to dismiss the notification icon 2504. As such, the user remains informed that notifications have been provided, and the notifications require the user's attention.

Figure 26:
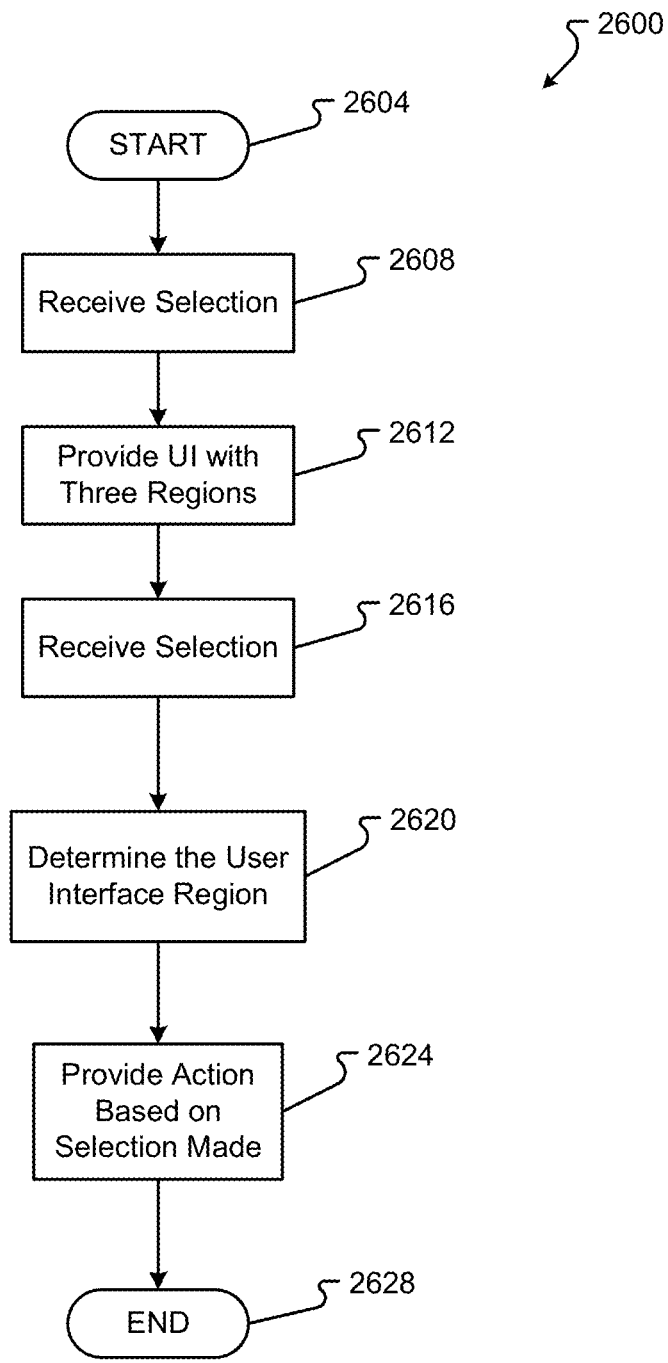
FIG. 26 is a flowchart view of an embodiment of a method for providing a user interface in an Intelligent TV.

An embodiment of the method 2600 for providing a user interface having contextual selection areas is provided in FIG. 26. While a general order for the steps of the method 2600 is shown in FIG. 26. Generally, the method 2600 starts with a start operation 2604 and ends with an end operation 2624. The method 2600 can include more or fewer steps or can arrange the order of the steps differently than those shown in FIG. 26. The method 2600 can be executed as a set of computer-executable instructions, executed by a computer system, and encoded or stored on a computer readable medium. Further, the method 2600 can be executed by a gate or other hardware device or component in an Application Specific Integrated Circuit, a Field Programmable Gate Array, or other type of hardware device. Hereinafter, the method 2600 shall be explained with reference to the systems, components, modules, software, data structures, user interfaces, etc. described herein.

The user may select a user interface or other selection by using the remote control 700 to send a signal to the Intelligent Television 100. The signal may be received at a port interface 352, or IR/RF module 354, and can be provided to the processor 364. A driver 420, executed by the processor 364, can translate the signal, which may then be sent to the user interface application 468. The user interface application 468 can include a panel manager 536 that can determine that the selection requires the provision of a master panel.

Figure 27:
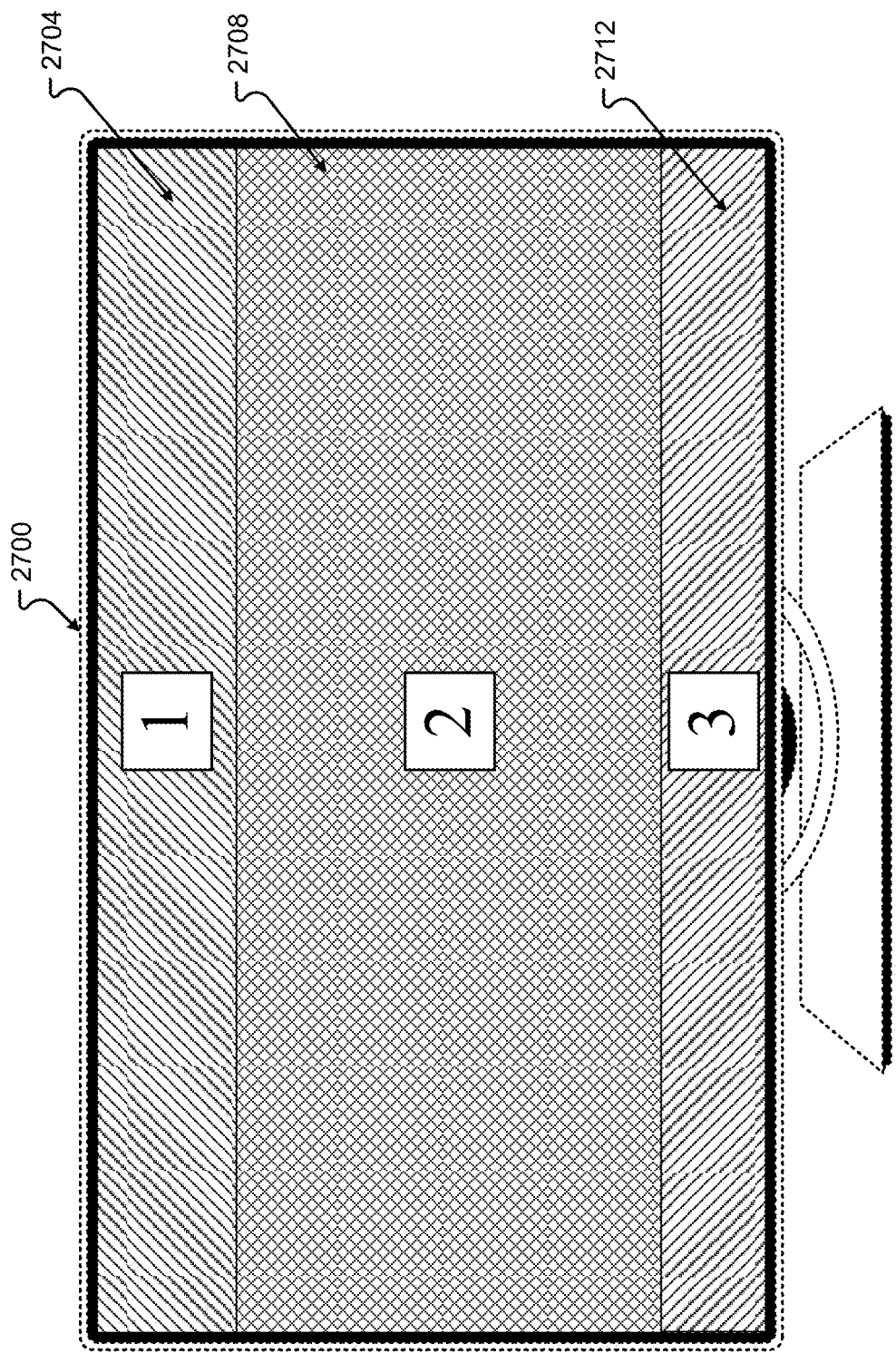
FIG. 27 is a view of an embodiment of a user interface for an Intelligent TV.

The panel manger 536 can then provide a master panel, which has three contextual regions, in step 2612. As shown in FIG. 27, a master panel 2700 can include a header region in 2704, a content region in 2708, and a footer region in 2712. Selections of user interface devices, within each of these regions, has different functionality based on being in those different regions. Thus, the user interface devices presented in the header region 2704 contain certain elements that provide a contextual navigation that may be learned by the user. The content area 2708 can include displays or devices, having a context that may be learned by the user. Further, the footer region in 2712 can also include user interface devices or other information that may be learned by a user.

As an example, the header area 2704 can include a navigation bar and title elements. This header information may be common across any type of master panel. The content area 2708 or body area can include content layouts and scroll items that are either listed horizontally or vertically. Thus, the content area 2708 can provide content selections that the user will understand and look for in other master panels. Finally, the footer area 2712 can include system and contextual information and hot key related events; thus, this information may be to access certain global menus and other information that may be learned by the user and desired in other master panels.

The panel manager 536 may receive a selection 2616 in the user interface 2700. The panel manager 536 may then determine which region 2704 through 2712 the selection was received in, in step 2620. Based on the region where the selection was made, the panel manager 536 can provide an action based on the selection mode 2624 in the area of the panel, in step 2624. Thus, the area of selection for user interface may govern how the panel manger 536 affects actions within the user interface.

Figure 28:
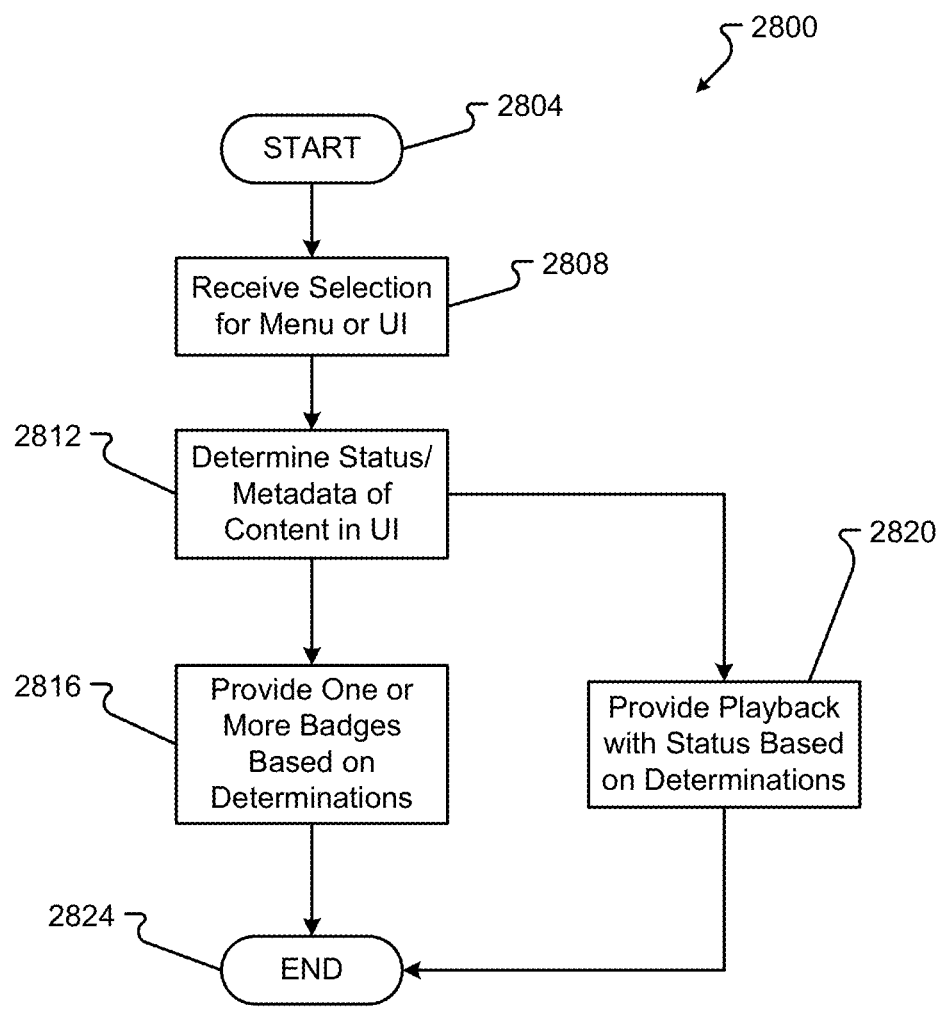
FIG. 28 is a flowchart view of an embodiment of a method for providing a user interface in an Intelligent TV.
Figure 29:
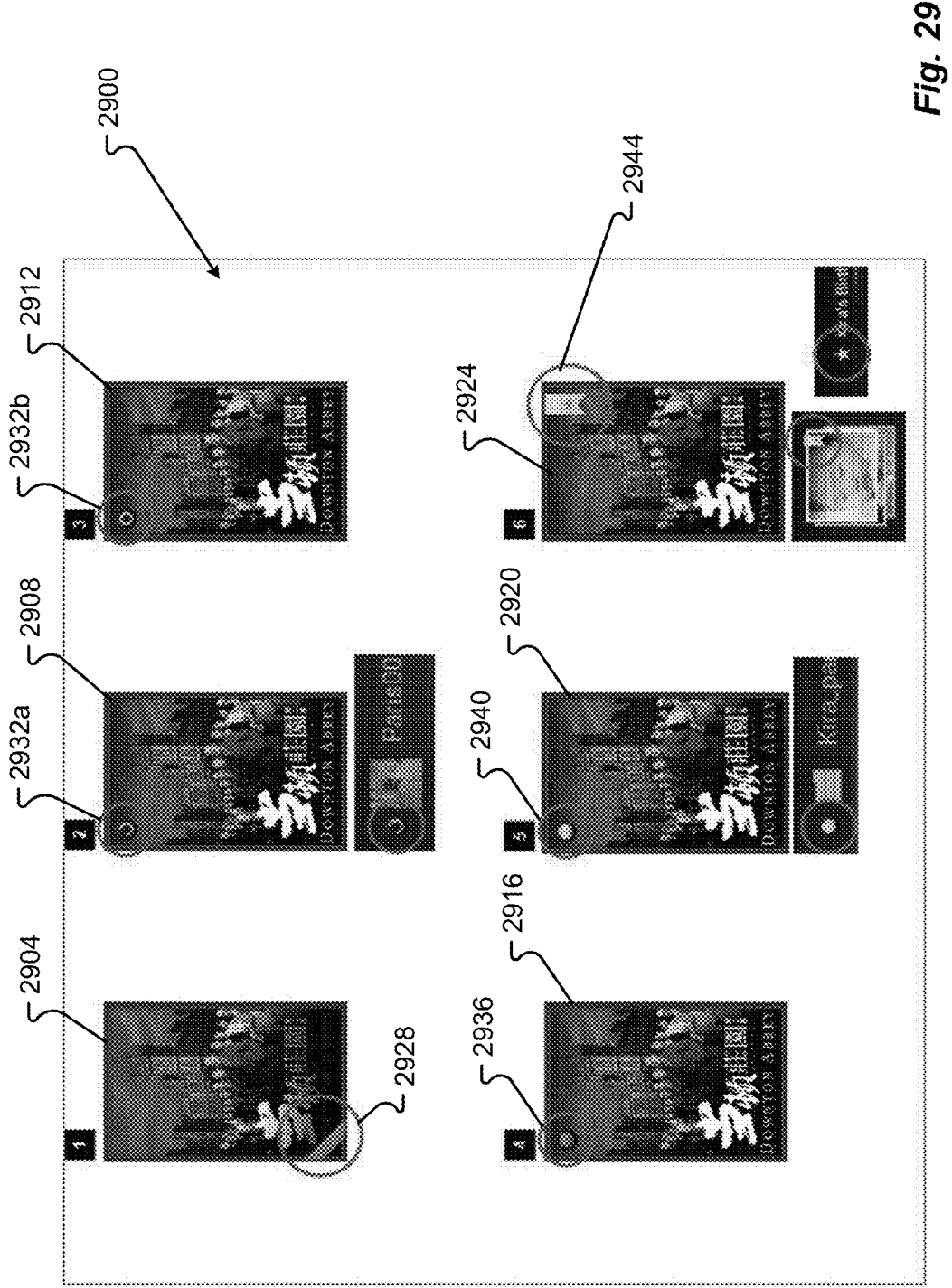
FIG. 29 is a view of an embodiment of a user interface for an Intelligent TV.
Figure 30:
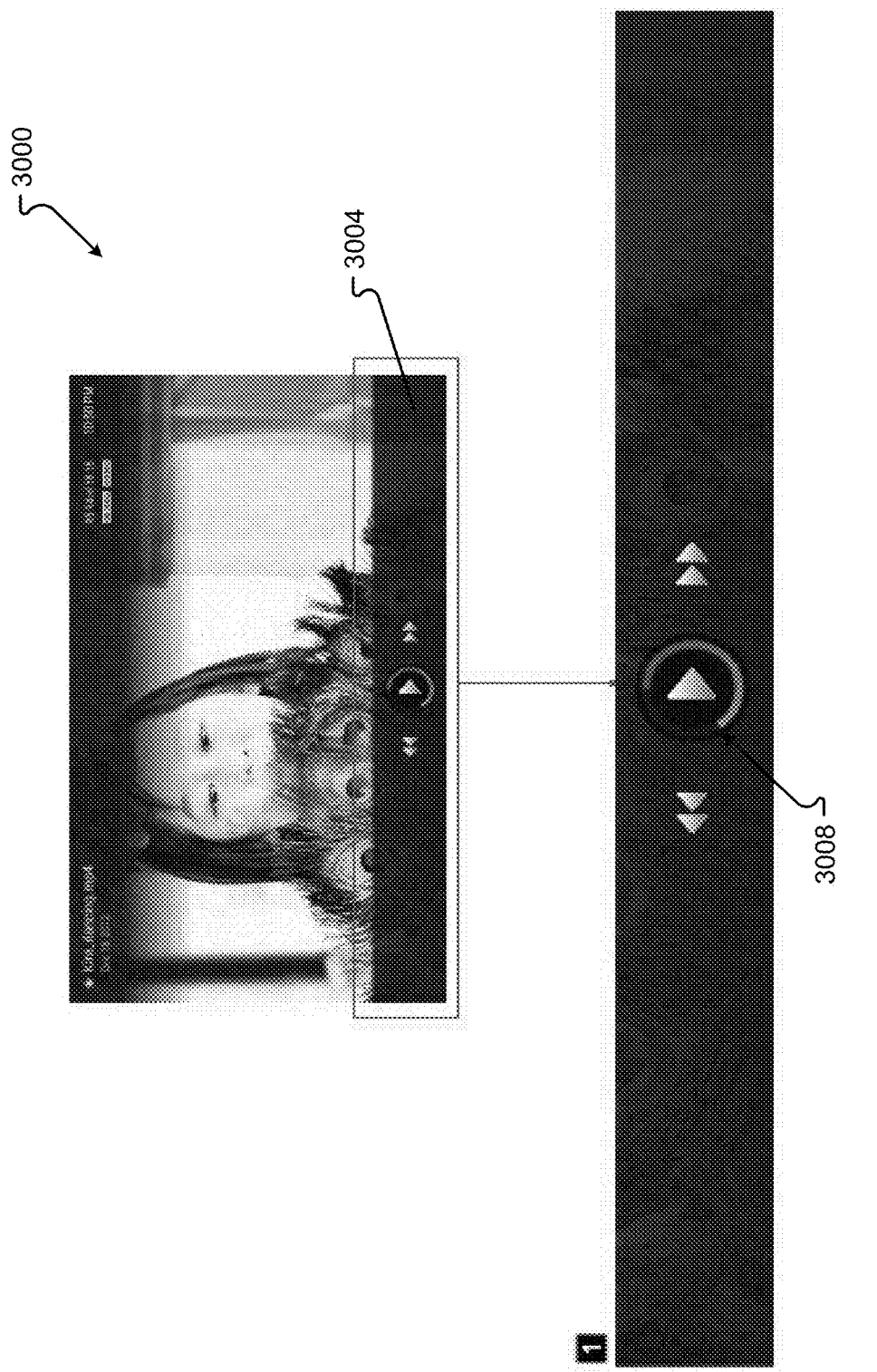
FIG. 30 is a view of an embodiment of a user interface for an Intelligent TV.

An embodiment of method 2800 for providing information in badges and playback control is shown in FIG. 28, with reference to FIGS. 29 through 30. The method of providing badges may be similar or the same at to those methods, systems, etc. described in U.S. PCT Application No. PCT/US13/36826, entitled "METHODS AND DISPLAYS FOR PROVIDING INTELLIGENT TELEVISION BADGES," filed on Apr. 16, 2013, which is incorporated herein by reference for all that it teaches and for all purposes. While a general order for the steps of the method 2800 is shown in FIG. 28. Generally, the method 2800 starts with a start operation 2804 and ends with an end operation 2824. The method 2800 can include more or fewer steps or can arrange the order of the steps differently than those shown in FIG. 28. The method 2800 can be executed as a set of computer-executable instructions, executed by a computer system, and encoded or stored on a computer readable medium. Further, the method 2800 can be executed by a gate or other hardware device or component in an Application Specific Integrated Circuit, a Field Programmable Gate Array, or other type of hardware device. Hereinafter, the method 2800 shall be explained with reference to the systems, components, modules, software, data structures, user interfaces, etc. described herein.

Here, the Intelligent TV 100 can receive a selection for a menu or user interface, including cards or other display elements that can include badges or content descriptions, in step 2808. This selection may be received by the IR/RF module 354, from the remote control 700, and provided to the processor 364 to be translated by a driver 420. The selection may then be provided to the silo manager 532 and/or the panel manager 536 to provide a user interface display. The panel manager 536 can receive the input event through the input dispatcher 508, and may then use the information in the selection to determine the type of panel to provide to the user.

The panel manager 536 may then determine the status or metadata of the content to be displayed in the user interface, in step 2812. Here, the panel manager 536 may access one or more databases, such as databases 632 through 640, which provide data for the Intelligent Television 100. The databases may include metadata about the content. This metadata may include how much of the program has been watched, when the program was uploaded to the Intelligent TV 100, whether the program is a favorite, whether the program is new, whether the program was recently added, etc. This information may then be retrieved by the panel manager 536.

The panel manager 536, in an example, may then provide a user interface with one or more badges, in one or more areas, that are based on the determinations or status and metadata, in step 2816. For example, the panel manager 536 can provide a user interface 2900 that includes thumbnails 2904-2924 associated with one or more items of content. One or more of the content thumbnails or icons 2904-2924 can include a badge 2928-2944. For example, the user interface 2900 includes thumbnails 2904 through 2924. Each thumbnail has a different badge, which can represent information about the content represented by the thumbnails.

For example, thumbnail 2904 includes a badge 2928 that represents that the content is new. Thumbnail 2908 includes badge 2932A, which represents that that program has been partially watched. In a similar instance, badge 2932B, shown in thumbnail 2912, indicates that the show has been watched previously. The badges 2932 can represent the amount of a program that has been watched from 25% to 50% to 75% to completely watched. The badge 2936, shown in thumbnail 2916, represents that that show is live and is currently being aired. Badge 2940, provided with thumbnail 2920, represents that the content represented by thumbnail 2920 is fresh or has been newly added to this menu or the Intelligent TV 100. Finally, badge 2944, provided with thumbnail 2924, can represent that this content is a favorite of the user. These badges 2928-2944 can be presented in many types of user interfaces to provide a quick and easy way to discern information about the content.

In step 2820, the panel manager 536 can provide a playback screen, similar to screen 3000 shown in FIG. 30, which may include status information. For example, the playback footer 3004 can include an information display 3008 that indicates how much of the program has been watched. In this way, the user can determine the amount of program that has been viewed, and how much is remaining. This information provides a quick and easy visual indication, in the playback control 3004, of where the user is in the currently watched content.

Figure 31A:
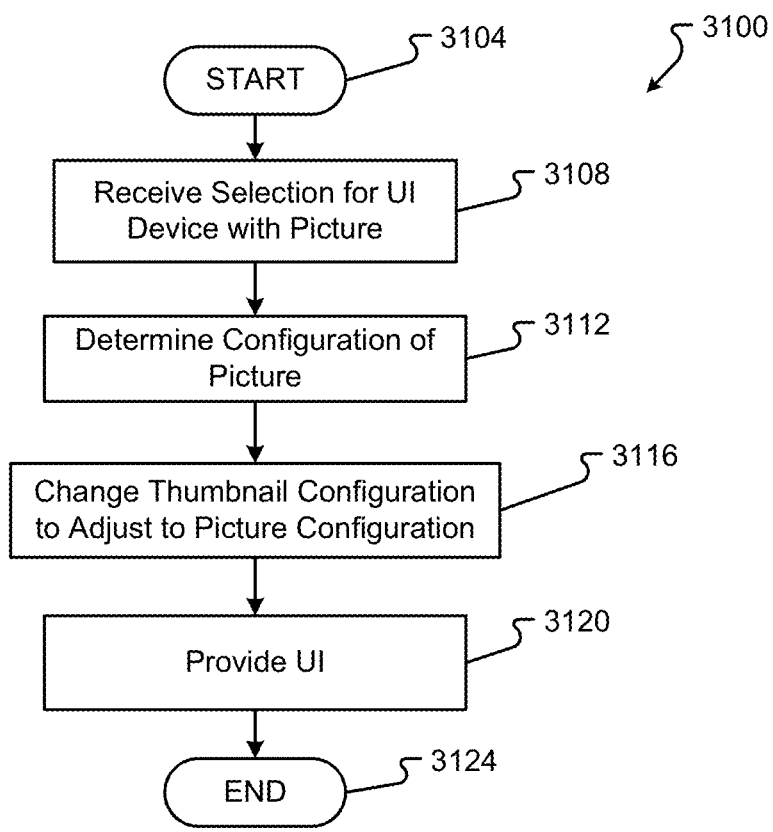
FIG. 31A is a flowchart view of an embodiment of a method for providing a user interface in an Intelligent TV.

An embodiment of a method 3100 for providing visual messages having dynamically changing picture content is shown in FIG. 31A. While a general order for the steps of the method 3100 is shown in FIG. 31. Generally, the method 3100 starts with a start operation 3104 and ends with an end operation 3124. The method 3100 can include more or fewer steps or can arrange the order of the steps differently than those shown in FIG. 31A. The method 3100 can be executed as a set of computer-executable instructions, executed by a computer system, and encoded or stored on a computer readable medium. Further, the method 3100 can be executed by a gate or other hardware device or component in an Application Specific Integrated Circuit, a Field Programmable Gate Array, or other type of hardware device. Hereinafter, the method 3100 shall be explained with reference to the systems, components, modules, software, data structures, user interfaces, etc. described herein.

Here, the Intelligent Television 100 can receive a selection for a user interface that includes a picture. As explained previously, the processor 364 may send this signal to the user interface application 468. The user interface application 468 can then determine the picture and the configuration for the picture, in step 3112. Each picture may have a different aspect ratio, for example, may be in landscape, may be in portrait, or may be square.

Figure 32:
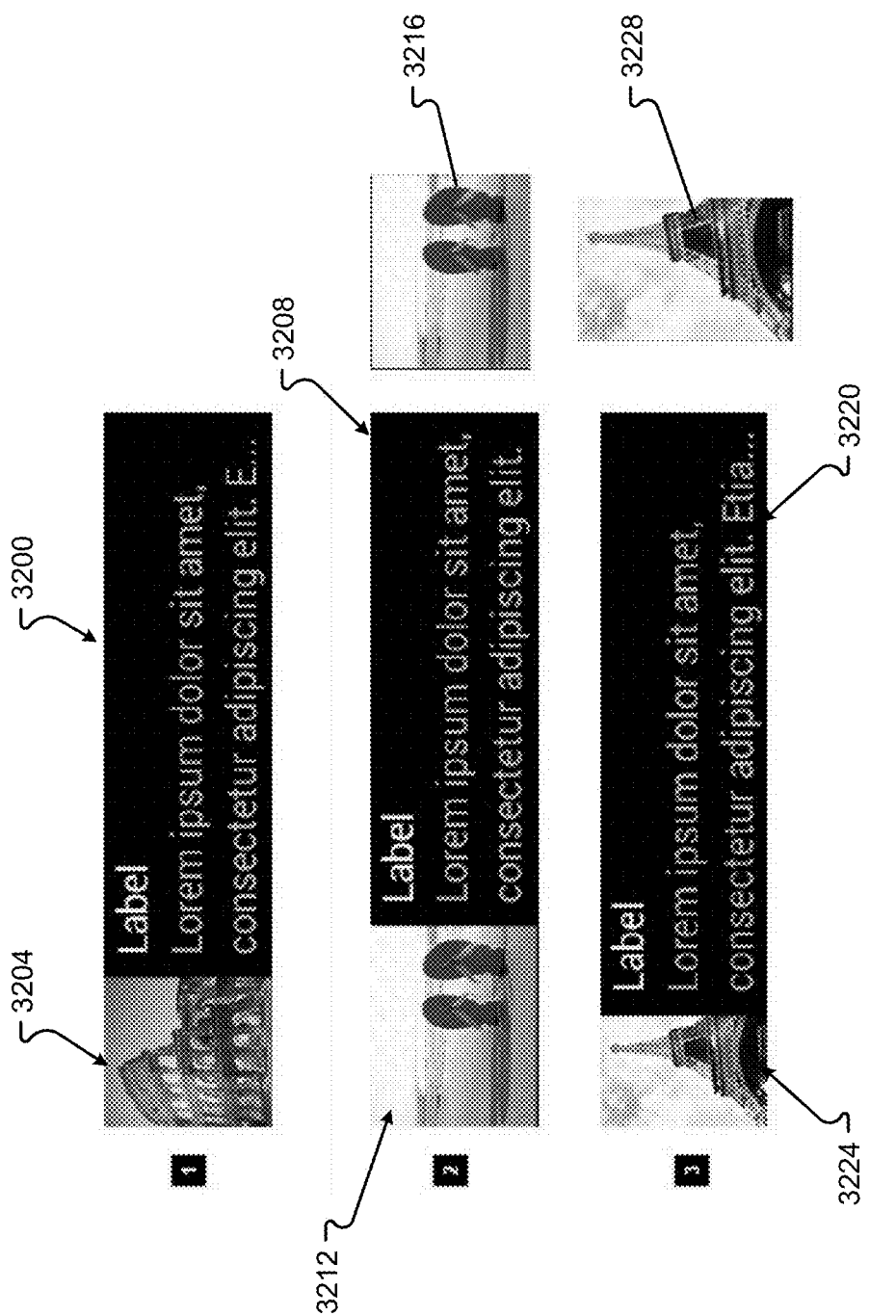
FIG. 32 is a view of an embodiment of a user interface for an Intelligent TV.

The user interface application 468 may then change the display of the user interface to allow for the differences in the configuration of the picture. Thus, the user interface application 468 changes the thumbnail configuration of a thumbnail that represents the picture and the user interface configuration, in step 3116, before providing the user interface, in step 3120. An example of changing a picture aspect ratio is shown in FIG. 32.

The user interface 3200 can include a picture 3204. Here, the picture 3204 may have a square, an undetermined, or a default aspect ratio, where the pictures aspect ratio or configuration is not known. Thus, the picture may be adjusted to fit into the default area for at thumbnail, as shown in user interface device 3200. In another user interface device 3208, the configuration of the picture 3216 is known, and the aspect ratio is a special landscape configuration. The user interface 3208 is adjusted to allow for that aspect ratio in the picture thumbnail 3212. To accommodate the larger picture, the text within the user interface 3208 may be adjusted such that the configuration of the correct configuration for the picture 3212 is provided in the user interface device 3208.

A final user interface device 3220 provides for a thumbnail 3224. Here, the picture 3228 has a special portrait configuration, and the user interface 3220 is adjusted to allow for the thumbnail 3224 to be displayed in a similar configuration to the picture 3228. Here, the text area 3220 grows or widens as the text area adjusts to the configuration of the thumbnail 3224.

Figure 31B:
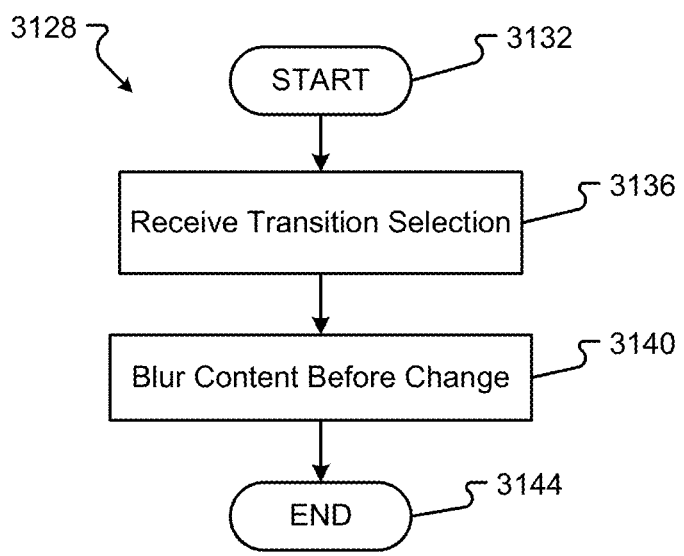
FIG. 31B is a flowchart view of an embodiment of a method for providing a user interface in an Intelligent TV.

An embodiment of a method 3128 for switching the display of content when changing channels or providing other user interface transitions is shown in FIG. 31B. While a general order for the steps of the method 3128 is shown in FIG. 31B. Generally, the method 3128 starts with a start operation 3132 and ends with an end operation 3144. The method 3128 can include more or fewer steps or can arrange the order of the steps differently than those shown in FIG. 31B. The method 3128 can be executed as a set of computer-executable instructions, executed by a computer system, and encoded or stored on a computer readable medium. Further, the method 3128 can be executed by a gate or other hardware device or component in an Application Specific Integrated Circuit, a Field Programmable Gate Array, or other type of hardware device. Hereinafter, the method 3128 shall be explained with reference to the systems, components, modules, software, data structures, user interfaces, etc. described herein.

An Intelligent Television 100 can receive a transition selection, in step 3136. For example, the user may request a channel change with the remote control 700, which request is received by the IR/RF module 354, and acted upon by the processor 364. This transition selection may be provided to user interface application 468 to effect a change to the other channel. In changing the channel, the user interface application 468 may blur the content before the change, in step 3140. The blurred content indicates to the user that the user is moving from one channel to the next and provides a more logical and visually pleasing transition period. These transitions may be as shown in FIGS. 33A and 33B. Here, a first user interface 3300 is provided before the transition selection is received by the Intelligent TV 100. Upon receiving the transition selection, a new user interface 3304 is provided where the content is blurred and before the transition is made. The blurring of the content may be made during channel changes when other menus are provided or other types of user interface devices are provided in the user interface. The blurred content can be viewed before the user interface presenting the new content is shown over the old content.

Figure 34:
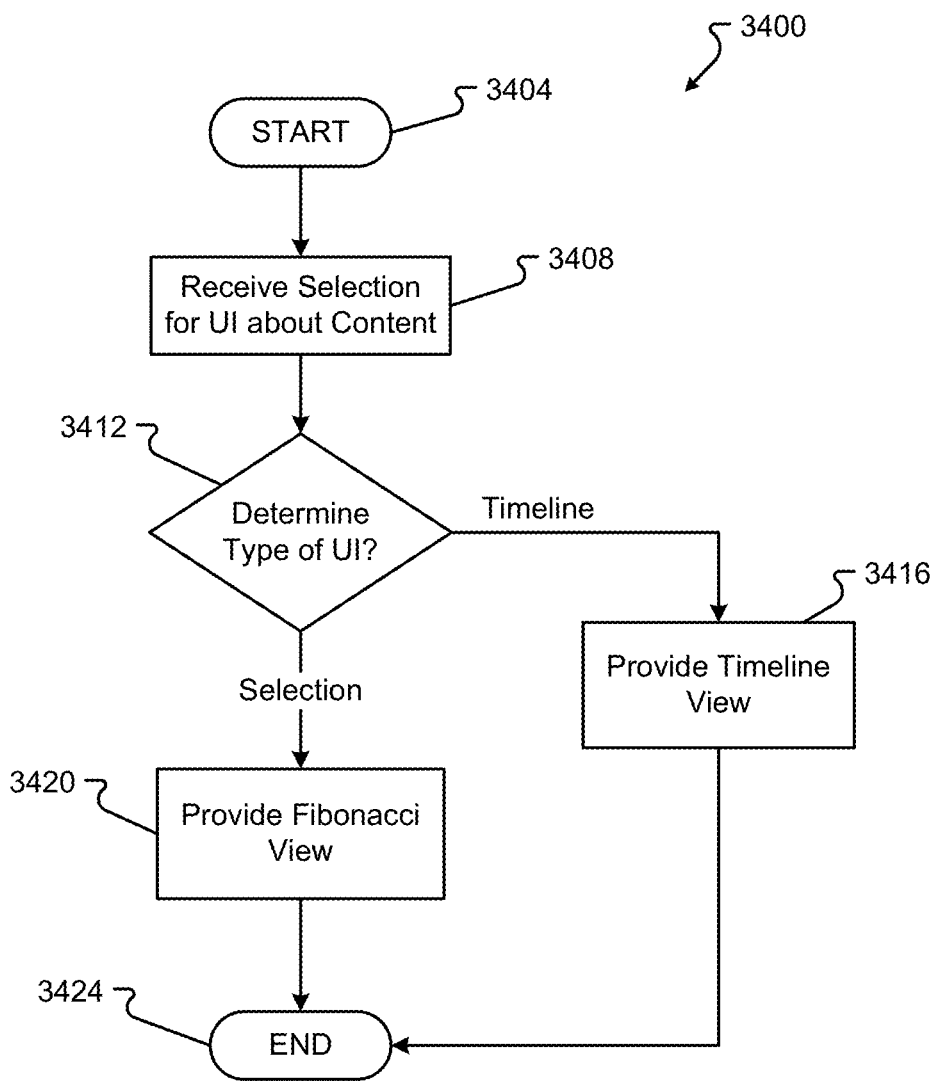
FIG. 34 is a flowchart view of an embodiment of a method for providing a user interface in an Intelligent TV.

An embodiment for providing a user interface that is dynamically changed based on the context of the information provided is shown in FIG. 34. While a general order for the steps of the method 3400 is shown in FIG. 34. Generally, the method 3400 starts with a start operation 3404 and ends with an end operation 3424. The method 3400 can include more or fewer steps or can arrange the order of the steps differently than those shown in FIG. 34. The method 3400 can be executed as a set of computer-executable instructions, executed by a computer system, and encoded or stored on a computer readable medium. Further, the method 3400 can be executed by a gate or other hardware device or component in an Application Specific Integrated Circuit, a Field Programmable Gate Array, or other type of hardware device. Hereinafter, the method 3400 shall be explained with reference to the systems, components, modules, software, data structures, user interfaces, etc. described herein.

Here, the Intelligent Television 100 can receive a selection for a user interface associated with content, in step 3408. The processing of the selection may be as previously described herein. The user interface application 468 can determine the type of user interface requested and what changes need to be made based on the content that is to be provided. For example, the type of user interface can be for a content selection user interface or may be a timeline-based user interface. If the user interface to be provided is content-selection-based, the method 3400 proceeds through the SELECTION branch to step 3420. In contrast, if the type is a timeline user interface, the method 3400 proceeds through the TIMELINE branch to step 3416.

Figure 35:
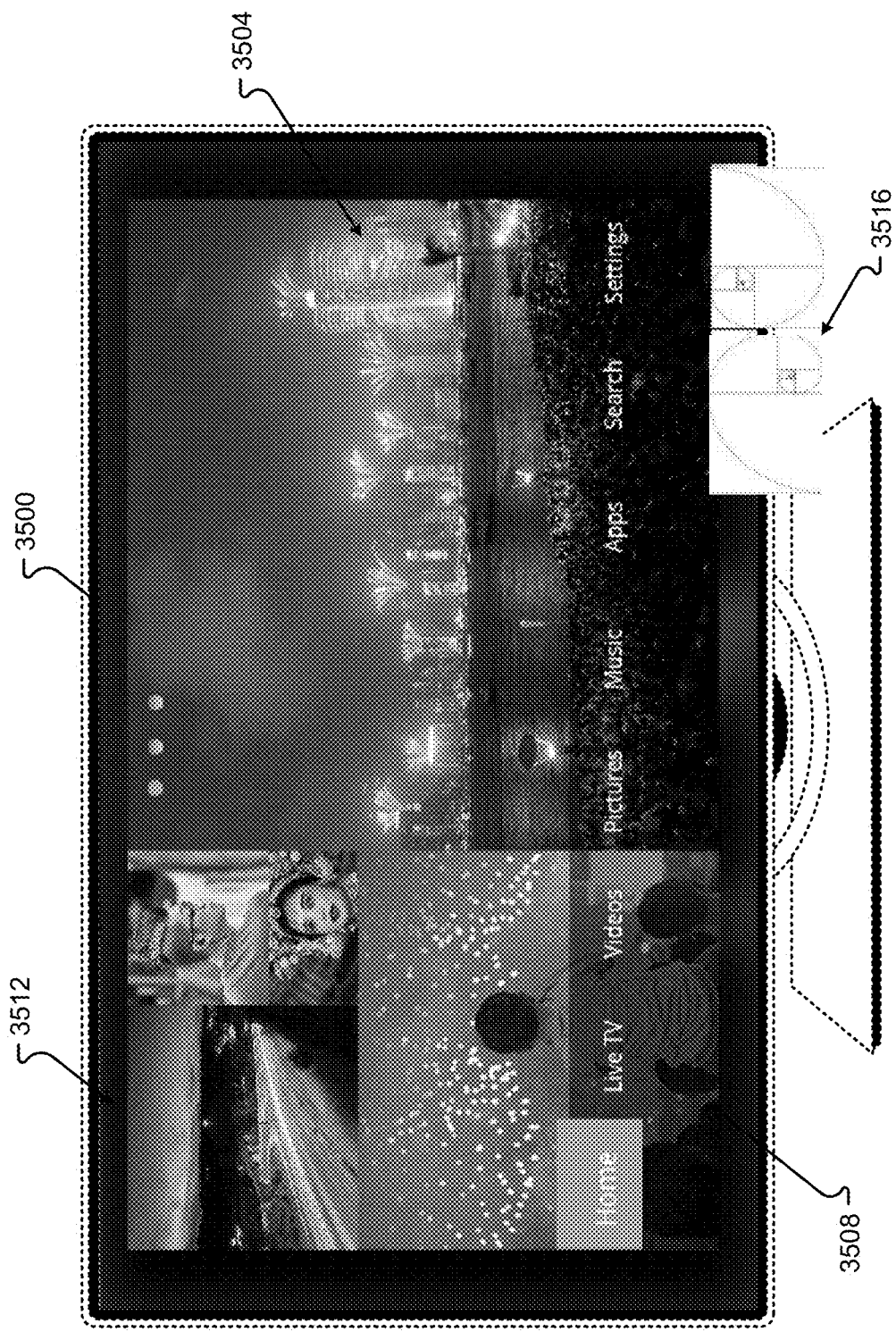
FIG. 35 is a view of an embodiment of a user interface for an Intelligent TV.

In step 3420, a Fibonacci user interface may be provided for selecting content. An example of a Fibonacci user interface 3500 is shown in FIG. 35. Here, the user interface 3500 includes a set of content selections 3504 through 3512 that have different aspect ratios that change based on some information about the content. Thumbnails or pictures represent the content. The design of the user interface 3500 is a Fibonacci spiral, as shown in insert 3516. The thumbnail pictures 3504-3512 decrease in size and may be changed or included based on metadata, for example, a number of favorites, what the Intelligent TV 100 believes to be most important to the user, or by some other categorization.

Figure 36:
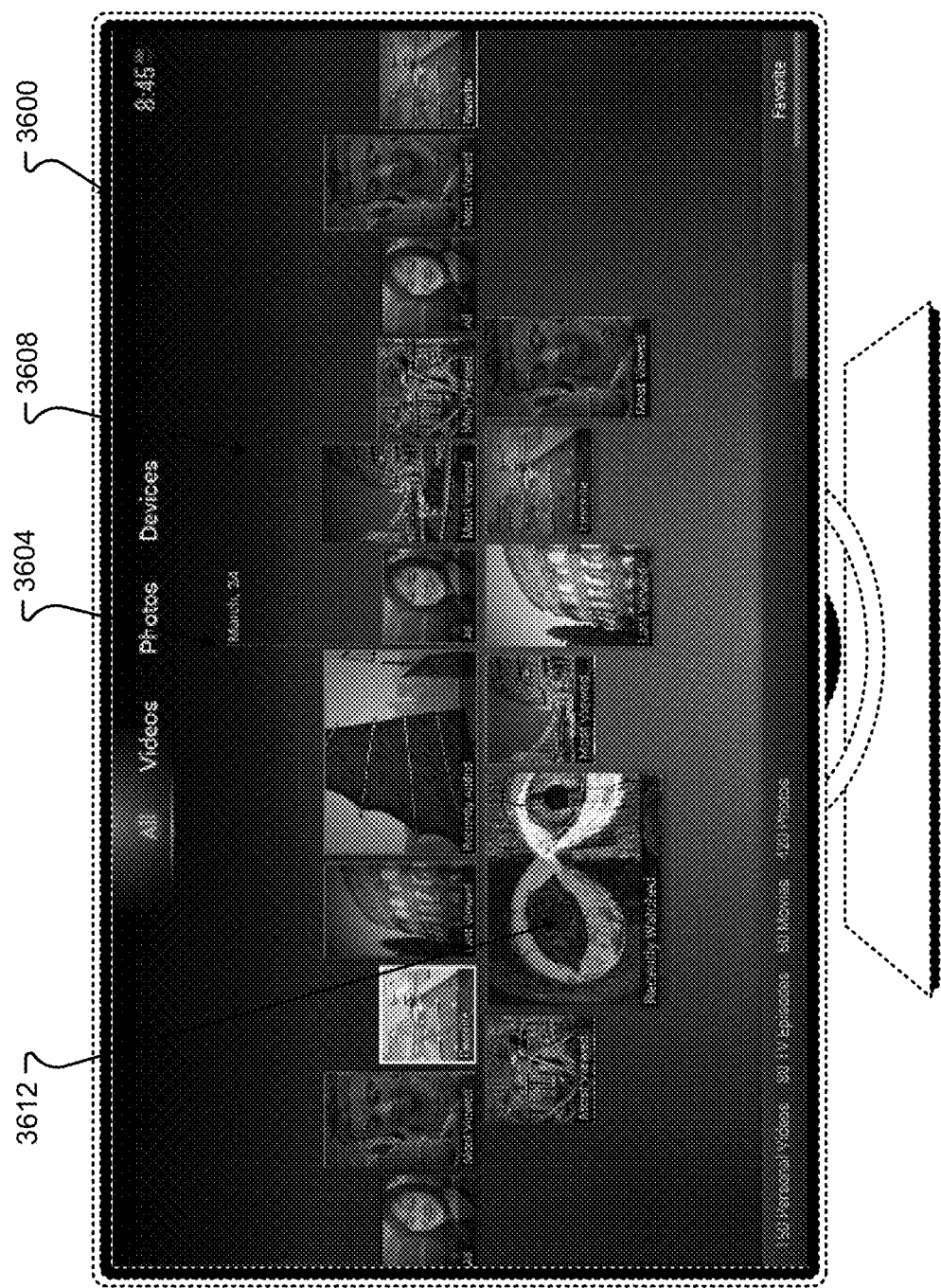
FIG. 36 is a view of an embodiment of a user interface for an Intelligent TV.

A timeline view 3600 is shown in FIG. 36. Here, the content thumbnails are provided in a row or rows arranged from left to right, and may include one or more demarcations 3604. Demarcations 3604 can represent dates to which the content is associated. For example, all icons to the right of demarcation 3604 apply to March 24th. Likewise, icons or thumbnails to the left of demarcation 3604 represent content provided or associated with a date before March 24th. Thus, content 3608 has a different date or timeline relationship than content 3612. This timeline view 3600, provided in step 3416, may be provided only if the content has a date context, or may be better displayed in this timeline view.

Figure 37:
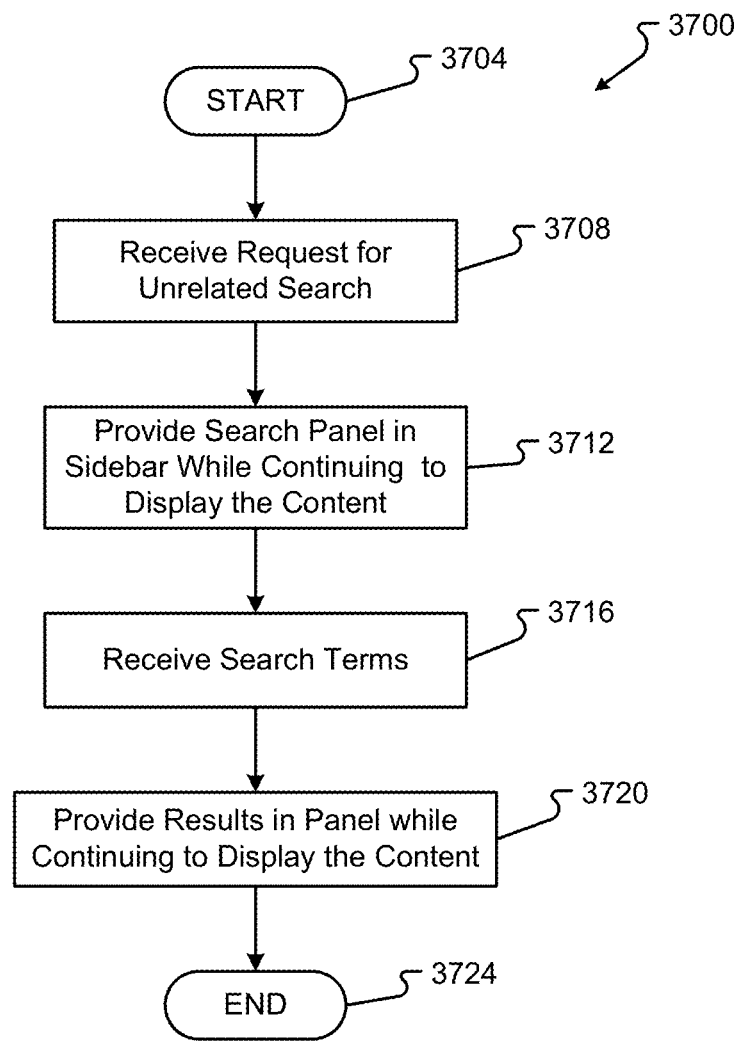
FIG. 37 is a flowchart view of an embodiment of a method for providing a user interface in an Intelligent TV.

An embodiment of a method 3700 for providing a search panel while reviewing content is presented in FIG. 37. While a general order for the steps of the method 3700 is shown in FIG. 37. Generally, the method 3700 starts with a start operation 3704 and ends with an end operation 3724. The method 3700 can include more or fewer steps or can arrange the order of the steps differently than those shown in FIG. 37. The method 3700 can be executed as a set of computer-executable instructions, executed by a computer system, and encoded or stored on a computer readable medium. Further, the method 3700 can be executed by a gate or other hardware device or component in an Application Specific Integrated Circuit, a Field Programmable Gate Array, or other type of hardware device. Hereinafter, the method 3700 shall be explained with reference to the systems, components, modules, software, data structures, user interfaces, etc. described herein.

While viewing content, the Intelligent TV 100 can receive a request to provide for an unrelated search, in step 3708. Here, the user may select a button on the remote control 700 to request a search panel to do an unrelated search, or a search for information not associated with the content being provided.

Figure 38:
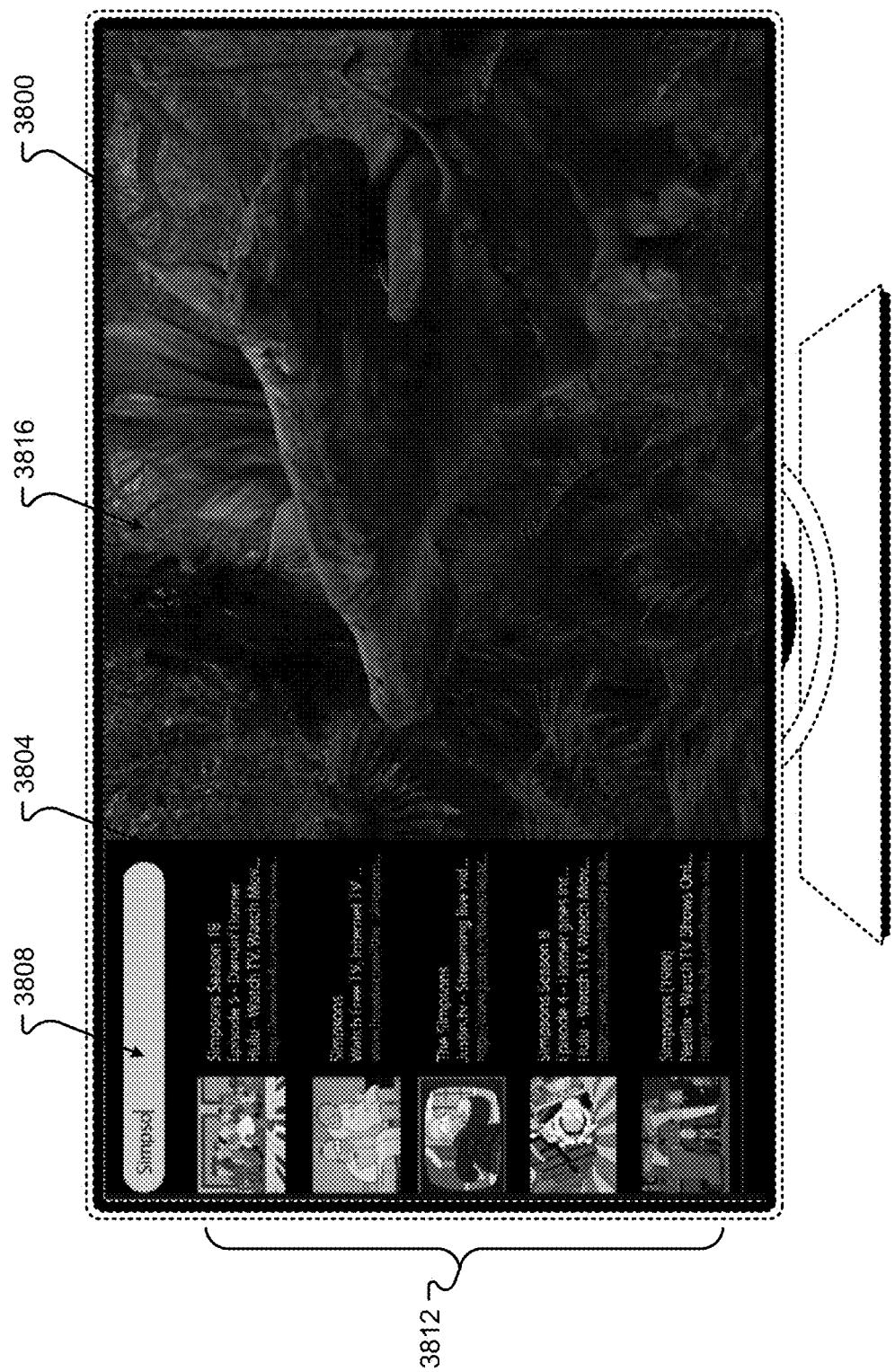
FIG. 38 is a view of an embodiment of a user interface for an Intelligent TV.

The user interface application 468 may eventually receive the request as described herein before. The user interface application 468 may then provide the search panel, in step 3712. For example, as shown in FIG. 38, the user interface application 468 can provide a sidebar 3804, in user interface 3800. The sidebar 3804 can include an area to enter search information 3808 and an area to provide search results 3812. This sidebar 3804 can be provided while the content continues to be viewed in area 3816.

The user interface application 468 can receive search terms in search area 3808, during step 3716. The search terms allow the user interface application 468 to provide a dynamically updating list of search results, in area 3812, while the search terms are being entered. Thus, the user interface application 468 can receive information from the VOD subservice 620, the EPG subservice 624, the media subservice 628, or some other data service 432. While the search terms are being entered, the user interface application 468 provides the search results in the panel, in step 3720. The search results continue to be provided while the content continues to be displayed in area 3816, and may be continued to be viewed by the user.

The exemplary systems and methods of this disclosure have been described in relation to an Intelligent Television. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

In another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for providing one of two types of user interfaces in an intelligent television, the method comprising:
   receiving a first type of selection for a first user interface, wherein the first user interface provides information about content;
   providing the first user interface in response to the first type of selection, wherein the first user interface is a Fibonacci view, and wherein representations of the content are organized and arranged in a Fibonacci spiral based on information about the content;
   subsequent to receiving the first type of selection, receiving a second type of selection for a second user interface; and
   providing the second user interface in response to the second type of selection, wherein the second user interface is a timeline user interface, wherein the timeline user interface orders two or more representations of the content along a timeline based on information about the content, and wherein the two or more representations of the content in the timeline user interface have different placements along the timeline based on the information of the content;
   wherein each representation of content is a selectable thumbnail of a respective content, wherein selection of a selectable thumbnail allows a user to view the respective content associated with the selected selectable thumbnail;
   wherein the Fibonacci view organizes the selectable thumbnails based on how often the respective content is viewed; and
   wherein each selectable thumbnail has a different aspect ratio based on a characteristic of the respective content associated with a respective selectable thumbnail.

2. The method as defined in claim 1, wherein the characteristic is one or more of an amount of content, a most viewed statistic, a newest statistic, or a most favorite statistic.

3. The method as defined in claim 1, wherein the timeline provides selectable content thumbnails arranged in timeline from oldest content at a first side of the timeline view to newest content at a second side of the timeline view.

4. The method as defined in claim 3, wherein the timeline includes a demarcation to indicate a change in date to which the content is associated.

5. The method as defined in claim 1, wherein the timeline view includes two or more markers separating the thumbnails into two or more sets.

6. The method as defined in claim 5, wherein each marker represents a date.

7. The method as defined in claim 6, wherein each set of thumbnails is associated with the date of a respective marker of the two or more markers.

8. The method as defined in claim 7, wherein the timeline is scrollable to view thumbnails that are associated with more recent or less recent dates.

9. The method as defined in claim 1, wherein the first user interface includes a banner having two or more selectable devices to change a type of content to be viewed in the Fibonacci spiral.

10. The method as defined in claim 9, wherein the two or more selectable devices include selections for two or more of Live TV programming, Videos, Pictures, Music, or Applications.

11. An intelligent television system comprising:
   a memory operable to store social media data;
   a processor in communication with the memory, the processor operable to execute a statistics sub service operable to:
      execute an user interface application operable to:
         receive a first type of selection for a first user interface, wherein the first user interface provides information about content;
         provide the first user interface in response to the first type of selection, wherein the first user interface is a Fibonacci view, and wherein representations of the content are organized and arranged in a Fibonacci spiral based on information about the content;
         subsequent to receiving the first type of selection, receive a second type of selection for a second user interface; and
         provide the second user interface for a in response to the second type of selection, wherein the second user interface is a timeline user interface, wherein the timeline user interface orders two or more representations of the content along a timeline based on information about the content, and wherein the two or more representations of the content in the timeline user interface have different placements along the timeline based on the information of the content;
   wherein each representation of content is a selectable thumbnail of a respective content, wherein selection of a selectable thumbnail allows a user to view the respective content associated with the selected selectable thumbnail;
   wherein the Fibonacci view organizes the selectable thumbnails based on how often the respective content is viewed; and
   wherein each selectable thumbnail has a different aspect ratio based on a characteristic of the respective content associated with a respective selectable thumbnail.

12. The intelligent television system as defined in claim 11, wherein the characteristic is one or more of an amount of content, a most viewed statistic, a newest statistic, or a most favorite statistic.

13. The intelligent television system as defined in claim 11, wherein the time line provides selectable content thumbnails arranged in timeline from oldest content at a first side of the timeline to newest content at a second side of the timeline.

14. The intelligent television system as defined in claim 13, wherein the timeline includes a demarcation to indicate a change in date to which the content is associated.

15. The intelligent television system as defined in claim 11, wherein the timeline view includes two or more markers separating the thumbnails into two or more sets, wherein each marker represents a date, wherein each set of thumbnails is associated with the date of a respective marker of the two or more markers, wherein the timeline is scrollable to view thumbnails that are associated with more recent or less recent dates, wherein the first user interface includes a banner having two or more selectable devices to change a type of content to be viewed in the Fibonacci spiral, wherein the two or more selectable devices include selections for two or more of Live TV programming, Videos, Pictures, Music, or Applications.

16. A non-transitory computer readable medium having stored thereon processor executable instructions that cause a computing system to execute a method, the instructions comprising:

instructions to receive a first type of selection for a first user interface, wherein the first user interface provides information about content;

instructions to provide the first user interface in response to the first type of selection, wherein the first user interface is a Fibonacci view, and wherein representations of the content are organized and arranged in a Fibonacci spiral based on information about the content;

subsequent to receiving the first type of selection, instructions to receive a second type of selection for a second user interface; and instructions to provide the second user interface in response to the second type of selection, wherein the second user interface is a timeline user interface, wherein the timeline user interface orders two or more representations of the content along a timeline based on information about the content, and wherein the two or more representations of the content in the timeline user interface have different placements along the timeline based on the information of the content;

wherein each representation of content is a selectable thumbnail of a respective content, wherein selection of a selectable thumbnail allows a user to view the respective content associated with the selected selectable thumbnail;

wherein the Fibonacci view organizes the selectable thumbnails based on how often the respective content is viewed; and wherein each selectable thumbnail has a different aspect ratio based on a characteristic of the respective content associated with a respective selectable thumbnail.

17. The computer readable medium as defined in claim 16, wherein the characteristic is one or more of an amount of content, a most viewed statistic, a newest statistic, or a most favorite statistic.

18. The computer readable medium as defined in claim 17, wherein the timeline includes a demarcation to indicate a change in date to which the content is associated.

19. The computer readable medium as defined in claim 16, wherein the timeline provides selectable content thumbnails arranged in timeline from oldest content at a first side of the timeline to newest content at a second side of the timeline.

20. The computer readable medium as defined in claim 16, wherein the timeline view includes two or more markers separating the thumbnails into two or more sets, wherein each marker represents a date, wherein each set of thumbnails is associated with the date of a respective marker of the two or more markers, wherein the timeline is scrollable to view thumbnails that are associated with more recent or less recent dates, wherein the first user interface includes a banner having two or more selectable devices to change a type of content to be viewed in the Fibonacci spiral, wherein the two or more selectable devices include selections for two or more of Live TV programming, Videos, Pictures, Music, or Applications.

* * * * *

UNITED STATES PATENT AND TRADEMARK OFFICE
CERTIFICATE OF CORRECTION

PATENT NO. : 9,106,866 B2  
APPLICATION NO. : 13/969884  
DATED : August 11, 2015  
INVENTOR(S) : Alexander de Paz, Karina A. Limongi and Sanjiv Sirpal Page 1 of 1

It is certified that error appears in the above-identified patent and that said Letters Patent is hereby corrected as shown below:

In the Claims

At Column 56, line 27, please delete "for a" therein.

Signed and Sealed this  
Twenty-eighth Day of June, 2016

Michelle K. Lee  
*Director of the United States Patent and Trademark Office*